(12) United States Patent
Belden, Jr. et al.

(10) Patent No.: US 7,320,235 B2
(45) Date of Patent: Jan. 22, 2008

(54) LOCKABLE MEDIA STORAGE CONTAINER

(75) Inventors: Dennis D. Belden, Jr., Waxhaw, NC (US); Ronald M. Marsilio, Lake Wylie, SC (US); Aaron McMahan, Massillon, OH (US); Jesse D. Wells, Canton, OH (US)

(73) Assignee: Nexpak Corporation, Duluth, GA (US)

( * ) Notice: Subject to any disclaimer, the term of this patent is extended or adjusted under 35 U.S.C. 154(b) by 126 days.

(21) Appl. No.: 11/036,774

(22) Filed: Jan. 14, 2005
(Under 37 CFR 1.47)

(65) Prior Publication Data

US 2005/0279143 A1    Dec. 22, 2005

Related U.S. Application Data

(63) Continuation-in-part of application No. 10/310,263, filed on Dec. 5, 2002, now abandoned.

(60) Provisional application No. 60/337,368, filed on Dec. 5, 2001.

(51) Int. Cl.
*E05B 65/00* (2006.01)

(52) U.S. Cl. .............. 70/57.1; 70/63; 206/1.5; 206/308.2; 206/387.11

(58) Field of Classification Search ............ 70/63, 70/57.1; 206/1.5, 308.2, 387.11
See application file for complete search history.

(56) References Cited

U.S. PATENT DOCUMENTS

| | | | | |
|---|---|---|---|---|
| 6,598,742 | B1* | 7/2003 | Belden et al. | 206/308.2 |
| 6,672,455 | B2* | 1/2004 | Belden et al. | 206/308.2 |
| 6,832,498 | B2* | 12/2004 | Belden et al. | 70/57.1 |
| 6,851,554 | B2* | 2/2005 | Byrne et al. | 206/308.2 |
| 6,880,372 | B2* | 4/2005 | Kim | 70/57.1 |
| 6,886,691 | B2* | 5/2005 | Burdett et al. | 206/387.11 |
| 6,966,438 | B2* | 11/2005 | Belden et al. | 206/308.1 |
| 2004/0187530 | A1* | 9/2004 | Lax et al. | 70/57.1 |
| 2006/0042330 | A1* | 3/2006 | Lax et al. | 70/57.1 |
| 2006/0081020 | A1* | 4/2006 | Hsiao et al. | 70/57.1 |

* cited by examiner

*Primary Examiner*—Suzanne Dino Barrett
(74) *Attorney, Agent, or Firm*—Zollinger & Bucleson Ltd.

(57) ABSTRACT

A lockable media storage container includes a lock disposed within the lock reception cavity defined by the container. The lock may be moved from a locked position to an unlocked position while remaining disposed within the lock reception cavity. In one embodiment, the lock locks itself in the unlocked position so that it cannot accidently move back into the locked position. The lock includes a plurality of lock hooks extending from a common lock frame. A lock finger also extends from the common lock frame. The lock finger holds the lock in the locked position. A magnetic key is used to unlock the lock and move the lock slide to the unlocked position.

27 Claims, 45 Drawing Sheets

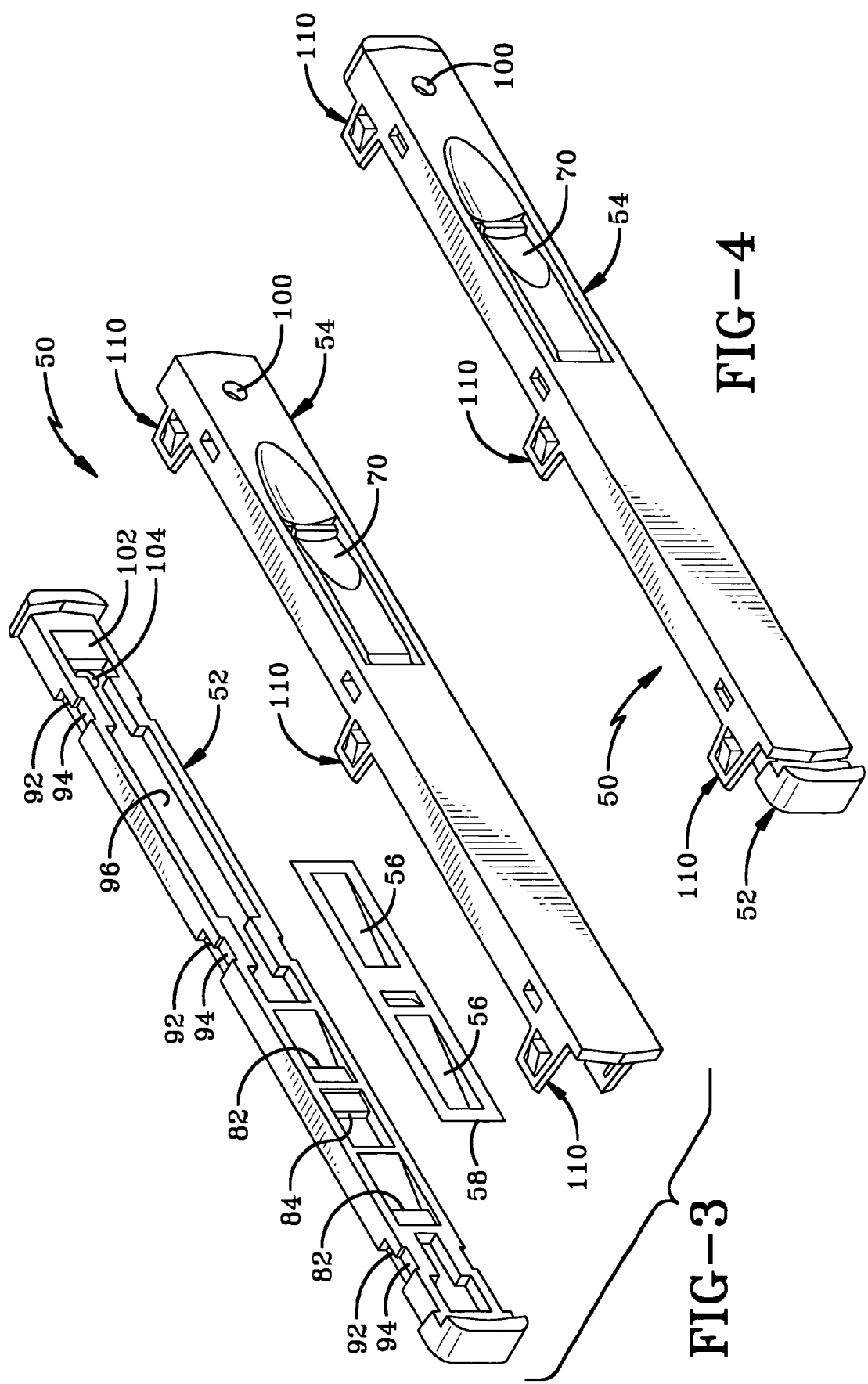

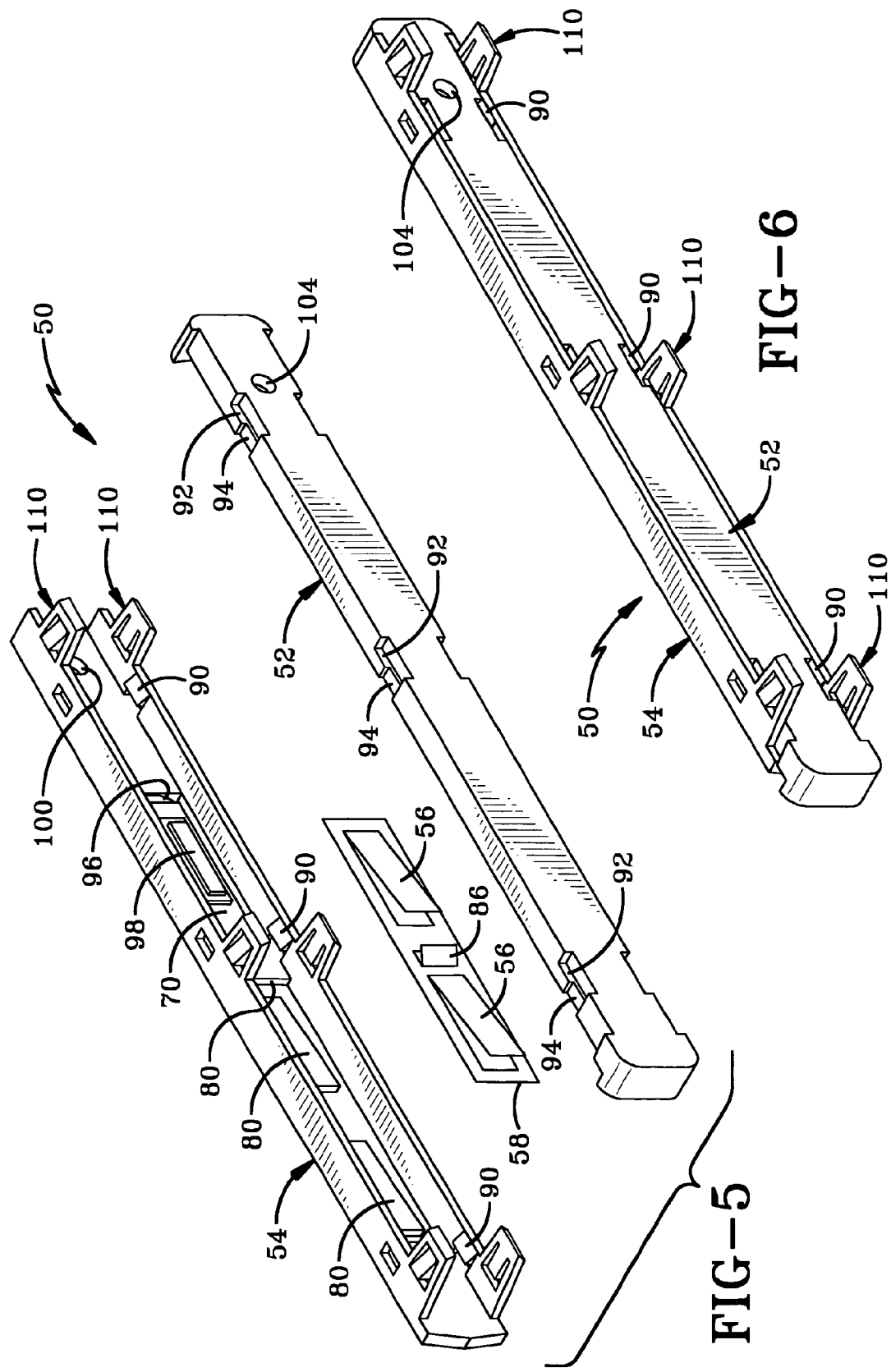

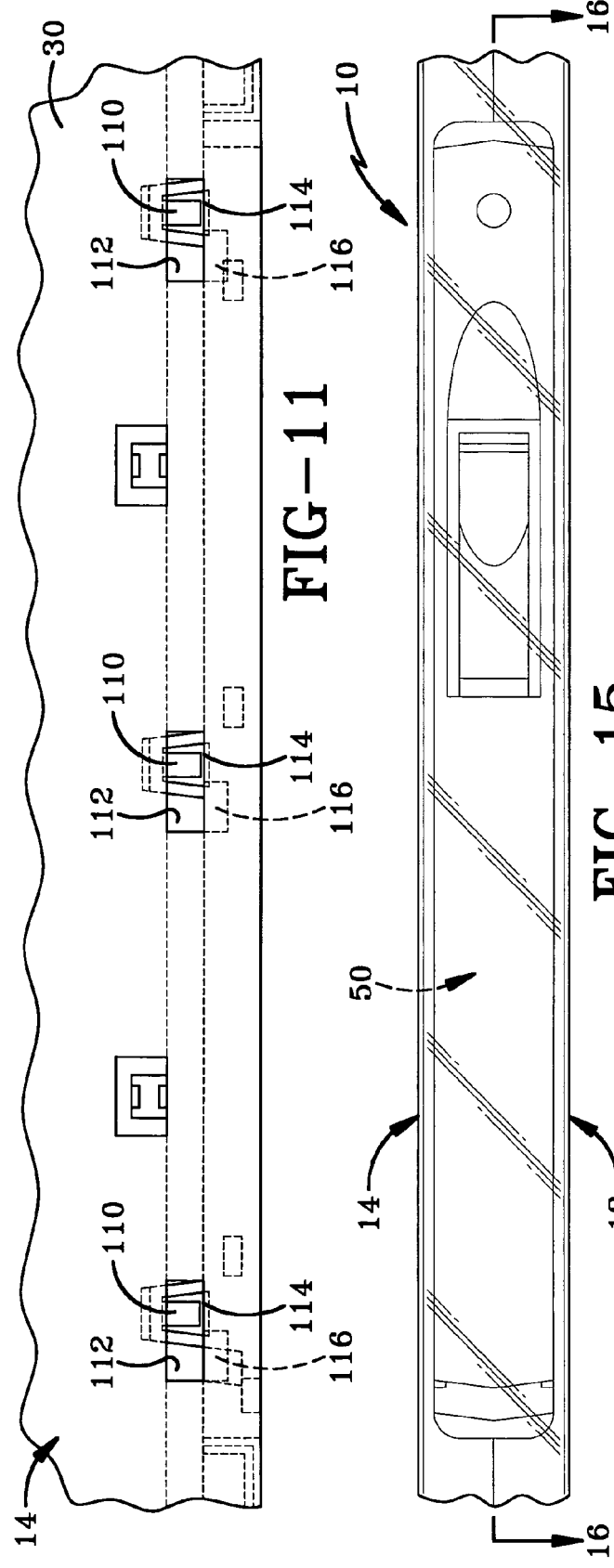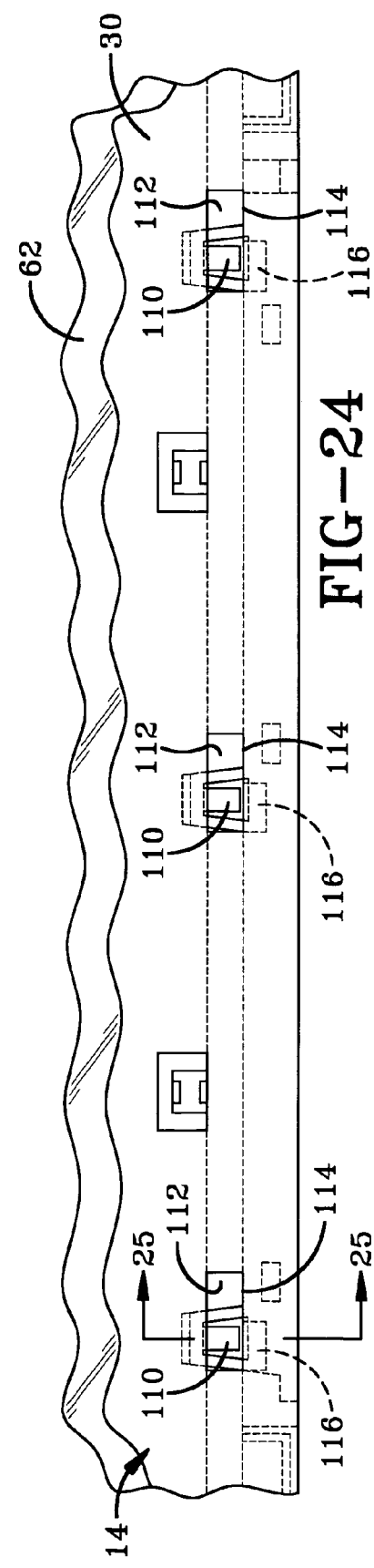

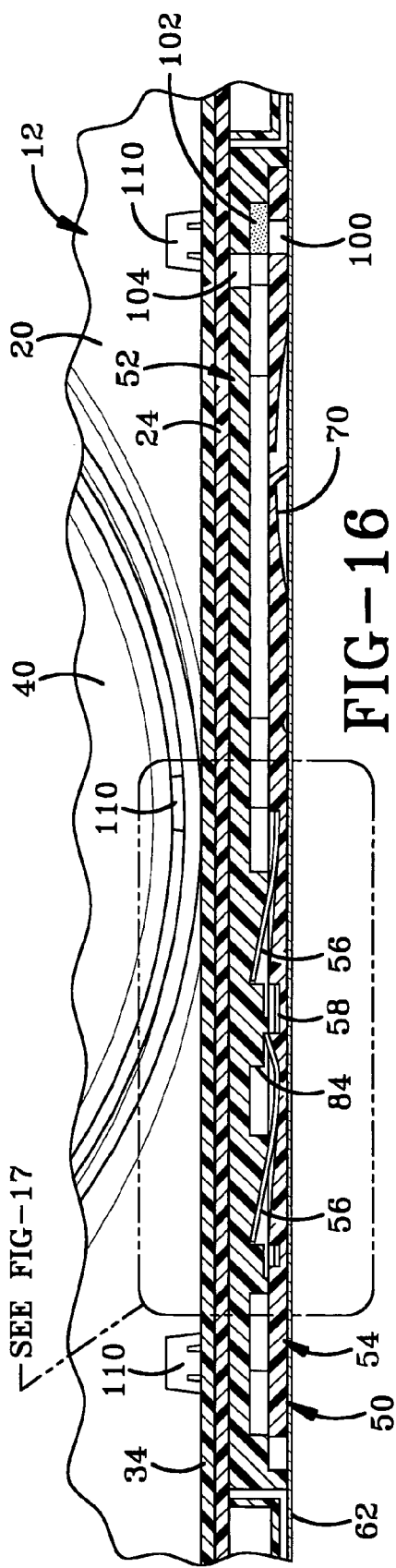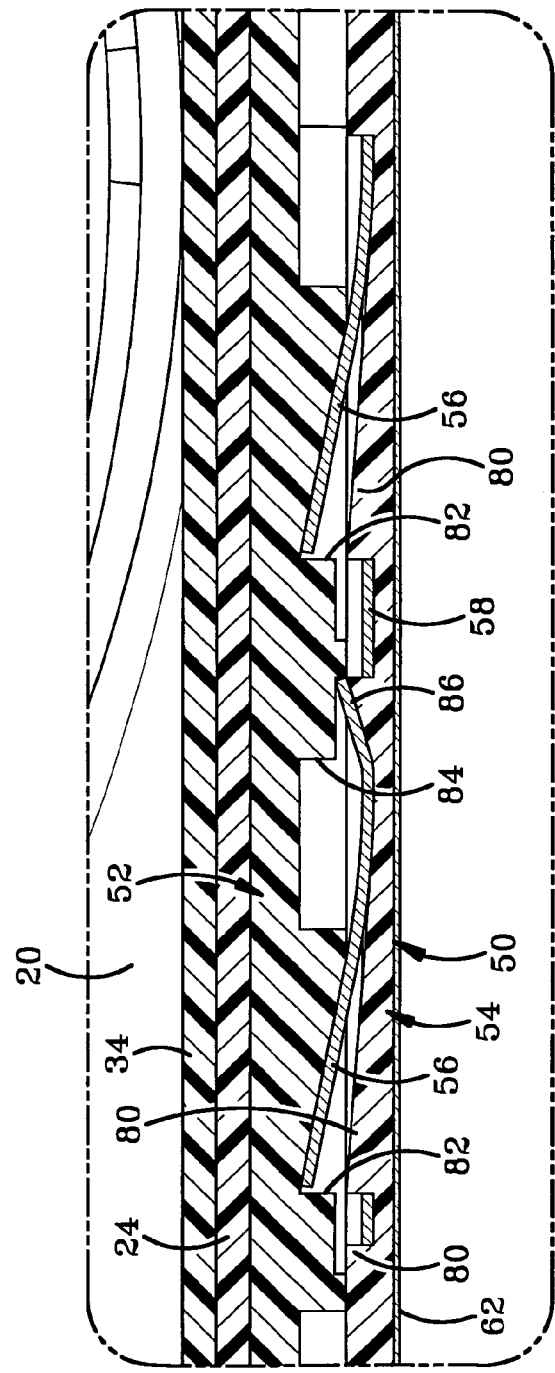

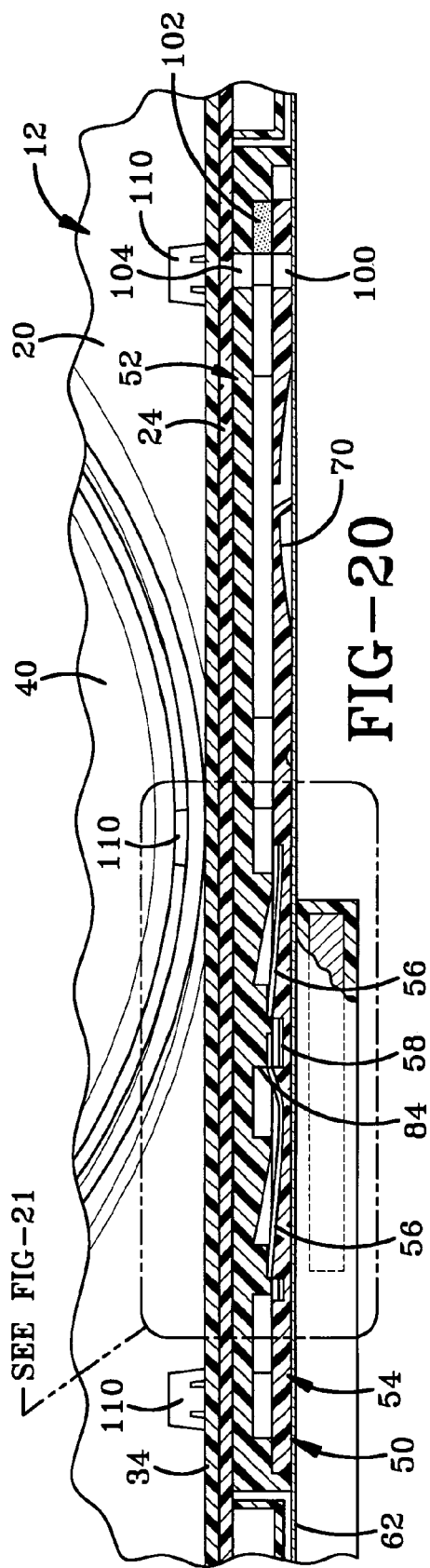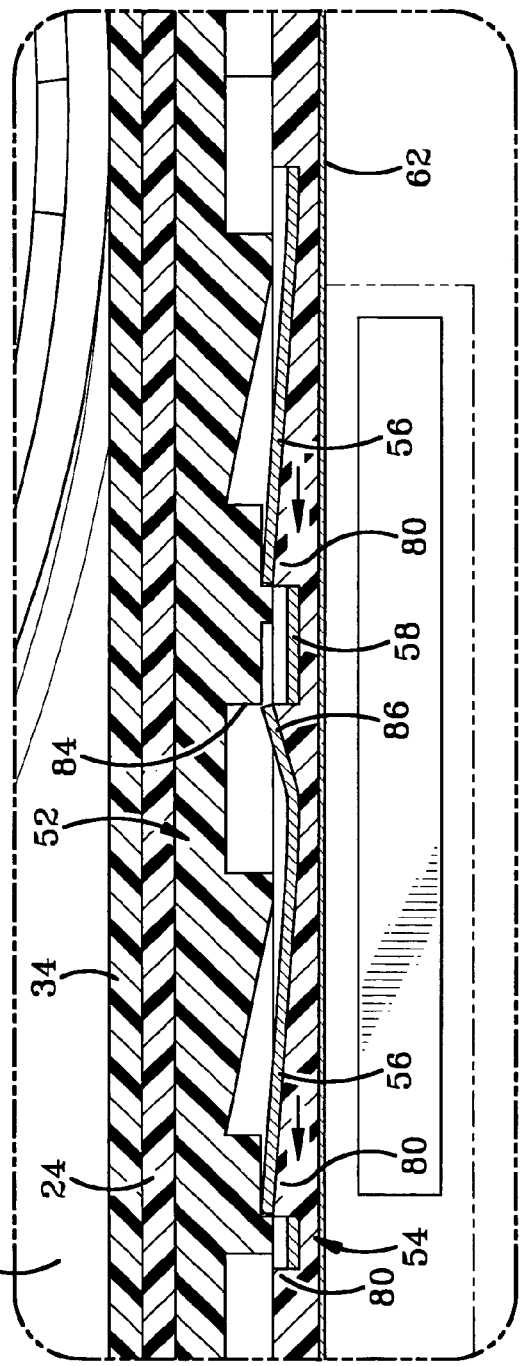

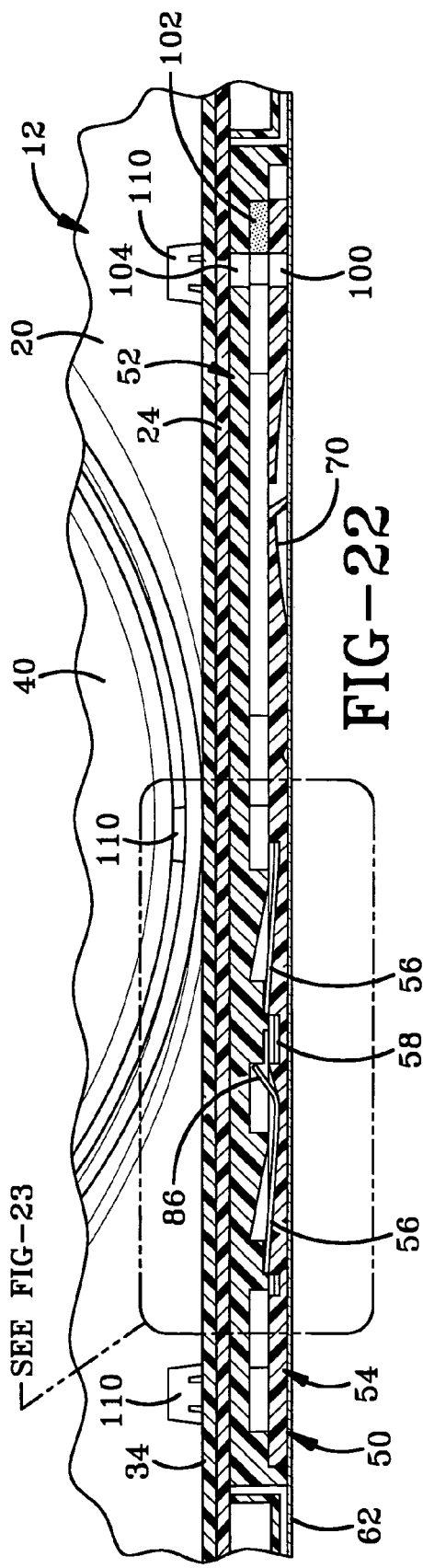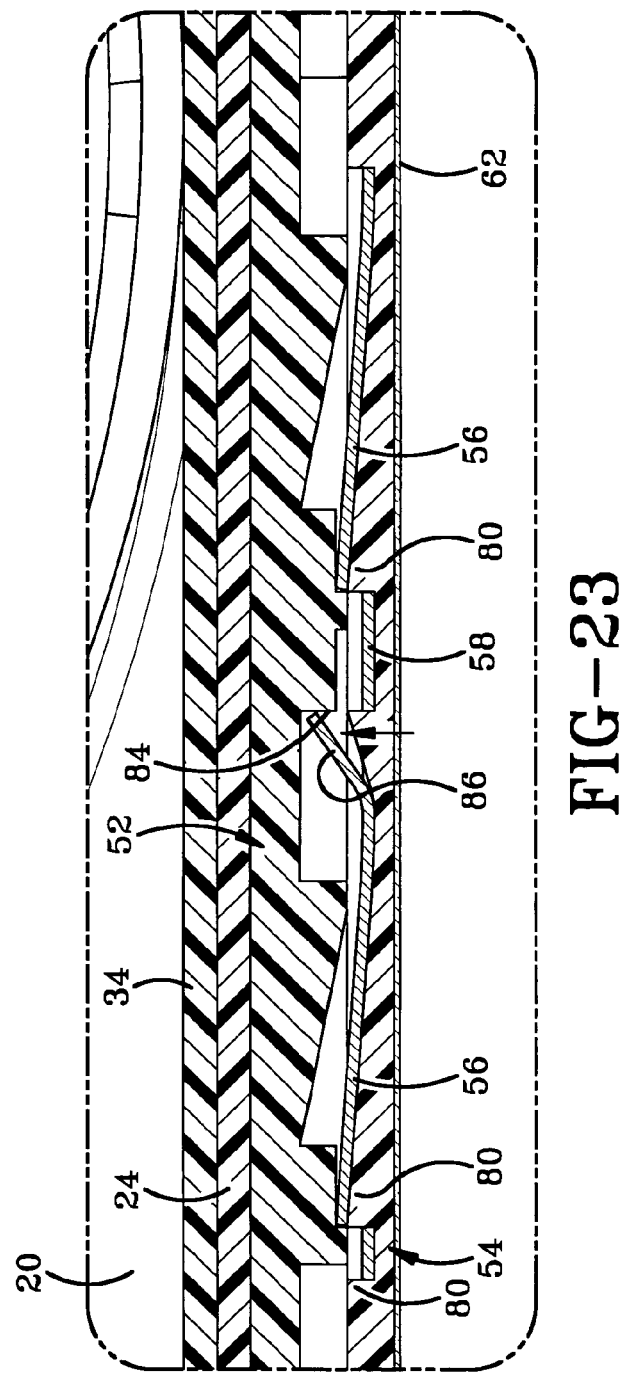

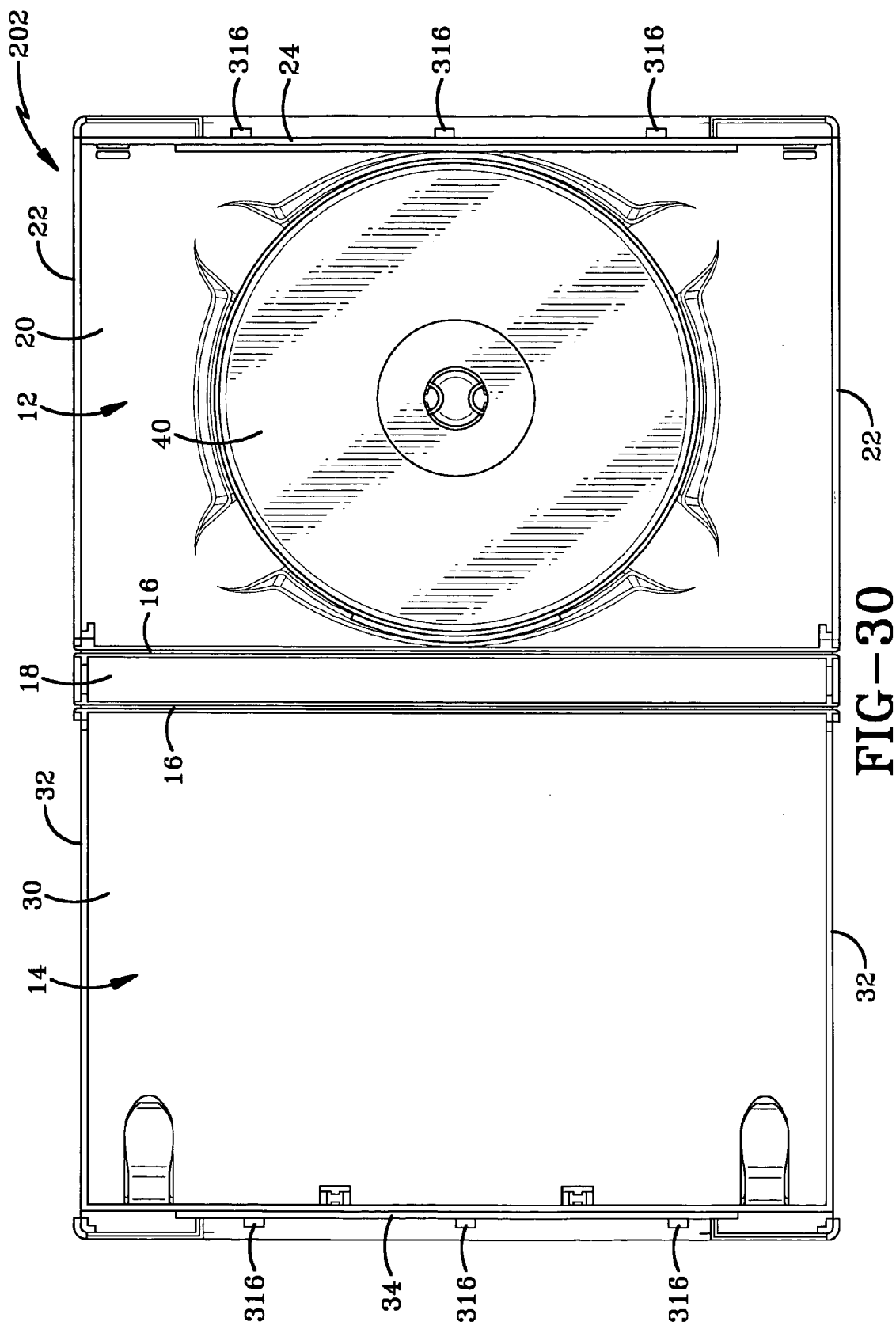

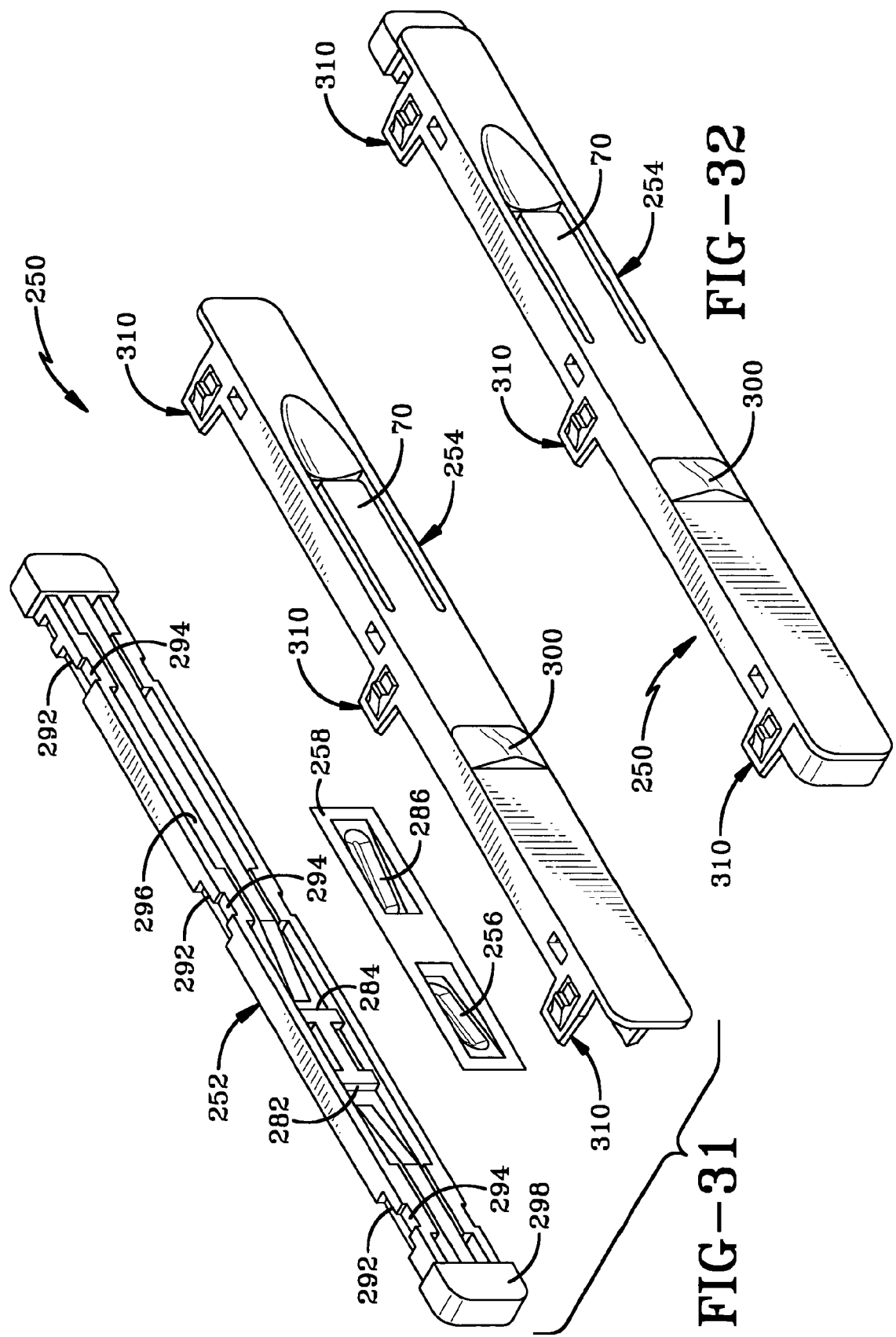

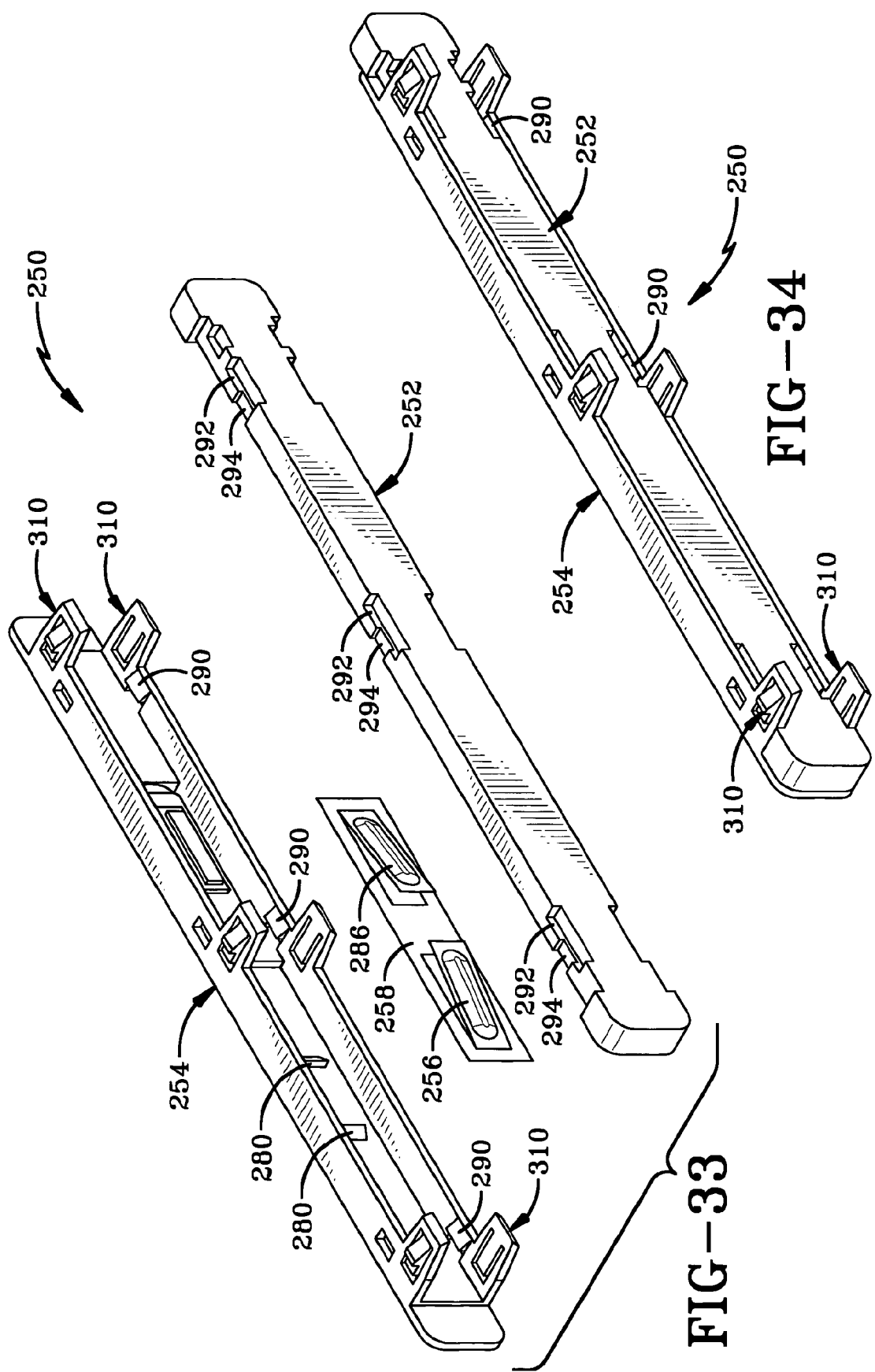

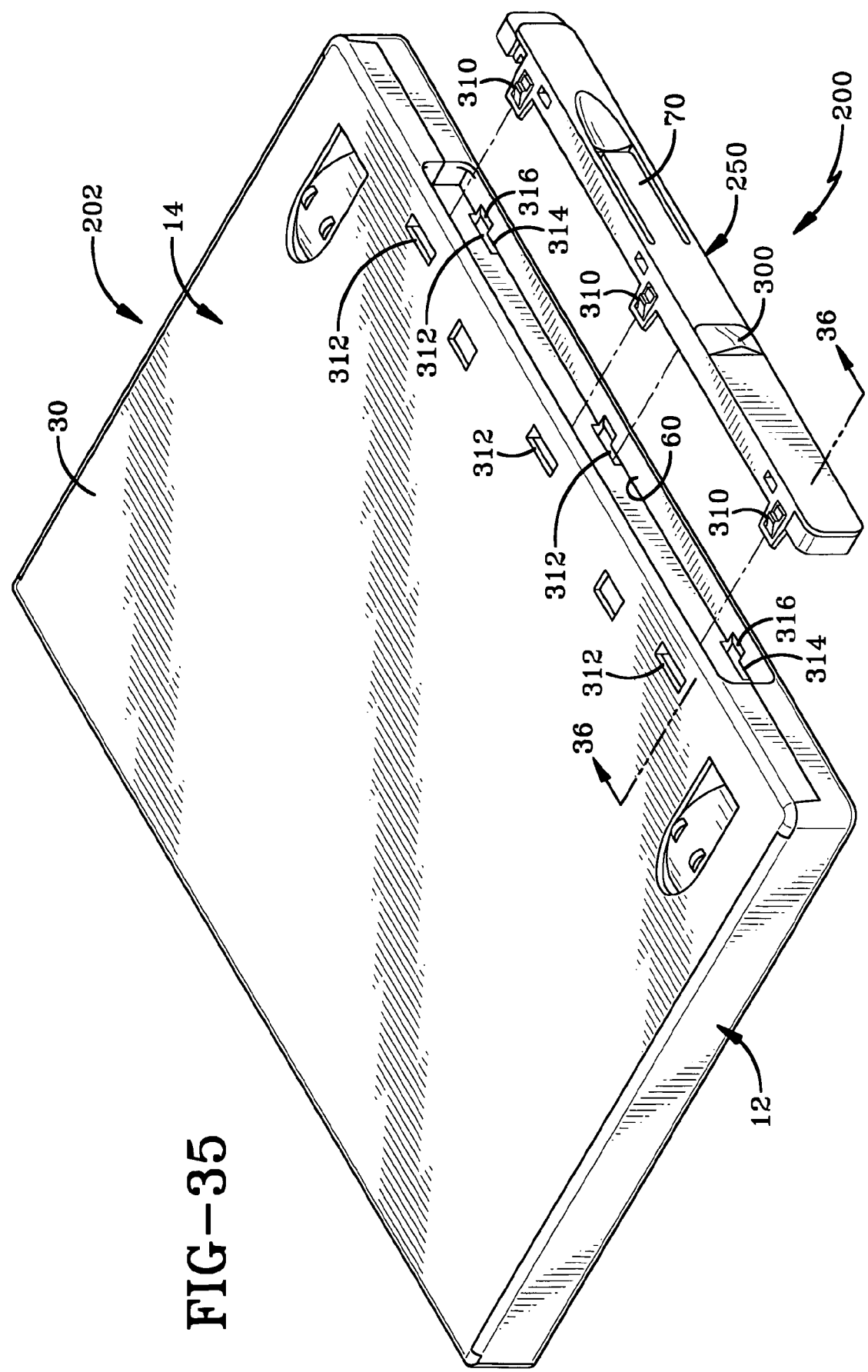

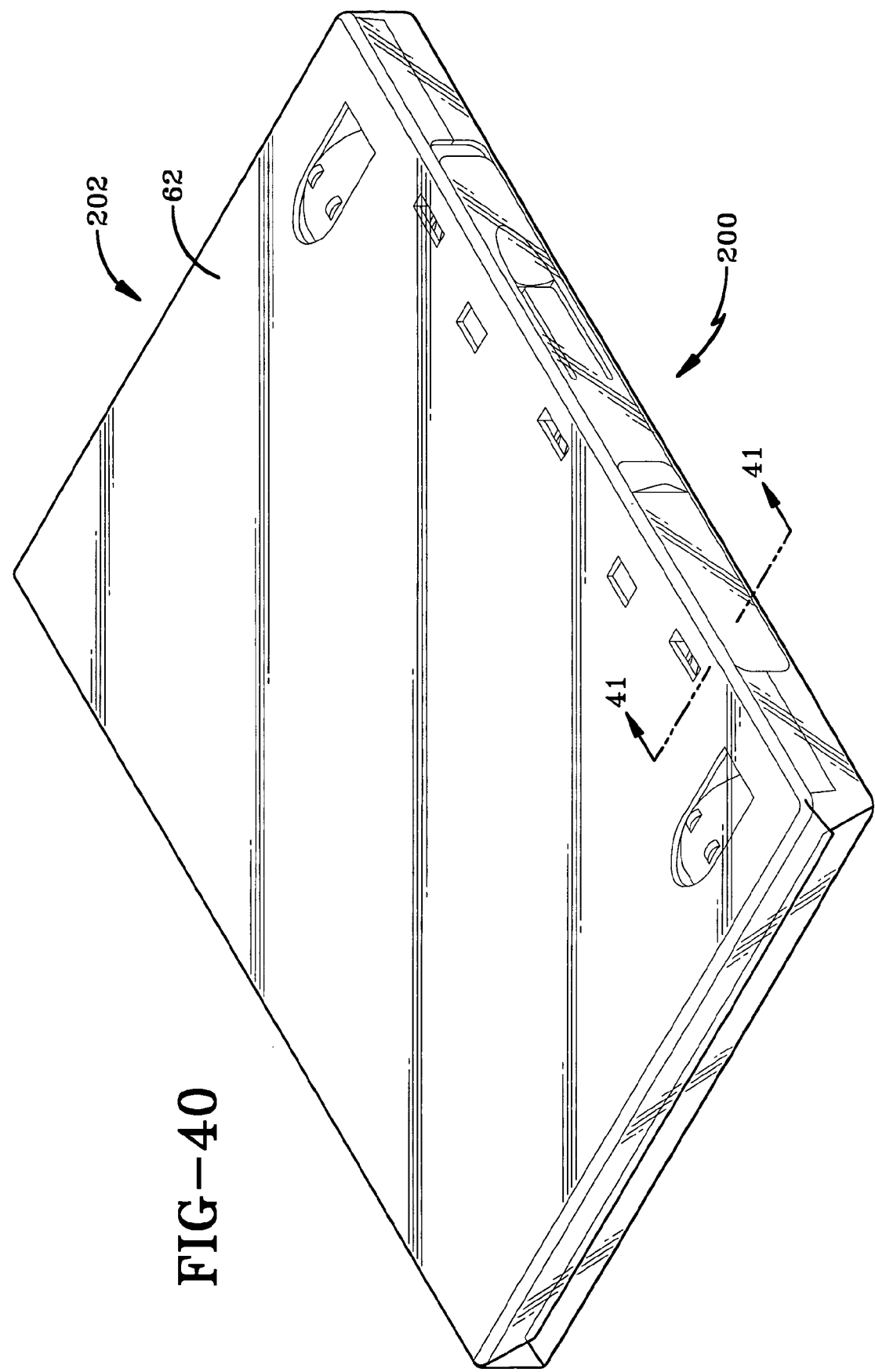

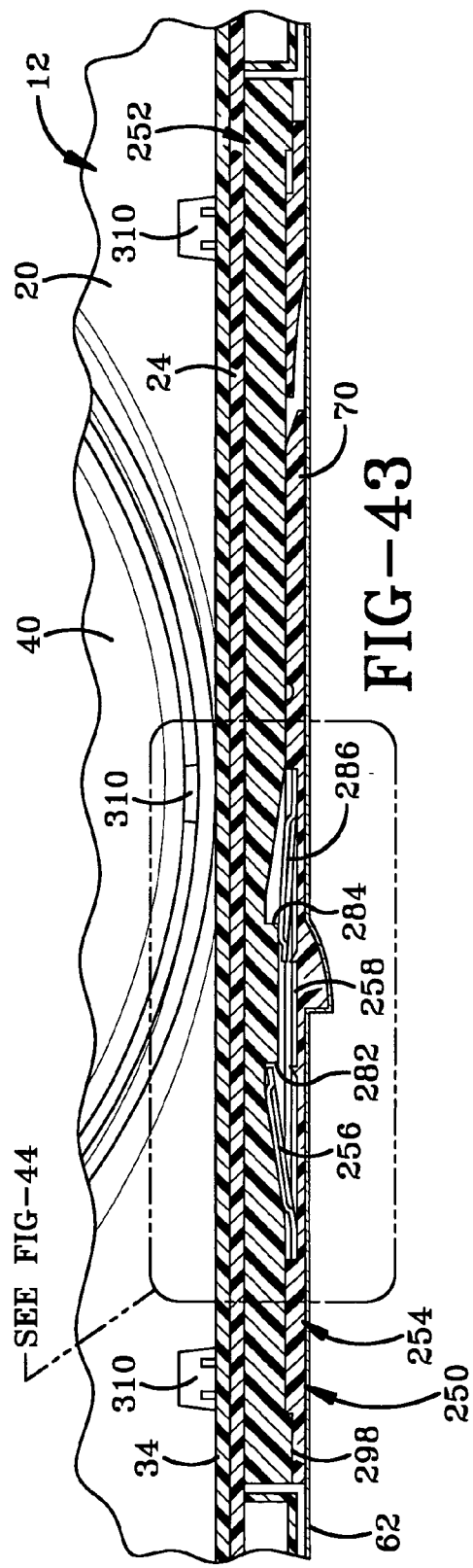
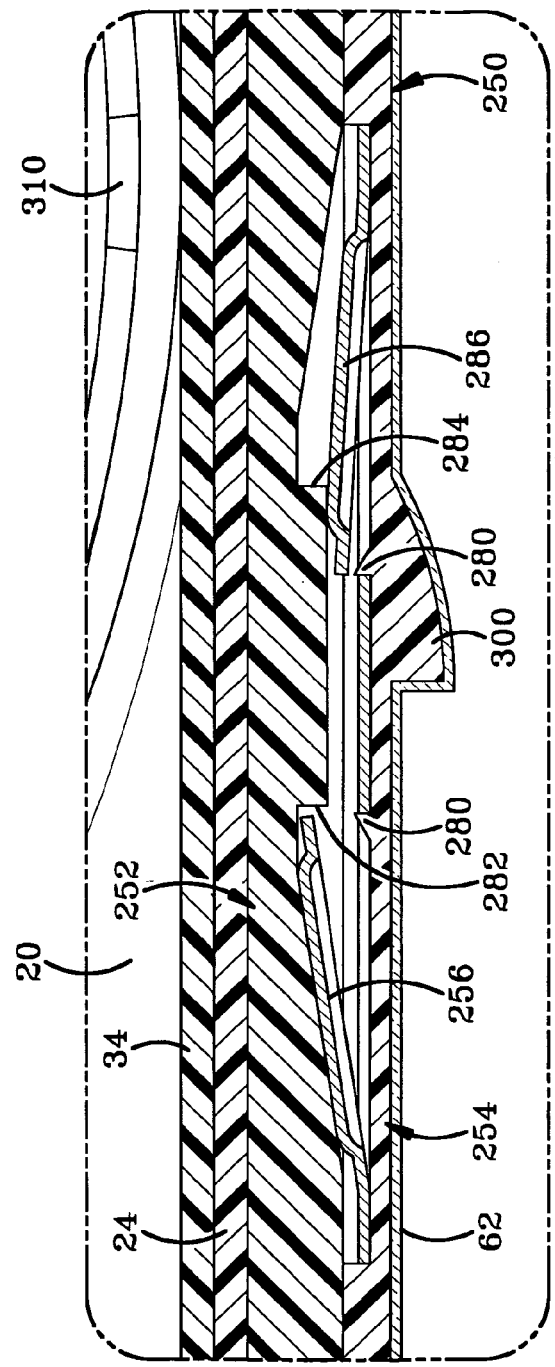
FIG-43
FIG-44

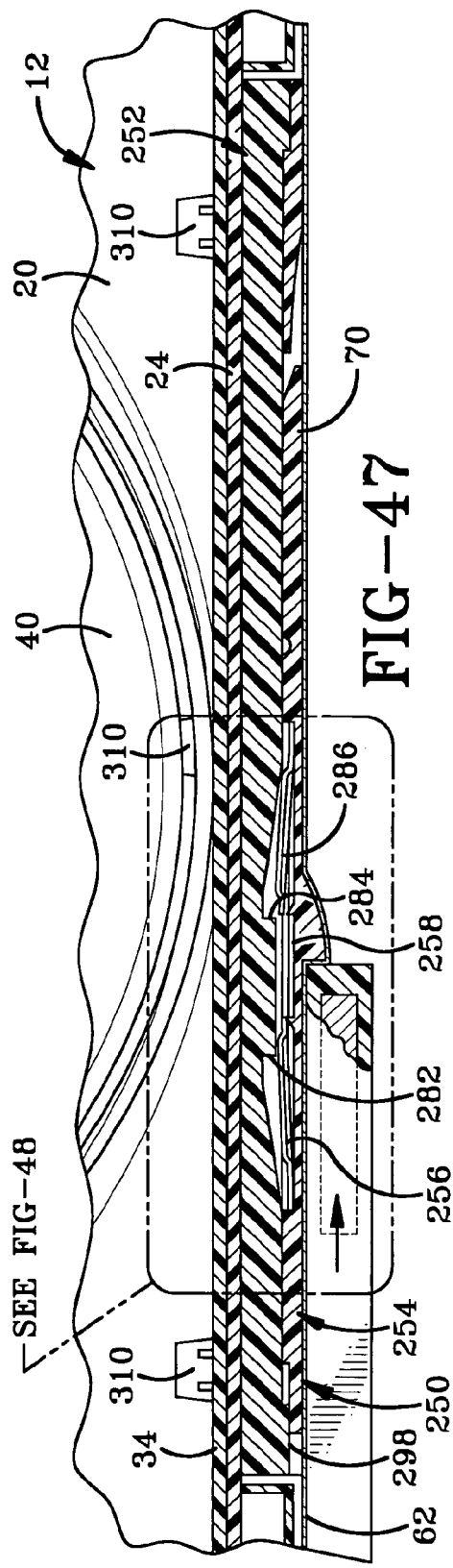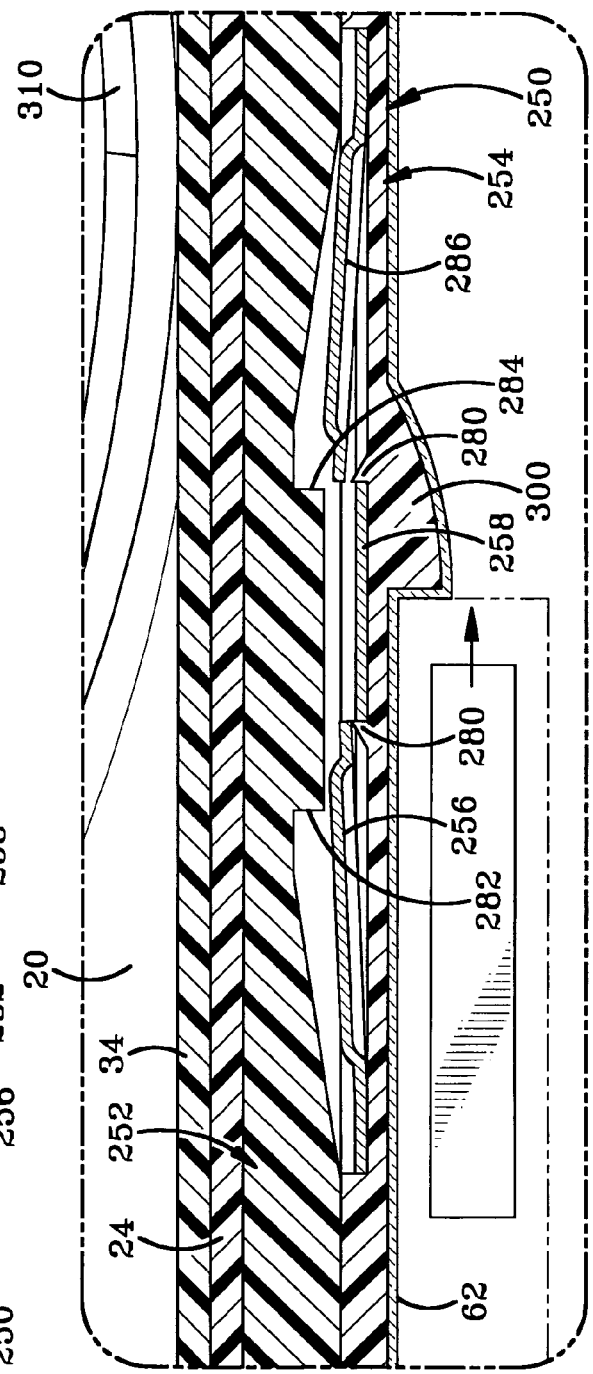
FIG-47
FIG-48

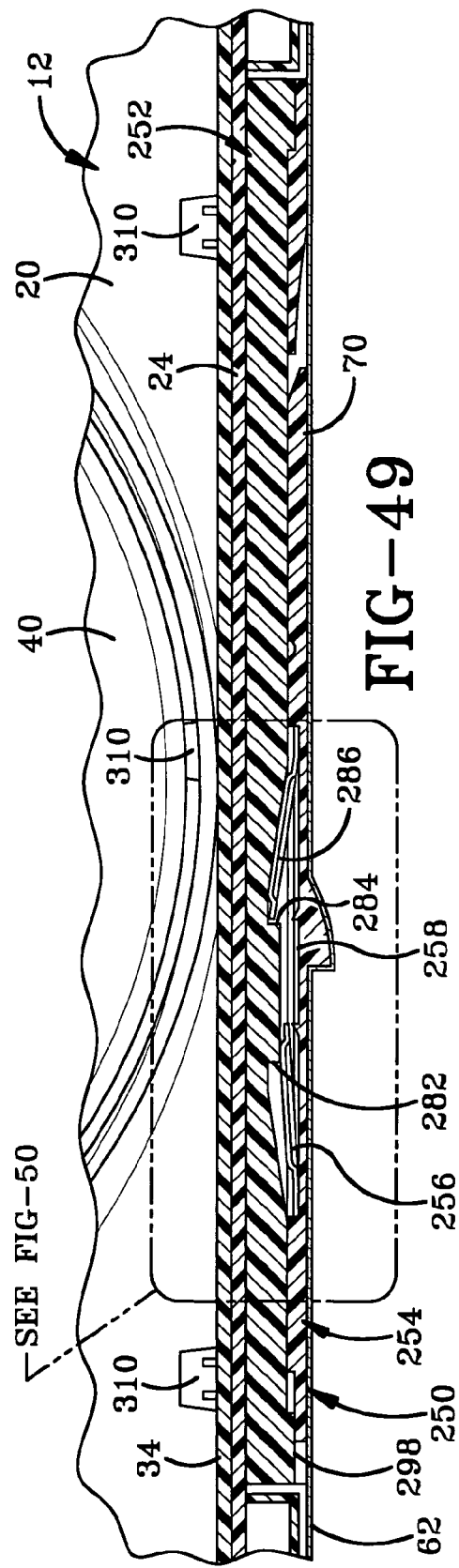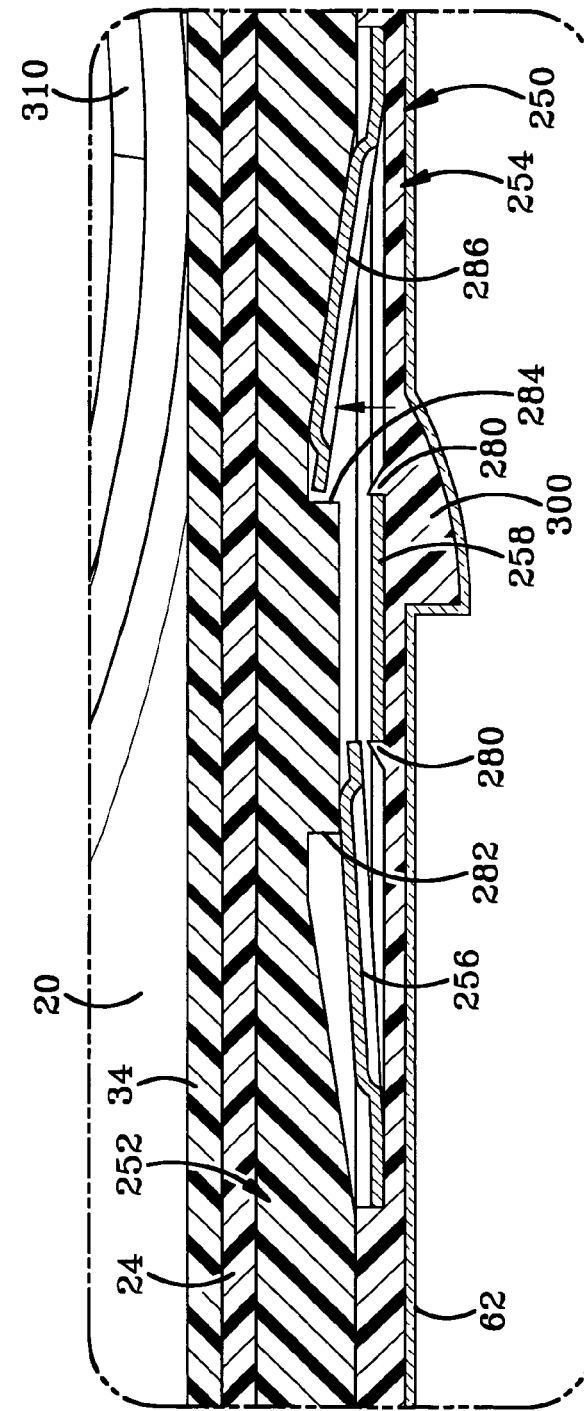
FIG-49
FIG-50

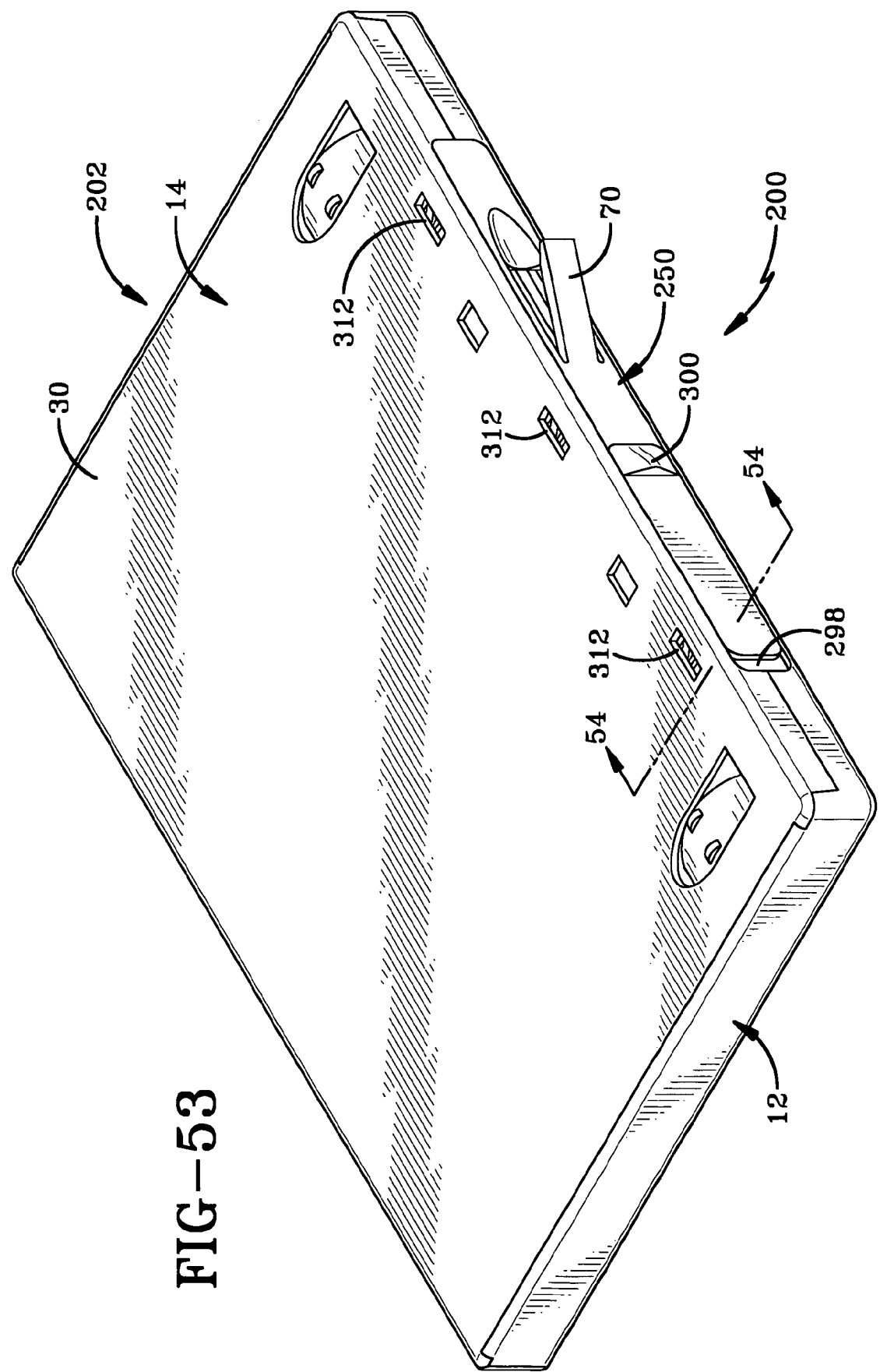

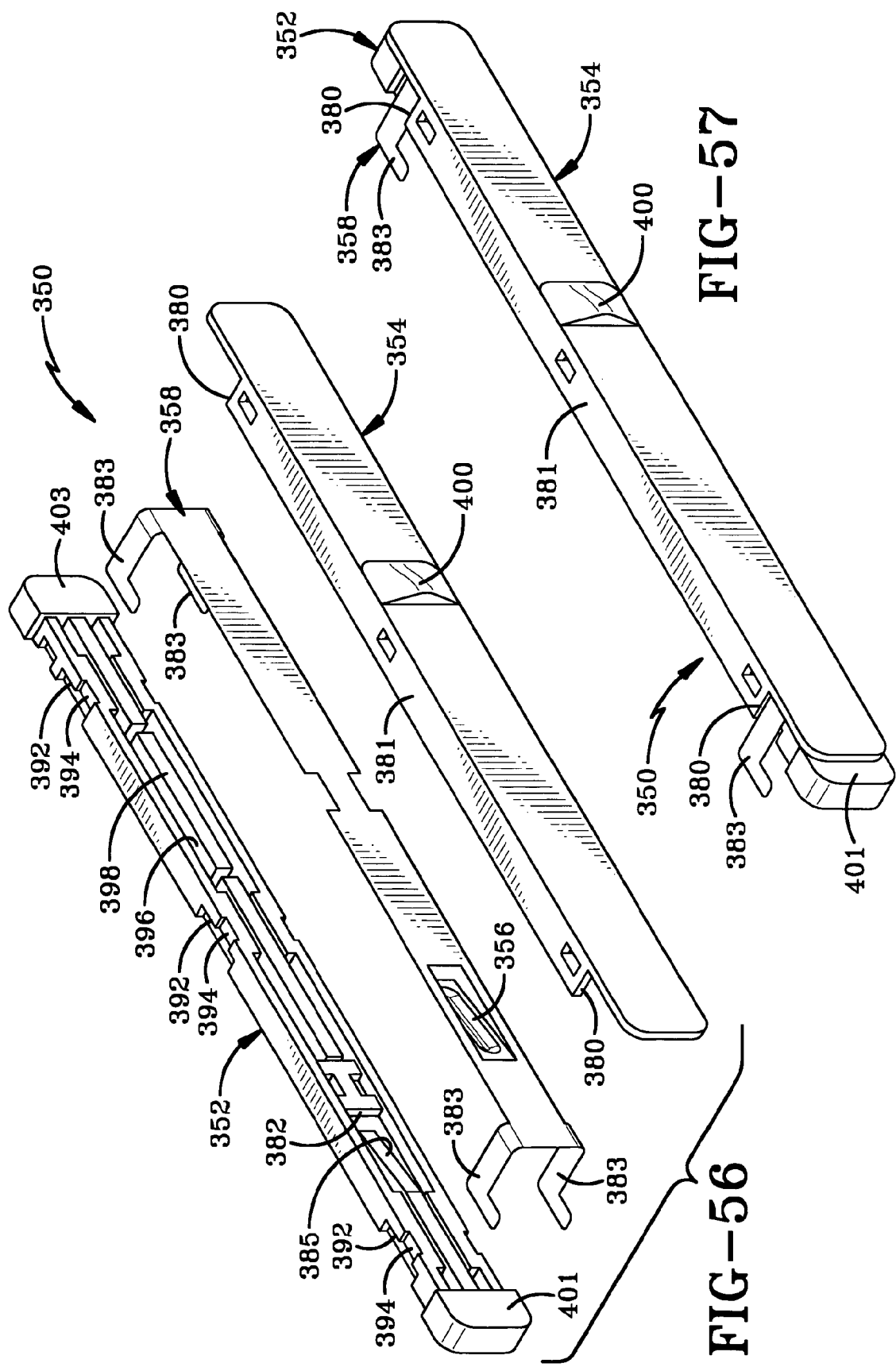

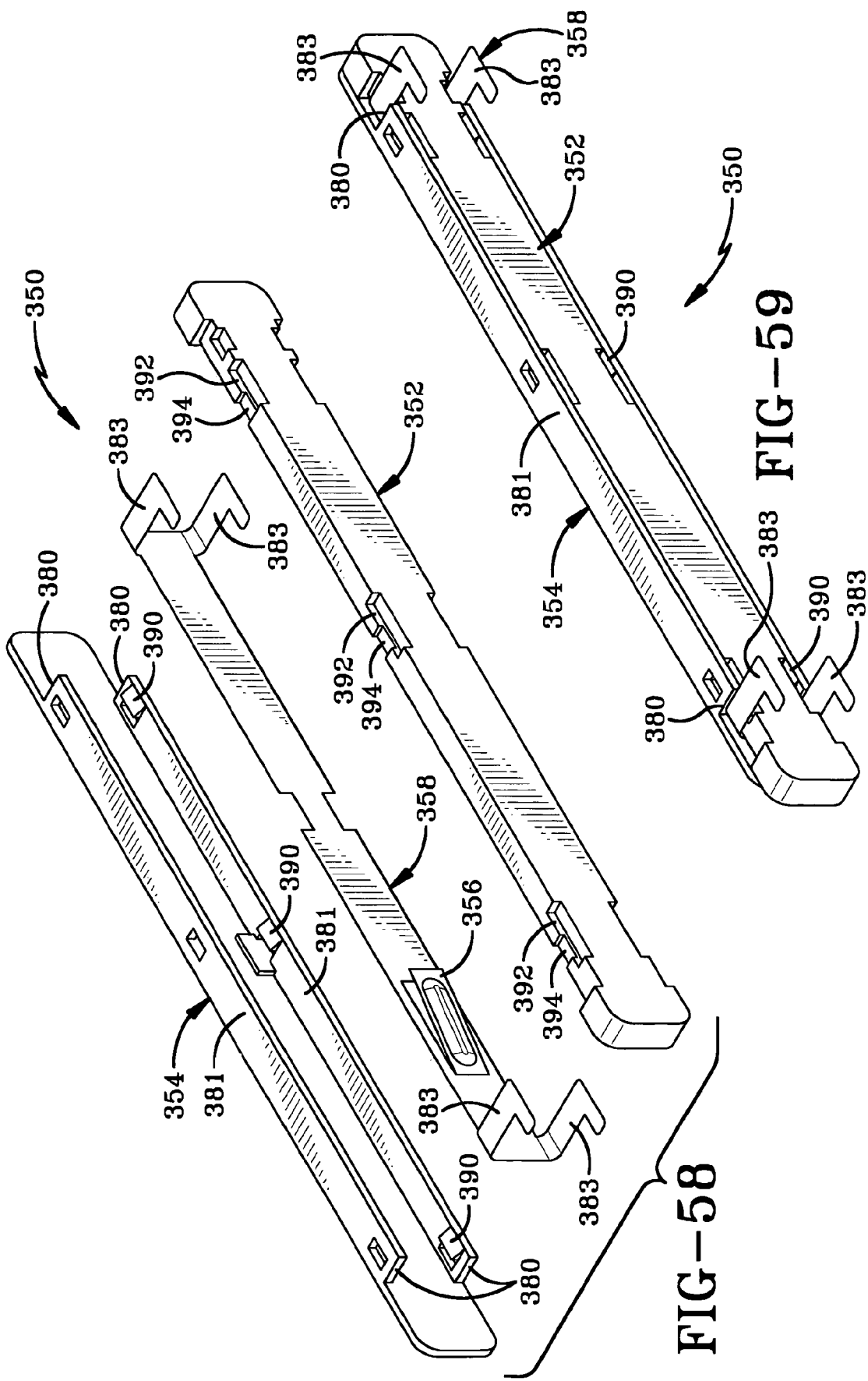

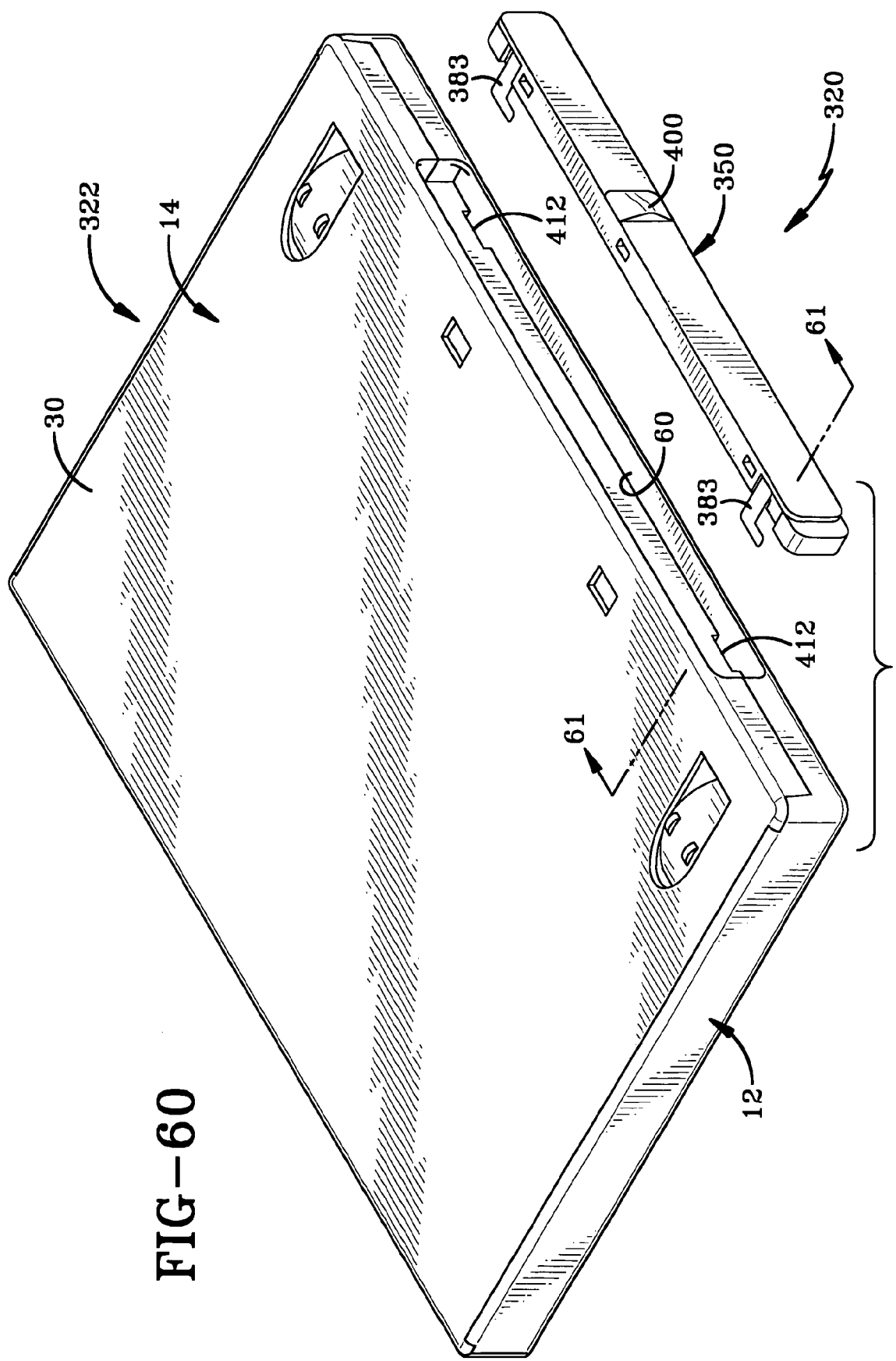

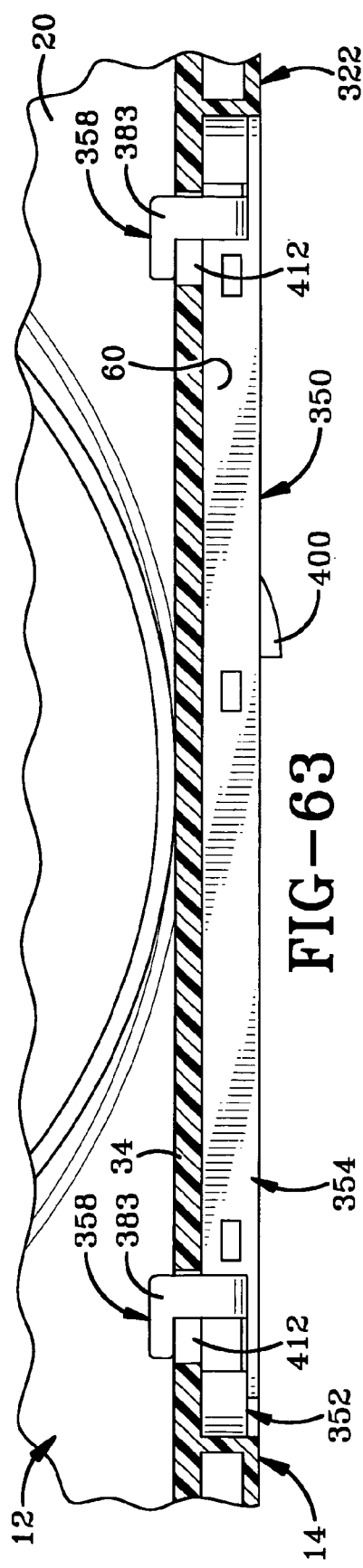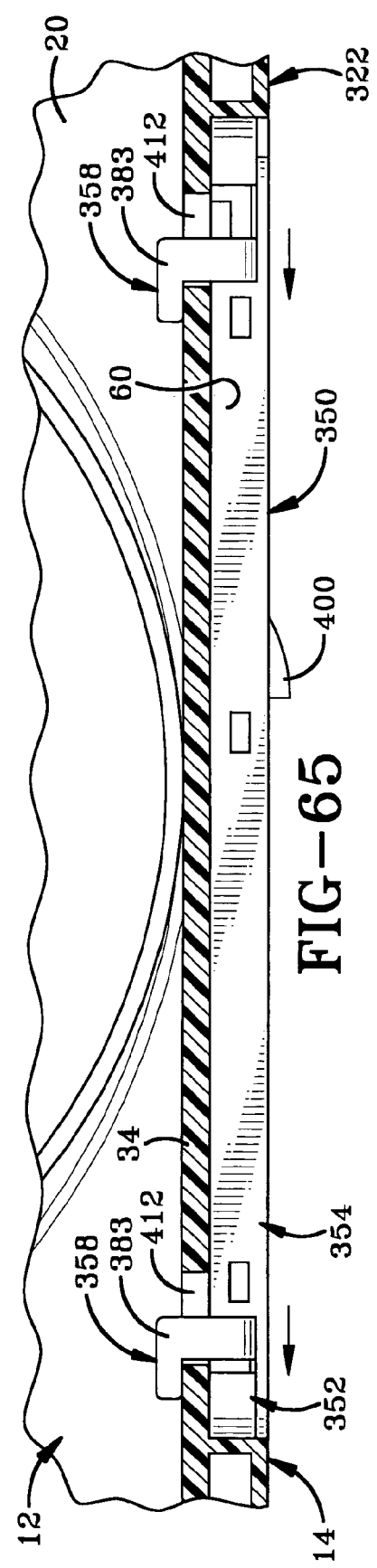

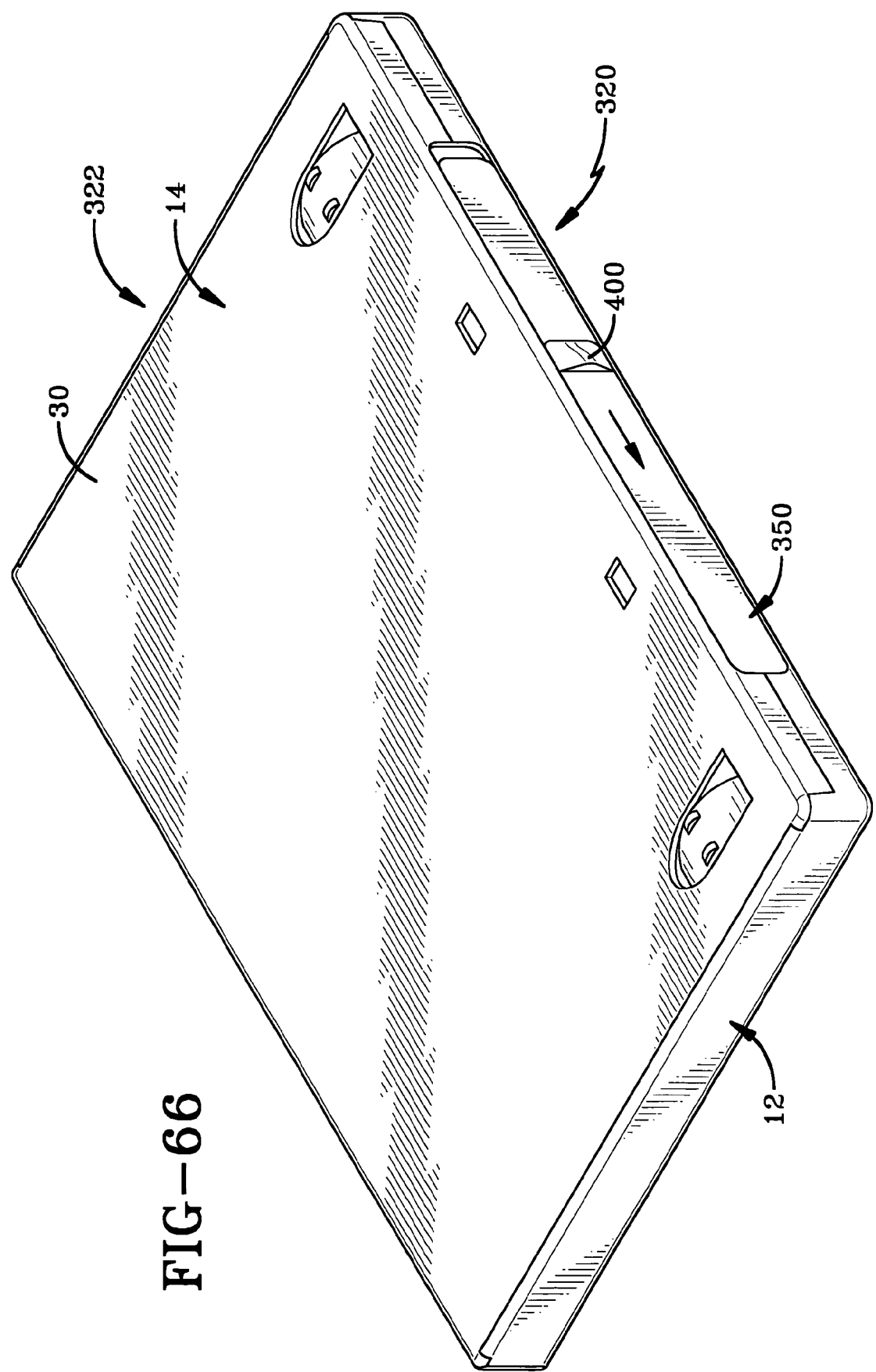

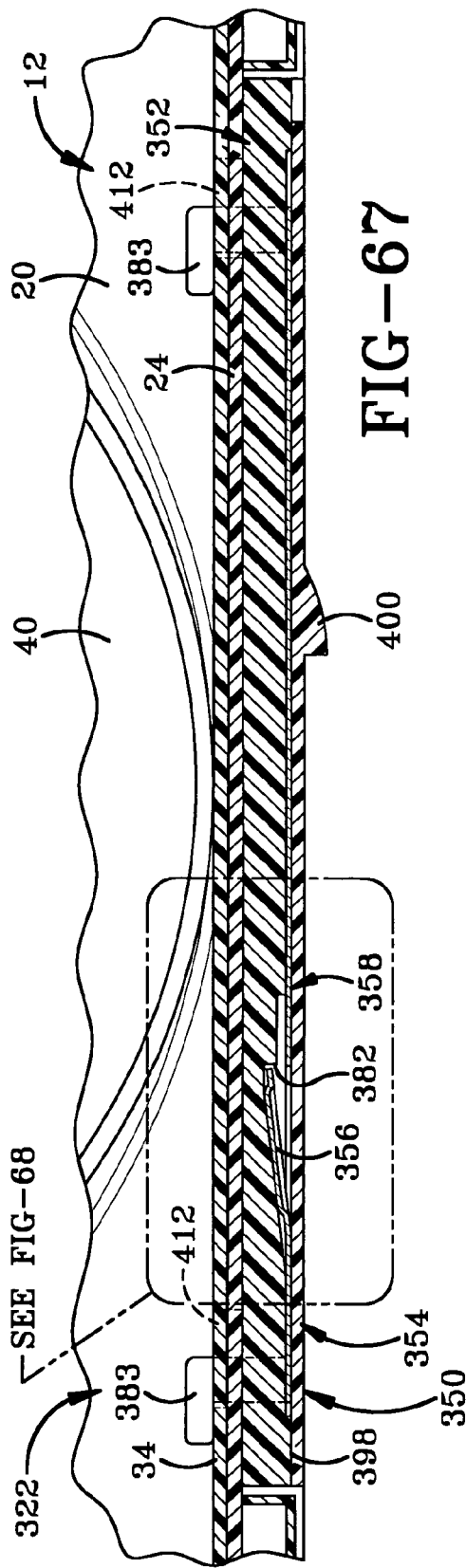
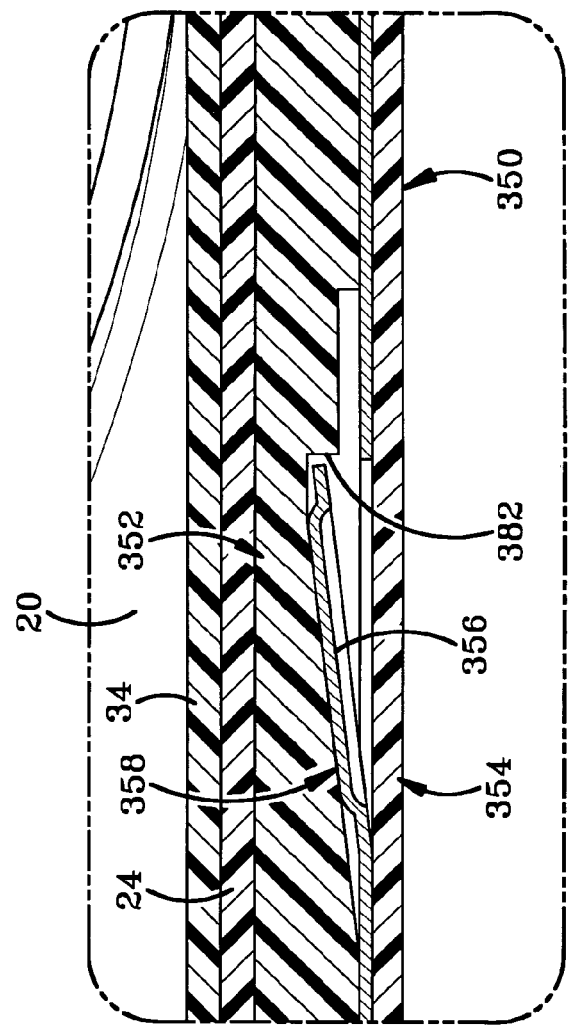

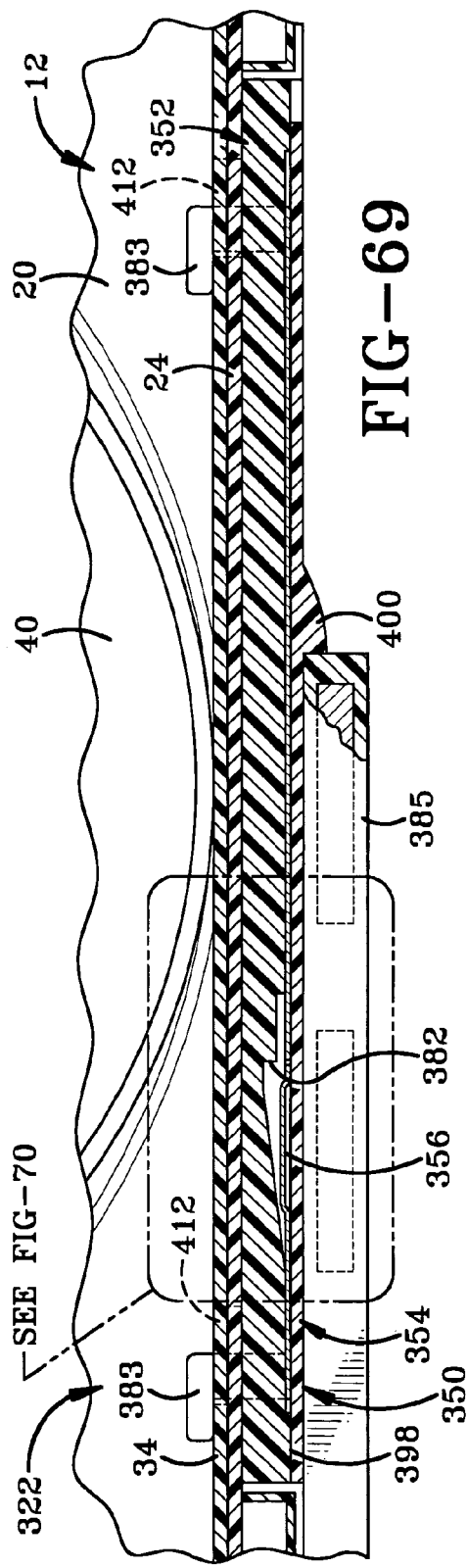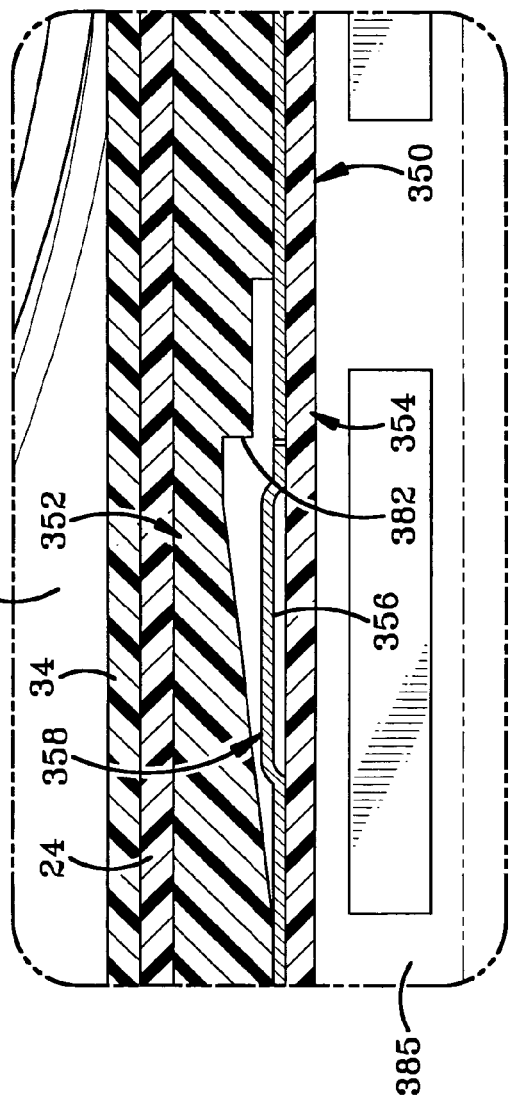

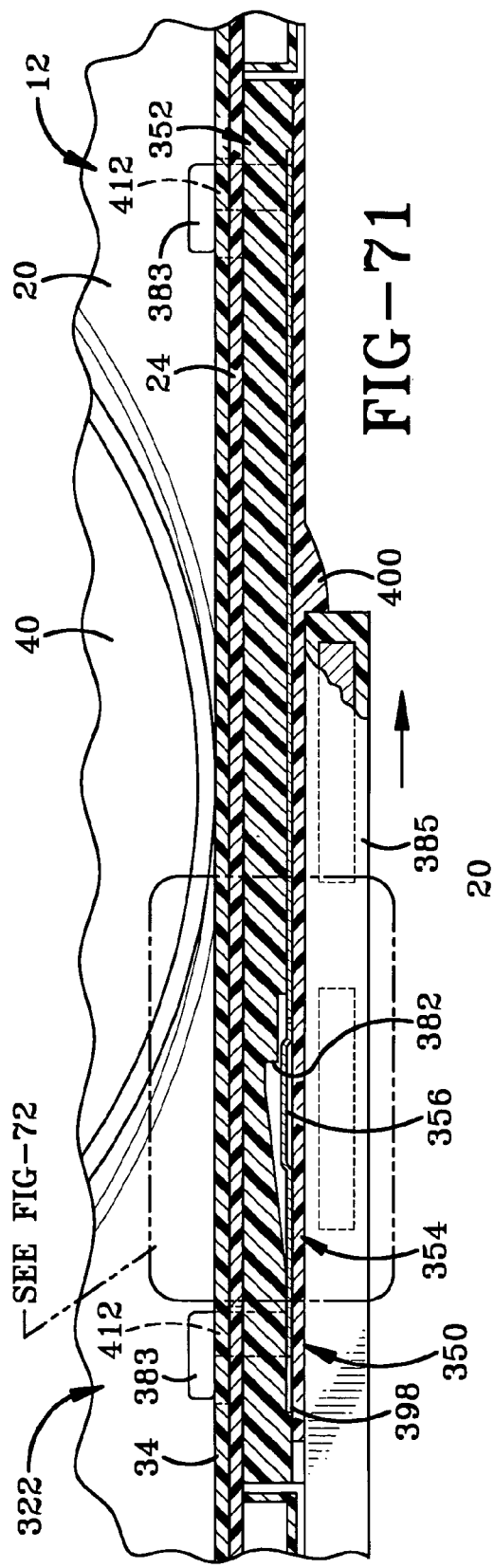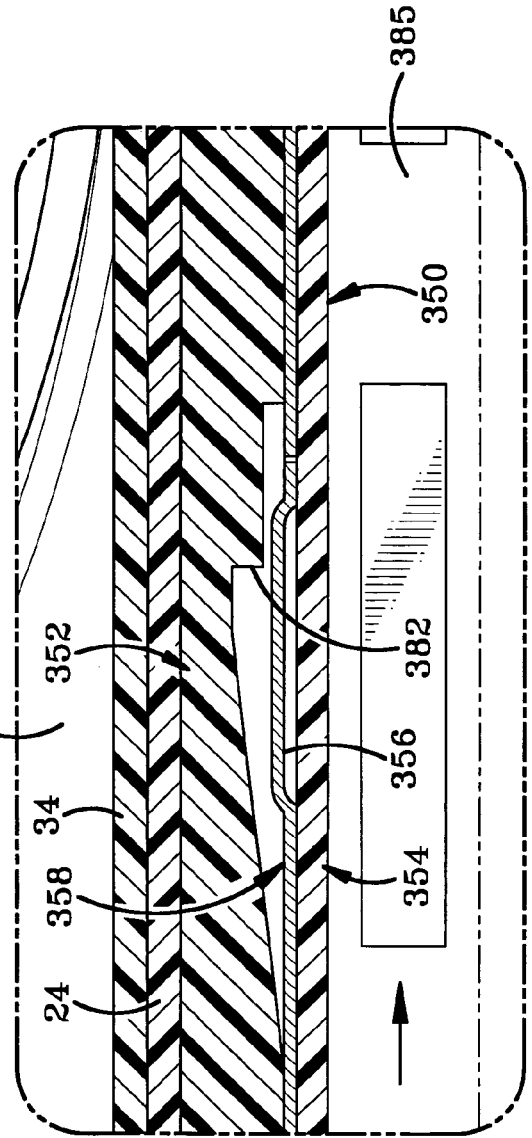

LOCKABLE MEDIA STORAGE CONTAINER

CROSS REFERENCE TO RELATED APPLICATION

This application is a continuation-in-part application claiming priority from U.S. patent application Ser. No. 10/310,263 filed Dec. 5, 2002 now abandoned, which claims priority from U.S. Provisional Patent Application Ser. No. 60/337,368 filed Dec. 5, 2001; the disclosures of both are incorporated herein by reference.

BACKGROUND OF THE INVENTION

1. Technical Field

The present invention generally relates to media storage containers and, more particularly, to lockable media storage containers. Specifically, the present invention relates to a lockable media storage container wherein the lock is disposed in the opening defined by the front walls of the lid and base.

2. Background Information

Renting and purchasing items of recorded media such as video cassettes and video games has become immensely popular in recent times given the ever increasing number of items available for home viewing and use as well as the decrease in price of the machines that play the media. Retail stores display the items of recorded media in the storage containers delivered from the manufacturer. Typical rental stores display the items available for rental in storage boxes that protect the items from dust, ultraviolet light, and damage from impact if accidentally dropped. Stores protect themselves against theft by placing one or more EAS tags on or inside the item of recorded media. An EAS tag is adapted to activate an alarm when passed through a sensing device that may be disposed around the exit of the store. It is generally desirable to place the EAS tags in places where they cannot be easily removed by a shoplifter.

A rental establishment typically places older rental stock out for sale when it no longer needs the item for rental. When items are put out for sale, the EAS tags are removed from the items and reused on items that are being rented. The EAS tags are removed from the items of recorded media prior to sale so that the purchaser will not activate the alarm systems in other stores with the EAS tags. Without the EAS tags in the items themselves, a rental store must protect itself against shoplifting by placing an EAS tag on the storage container holding the item for sale. It is desirable that the EAS tag be placed on the storage container in a way that allows a sales clerk to quickly and easily remove the tag after the sale is made but also in a manner that prevents a shoplifter from easily removing the tag. Placement of the EAS tag in such a position is, however, difficult because a storage container provides few, if any, areas where the EAS tag may be hidden. If the EAS tag is placed on the storage container in a fashion such that it can be easily removed, a shoplifter may simply remove the tag and steal the item without activating the alarm. It is thus desired in the art to provide a storage container suitable for holding and displaying an item of recorded media during display for rental that has locking holes that can later accept a lock containing an EAS tag when the container is used to sell an item.

Such a storage box and lock combination must be configured to prevent the thief from simply breaking the lock off the storage box with a small pry bar. Although the storage box and lock must be relatively strong, the cost of manufacturing the lock and storage box must not be prohibitive.

It is thus also desired in the art to provide a relatively inexpensive storage box and lock and key combination that securely locks the storage box while preventing a pry bar from being inserted between the lock and the storage box.

Retail stores desire the lock and EAS tag to be delivered to the store from the manufacturer. Retail stores also desire that the containers have the same footprint as containers without locks.

BRIEF SUMMARY OF THE INVENTION

The invention provides a lockable media storage container wherein the lock for the container is disposed within the lock reception cavity defined by the container. The lock may be moved from a locked position to an unlocked position while remaining disposed within the lock reception cavity. This configuration allows a clerk to unlock the lock and sell the unlocked lock and container to the customer who removes the lock after it is removed from the retail establishment.

In one embodiment, the invention provides a lock that locks itself in the unlocked position so that it cannot accidently move back into the locked position.

In one embodiment, the invention provides a lockable media storage container system having a media storage container that defines a lock reception cavity with a lock adapted to fit within the lock reception cavity; the lock movable between locked and unlocked positions. The lockable media storage container system includes a media storage container having a base and a lid that is movable between open and closed positions. The lock is movable from the locked position to the unlocked position while the lock is disposed within the lock reception cavity. The lock includes a plurality of lock hooks extending from a common lock frame. The lock also includes a lock finger that locks the lock in the locked position with the lock finger extending from the common lock frame. The common lock frame is movable between the locked and unlocked positions of the lock.

In another embodiment, the invention provides a lockable media storage container system that includes a media storage container having a base and a lid and a lock connectable to the container; the lock movable between locked and unlocked positions. The lock includes a lock base and a slide with the lock base being fixed with respect to the container when the lock is in the locked position. The lock includes plurality of lock hooks extending from the slide. The slide is movable with respect to the base between the locked and unlocked positions of the lock. The hooks engage the container when the lock is in the locked position to lock the lid in the closed position.

BRIEF DESCRIPTION OF THE SEVERAL VIEWS OF THE DRAWINGS

FIG. 3 is an exploded view of a first embodiment of the lock of the present invention.

FIG. 4 is a front perspective view of the first embodiment of the lock of the present invention in an assembled and locked position.

FIG. 5 is an exploded view of the first embodiment of the lock shown from the rear.

FIG. 6 is a rear perspective view of the first embodiment of the lock in the locked position.

FIG. 11 is a top view of the front portion of the lid of the locked media storage container of FIG. 10.

FIG. 15 is a front view of the media storage container showing the lock in the locked position disposed within the opening of the media storage container and covered by the thin layer of plastic.

FIG. 16 is a section view taken along line 16-16 of FIG. 15.

FIG. 17 is an enlarged view of the encircled portion of FIG. 16.

FIG. 20 is a view similar to FIG. 16 showing the lock being moved to the unlocked position.

FIG. 21 is an enlarged view of the encircled portion of FIG. 20.

FIG. 22 is a view similar to FIG. 16 showing the lock in the unlocked position with the magnet removed.

FIG. 23 is an enlarged view of the encircled portion of FIG. 22.

FIG. 24 is a view similar to FIG. 11 showing the lock in the unlocked position.

FIG. 30 is a top plan view of a second embodiment of a lockable media storage container.

FIG. 31 is an exploded view of a second embodiment of the lock of the present invention.

FIG. 32 is a front perspective view of the second embodiment of the lock of the present invention in an assembled and locked position.

FIG. 33 is an exploded view of the second embodiment of the lock shown from the rear.

FIG. 34 is a rear perspective view of the second embodiment of the lock in the locked position.

FIG. 35 is a perspective view of the lockable media storage container and the second embodiment of the lock showing the media storage container closed and the lock being aligned with the opening of the media storage container.

FIG. 40 is a perspective view similar to FIG. 37 showing the media storage container wrapped in a thin layer of plastic.

FIG. 43 is a section view taken along line 43-43 of FIG. 42.

FIG. 44 is an enlarged view of the encircled portion of FIG. 43.

FIG. 47 is a view similar to FIG. 43 showing the lock being moved to the unlocked position.

FIG. 48 is an enlarged view of the encircled portion of FIG. 47.

FIG. 49 is a view similar to FIG. 43 showing the lock in the unlocked position with the magnet removed.

FIG. 50 is an enlarged view of the encircled portion of FIG. 49.

FIG. 53 is a perspective view of the media storage container with the thin layer of plastic removed and the handle of the lock being pulled out so that the handle may be used to remove the lock from the storage container.

FIG. 56 is an exploded view of a third embodiment of the lock of the present invention.

FIG. 57 is a front perspective view of the third embodiment of the lock of the present invention.

FIG. 58 is an exploded view of the third embodiment of the lock shown from the rear.

FIG. 59 is a rear perspective view of the third embodiment of the lock.

FIG. 60 is a perspective view of the lockable media storage container and the third embodiment of the lock showing the media storage container closed and the lock being aligned with the opening of the media storage container.

FIG. 63 is a top view of the front portion of the locked media storage container of FIG. 62 with the lid removed to show the unlocked position of the lock.

FIG. 65 is a top view of the front portion of the locked media storage container of FIG. 62 with the lid removed to show the locked position of the lock.

FIG. 66 is a perspective view showing the lock installed in the lock reception cavity of the media storage container with the lock in the locked position.

FIG. 67 is a section view taken through the lock and container.

FIG. 68 is an enlarged view of the encircled portion of FIG. 67.

FIG. 69 is a view similar to FIG. 67 showing a magnet being positioned adjacent the lock to move the magnetic lock finger from a locked position to an unlocked position.

FIG. 70 is enlarged view of the encircled portion of FIG. 69.

FIG. 71 is a view similar to FIG. 69 showing the lock being moved to the unlocked position.

FIG. 72 is an enlarged view of the encircled portion of FIG. 71.

Similar numbers refer to similar parts throughout the specification.

DETAILED DESCRIPTION OF THE INVENTION

Figure 8:
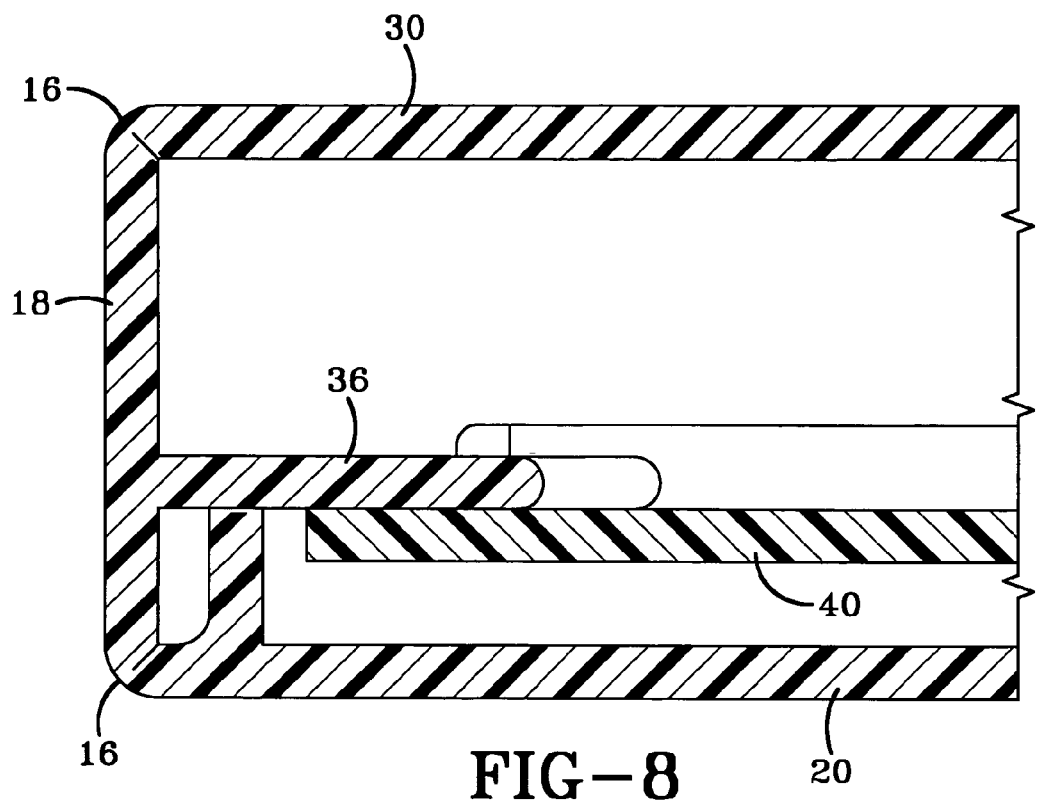
FIG. 8 is a section view taken along line 8-8 of FIG. 7.
Figure 9:
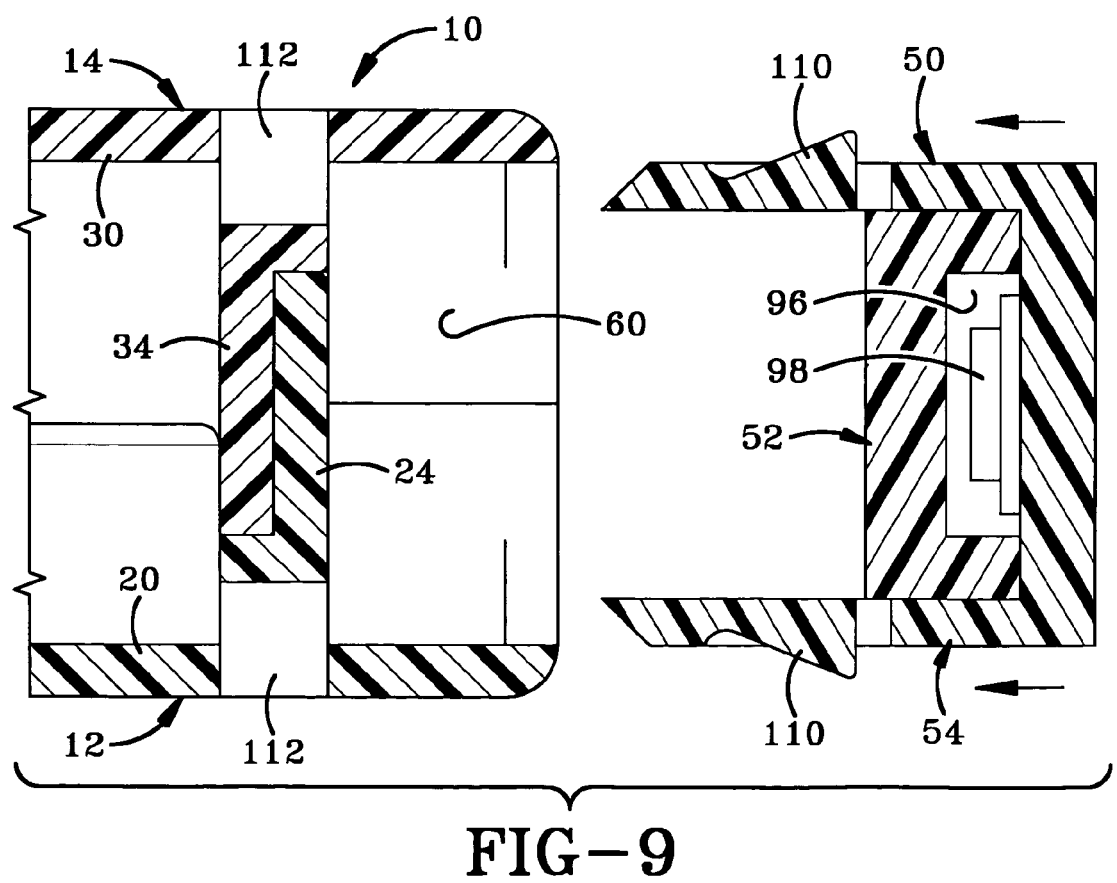
FIG. 9 is a section view taken along line 9-9 of FIG. 7.

The first embodiment of the lockable media storage container system of the invention is indicated by the numeral 8 and includes container 10 and lock 50. The lockable media storage container of the present invention is indicated generally by the numeral 10 in the accompanying drawings. Media storage container 10 generally includes a base 12 that is connected to a lid 14 by an appropriate hinge. In the exemplary embodiment, the hinge includes a pair of living hinges 16 that are separated by hinge wall 18. Base 12 generally includes a bottom wall 20 with a pair of opposed sidewalls 22 projecting out from bottom wall 20. A front wall 24 extends across the edge of bottom wall 20 between the ends of sidewalls 22 opposite the hinge. Similarly, lid 14 includes a top wall 30 and a pair of opposed sidewalls 32 that project from top wall 30. A front wall 34 extends along the edge of top wall 30 between the ends of sidewalls 32 opposite the hinge. Sidewalls 32 are designed to slide within sidewalls 22 when lid 14 is closed so that container 10 has a double wall thickness when it is closed. Front walls 24 and 34 may also form a double thick front wall of container 10 if the double wall thickness is desired. In some embodiments, front walls 24 and 34 simply abut each other to define a single-thickness front wall. A tab 36 projects outwardly from hinge wall 18 so that it will cover a portion of the item of recorded media 40 when lid 14 is closed as depicted in FIG. 8. This helps prevent item 40 from falling off of hub 42 when container 10 is shaken or dropped.

A lock 50 is used to lock container 10 in a closed and locked configuration. Lock 50 generally includes a lock base 52, a lock slide 54, and at least one lock finger 56. In the exemplary embodiment, lock 50 includes a pair of lock fingers 56 that resiliently project from a common lock frame 58. In the exemplary embodiment, lock fingers 56 are fabricated from a magnetically attractable material so that lock fingers 56 may be moved from a locked position to an unlocked position with the influence of a magnetic field.

Figure 1:
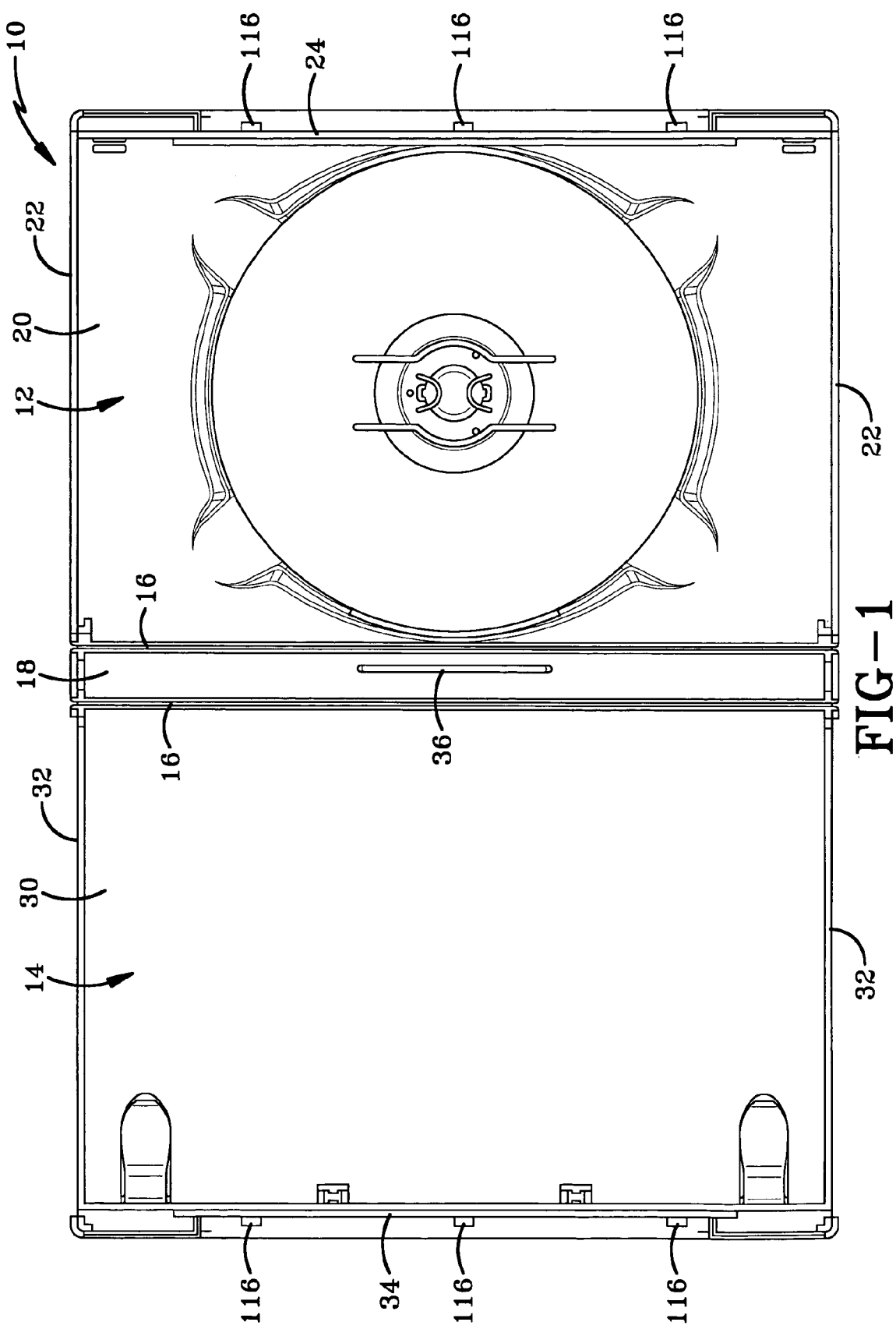
FIG. 1 is a top plan view of the lockable media storage container of the present invention in an open configuration.
Figure 2:
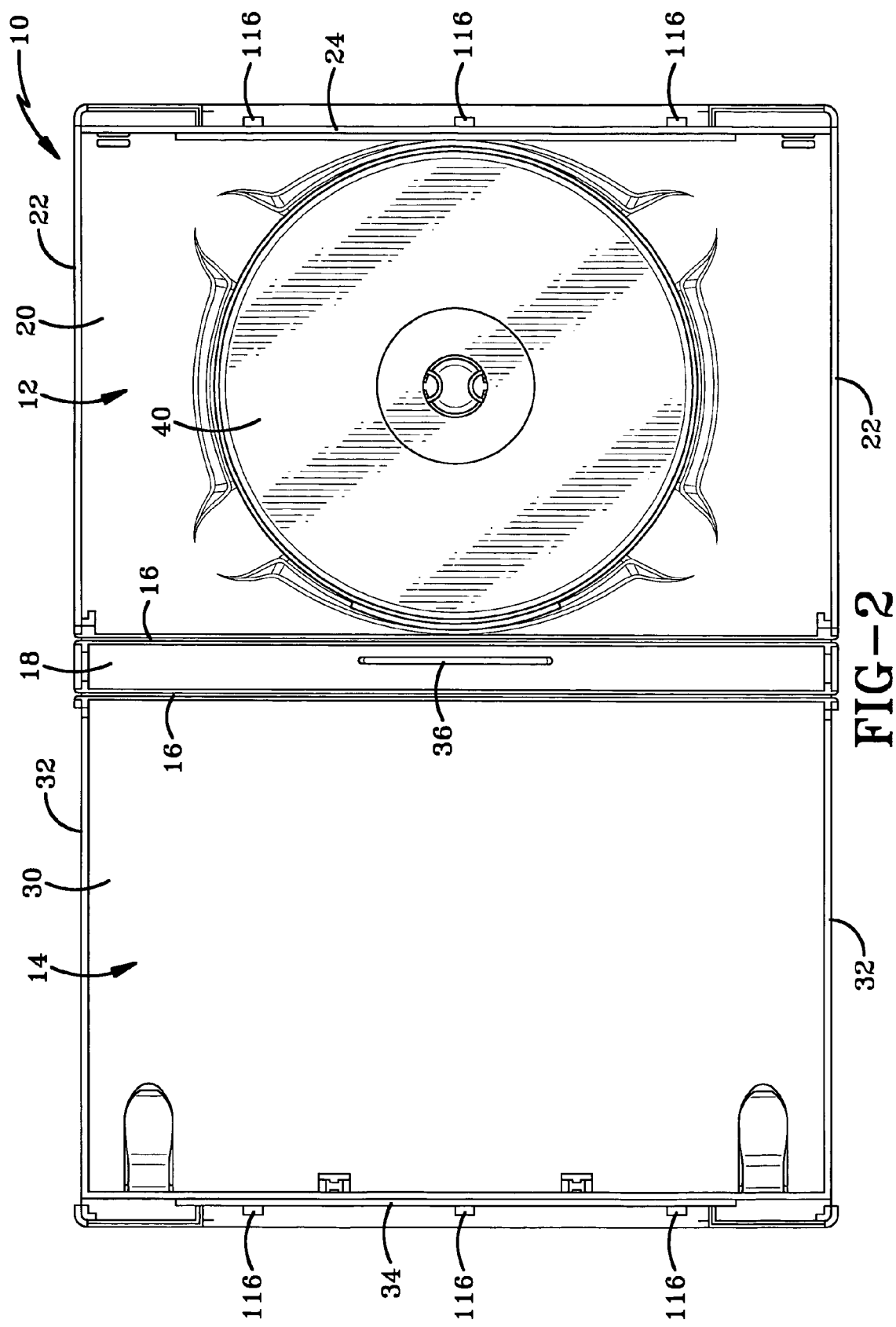
FIG. 2 is a view similar to FIG. 1 with a disc disposed on the hub of the media storage container.
Figure 10:
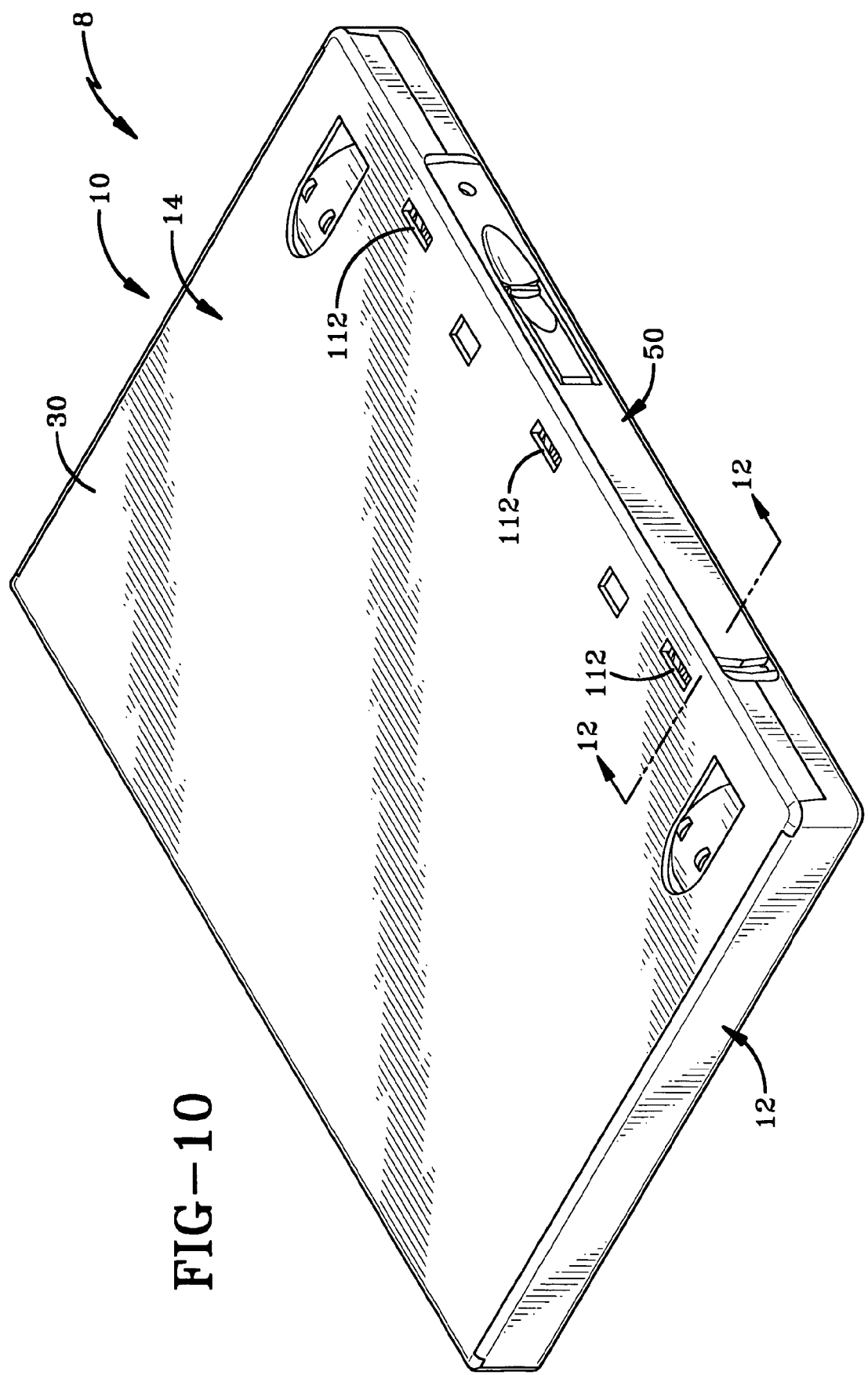
FIG. 10 is a perspective view showing the lock installed in the lock reception cavity of the media storage container with the lock in the locked position.
Figure 12:
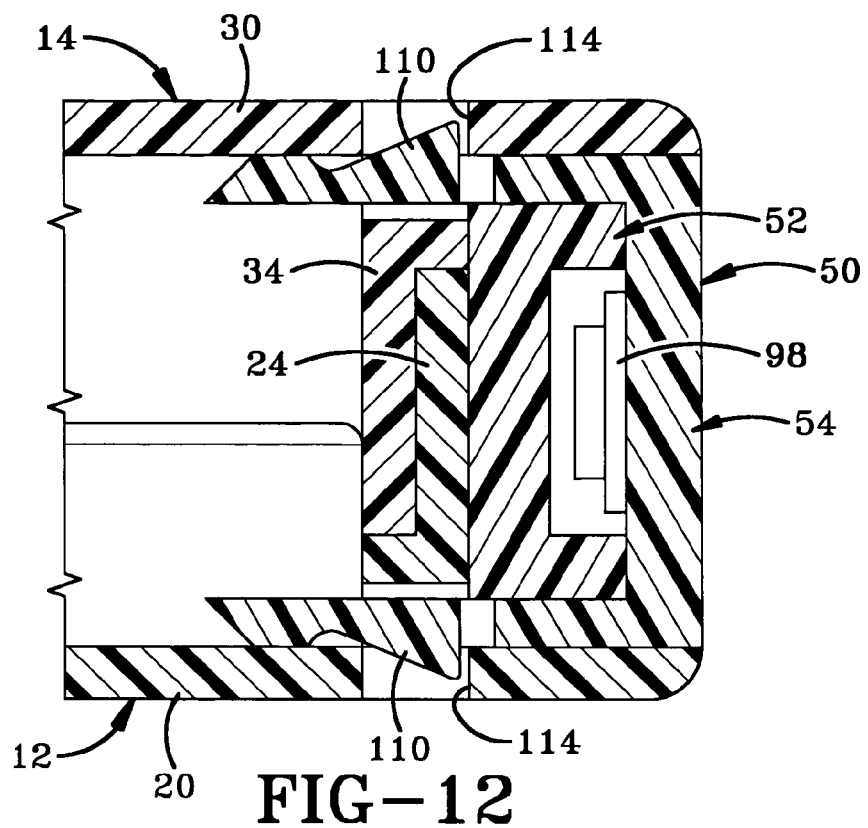
FIG. 12 is a section view taken along line 12-12 of FIG. 10.
Figure 14:
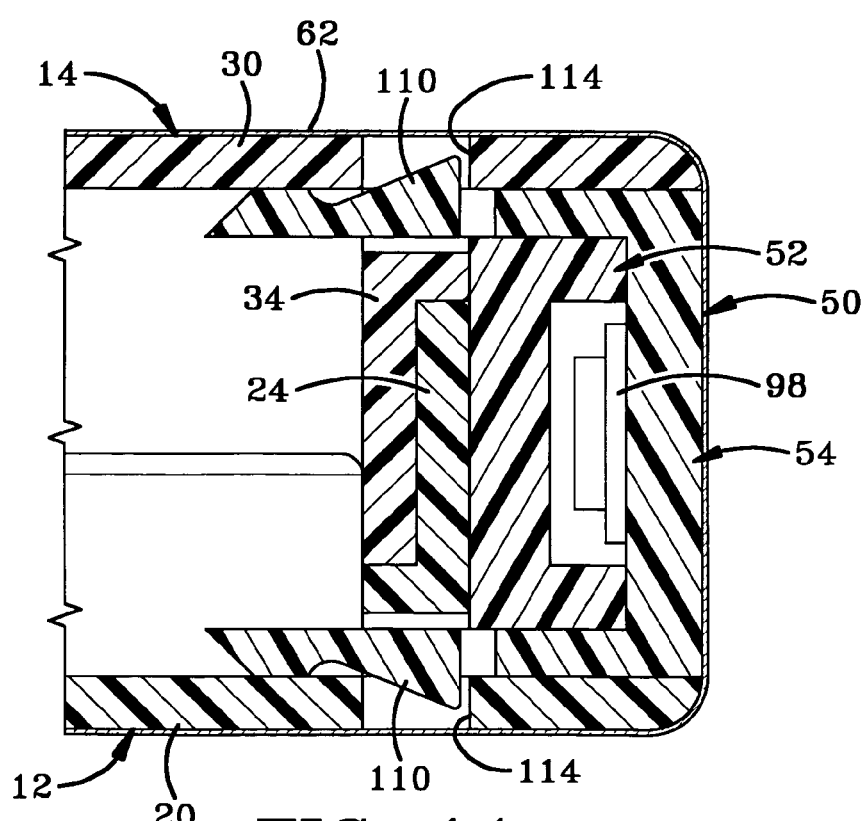
FIG. 14 is a section view taken along line 14-14 of FIG. 13.
Figure 13:
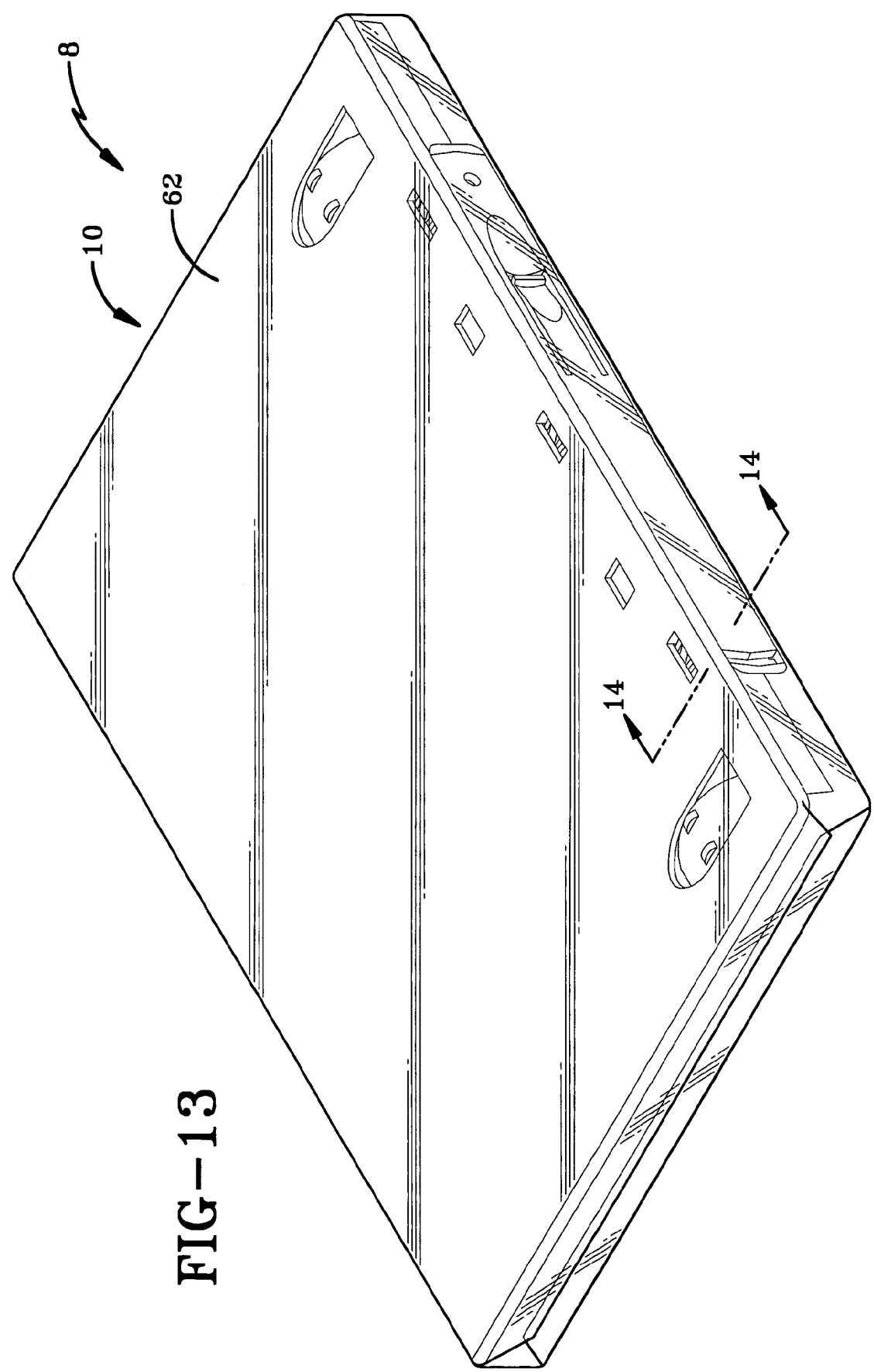
FIG. 13 is a perspective view similar to FIG. 10 showing the media storage container wrapped in a thin layer of plastic.

Before explaining and describing all of the structural elements of container 10 and lock 50, the Applicants will describe how lock 50 is used with container 10. In FIG. 1, container 10 is open and item of recorded media 40 has not yet been placed in container 10. Container 10 may be on the initial portion of an automated assembly line that loads container 10. In FIG. 2, item 40 has been placed on retaining hub 42. At this time, printed literature may also be loaded into lid 14. The user then closes lid 14 and aligns lock 50 with the concave opening or lock reception cavity 60 defined by the front of container 10. Lock 50 is then inserted into lock reception cavity 60 as depicted in FIG. 10. In FIG. 10, lock 50 is in the locked position and is securely holding lid 14 to base 12 such that container 10 cannot be opened until lock 50 is moved to the unlocked position and removed from container 10. Container 10 and lock 50 may then be wrapped by a thin plastic layer 62 as depicted in FIG. 13. Such a layer is commonly referred to as a shrink wrapped layer in the art.

Container 10 and lock 50 may then be shipped to a retail establishment for display and sale to a consumer. The consumer may view the front and rear panel of container 10 without an interference from lock 50. Lock 50 further does not interfere with the spine (the outer surface of hinge panel 18) when lock 50 is locking container 10. A shoplifter cannot readily access item 40 without severely damaging container 10 and drawing attention to himself in the process.

The consumer who wishes to purchase container 10 takes lock container 10 to the retail establishment clerk who charges the consumer the appropriate amount of money for container 10 and item 40. Without removing the shrink wrap, the clerk unlocks lock 50 and gives container 10 and lock 50 back to the purchaser. The clerk can unlock lock 50 without damaging the shrink wrap by placing a magnet in the appropriate location next to lock 50 and moving lock slide 54 to the unlocked position. An appropriate mechanism holds lock slide 54 in the unlocked position so that it cannot accidently return to the locked position as shown in FIG. 23.

Figure 26:
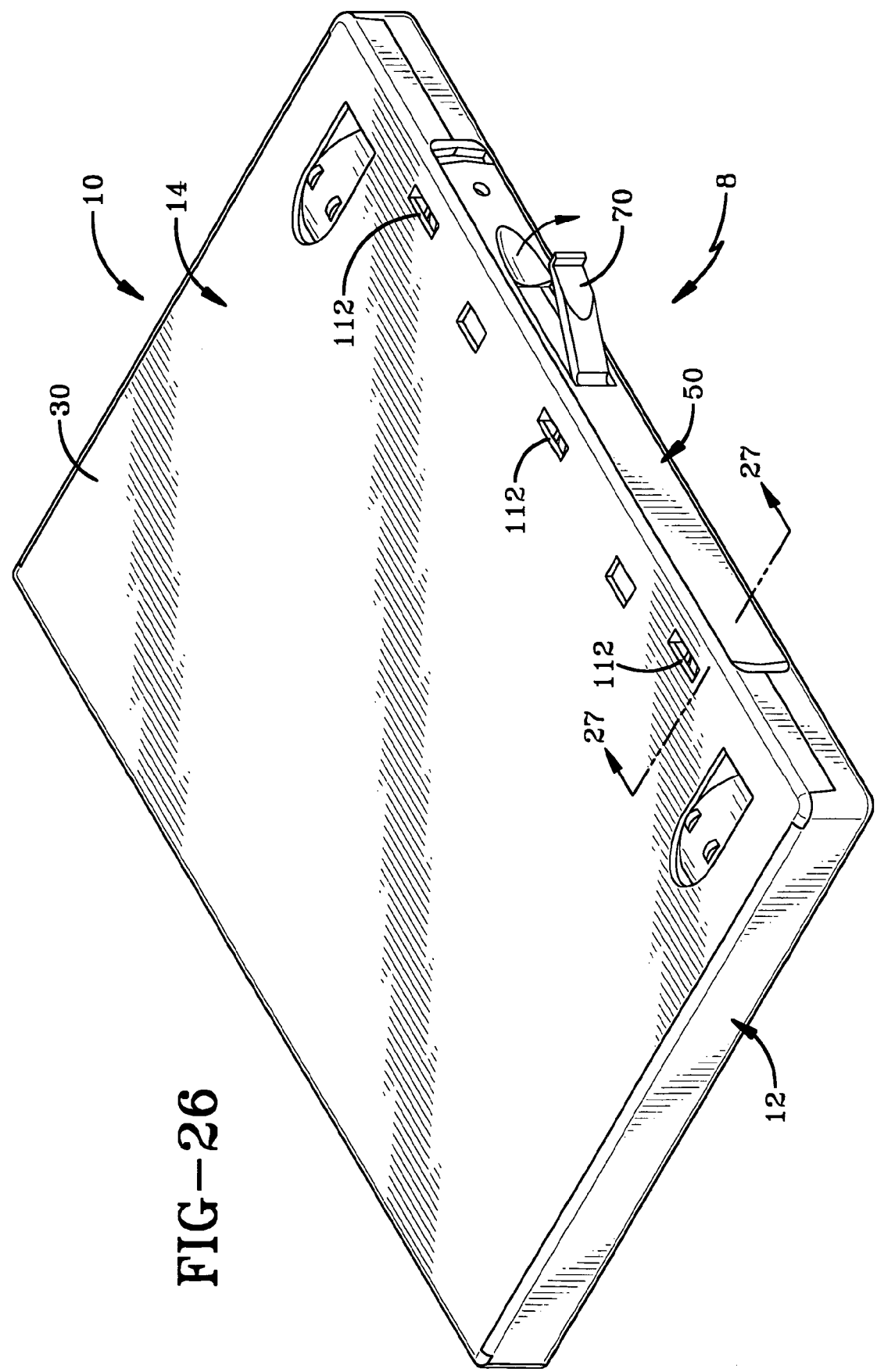
FIG. 26 is a perspective view of the media storage container with the thin layer of plastic removed and the handle of the lock being pulled out so that the handle may be used to remove the lock from the storage container.

The consumer then leaves the retail establishment with lock 50 in the unlocked position under the layer of shrink wrap. The consumer may then remove the shrink wrap and pull lock 50 from container 10 as shown in FIG. 26. To facilitate the removal of lock 50, a handle 70 is provided in lock 50. Handle 70 may be pivoted outwardly as depicted in FIG. 26 to provide a grip for the user's finger and thumb. The user pulls on handle 70 until lock 50 is removed from container 10. The user then discards lock 50 and enjoys item of recorded media 40. The concepts of the present invention may also be used without shrink wrap layer 62. Having now described the concepts of the invention and the methods in which lock 50 and container 10 are used, the Applicant will now describe the structural features shown in the accompanying drawings.

As described above, lock 50 generally includes a lock base 52 and a lock slide 54 that are depicted in FIGS. 3-6. Lock slide 54 is selectively moveable between a locked position and an unlocked position. Locking finger 56 prevents lock slide 54 from moving from the locked position to the unlocked position when lock finger 56 is in the locked position. In its locked position, lock finger 56 engages both lock slide 54 and lock base 52 to prevent the two items from moving relative to one another. Protrusions 80 extend from the inner surface of lock slide 54 to engage common frame 58 to prevent frame 58 from moving longitudinally and laterally with respect to lock slide 54. Some of protrusions 80 may extend into a central portion of frame 58 while others of protrusions 80 may engage the end surface of frame 58. FIG. 3 shows the locking ledges 82 on which fingers 56 engage when fingers 56 are in the locked position. Ledges 82 may also be seen in FIG. 16.

Base 52 further defines a secondary locking ledge 84 that is disposed in the opposite direction of ledges 82. Ledge 84 is engaged by a holding member 86 that may be in the form of a resilient locking finger similar to locking fingers 56. Holding finger 86 may project from common frame 58 as depicted in FIG. 5. Holding finger 86 is used to hold lock slide 54 in the unlocked position by engaging ledge 84 as depicted in FIGS. 22 and 23.

Figure 18:
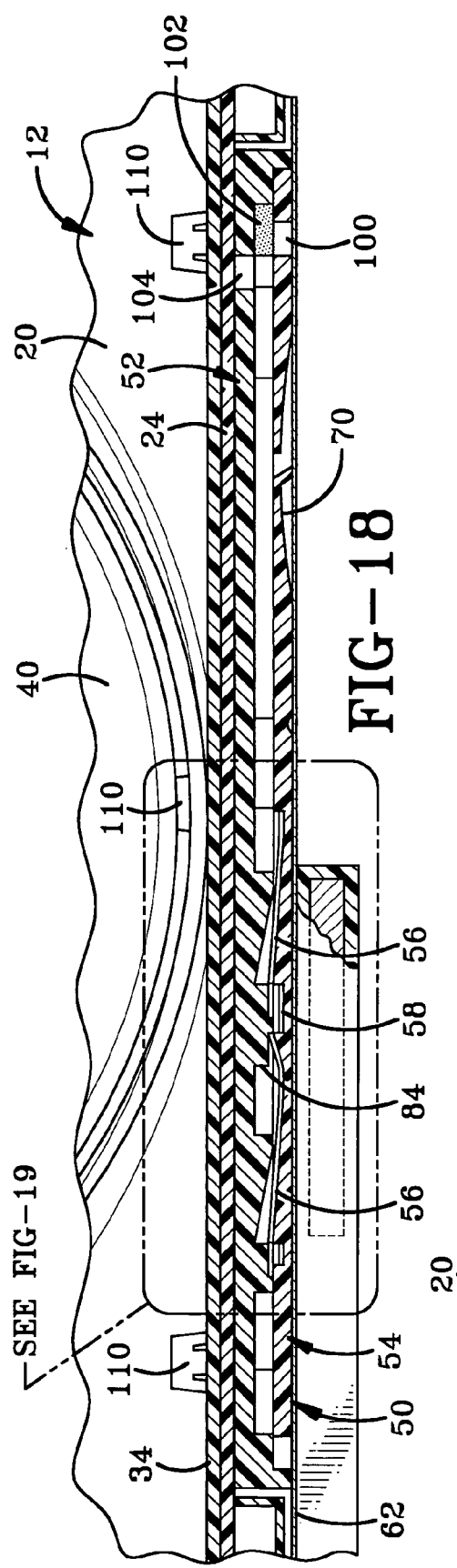
FIG. 18 is a view similar to FIG. 16 showing a magnet being positioned adjacent the lock to move the magnetic lock fingers from a locked position to an unlocked position.
Figure 19:
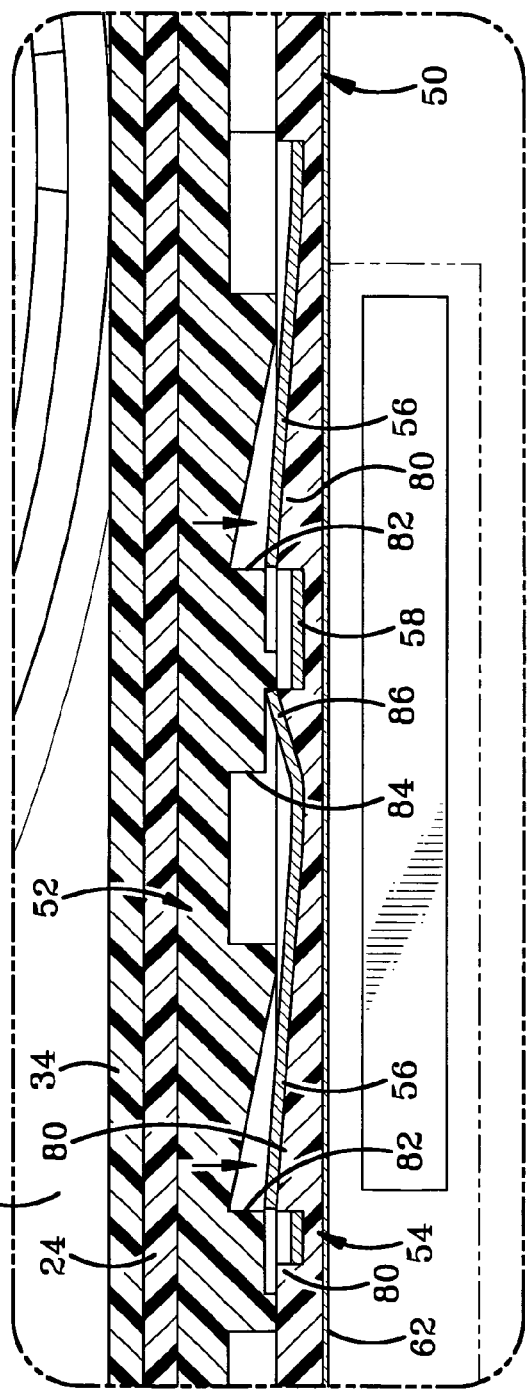
FIG. 19 is enlarged view of the encircled portion of FIG. 18.
Figure 25:
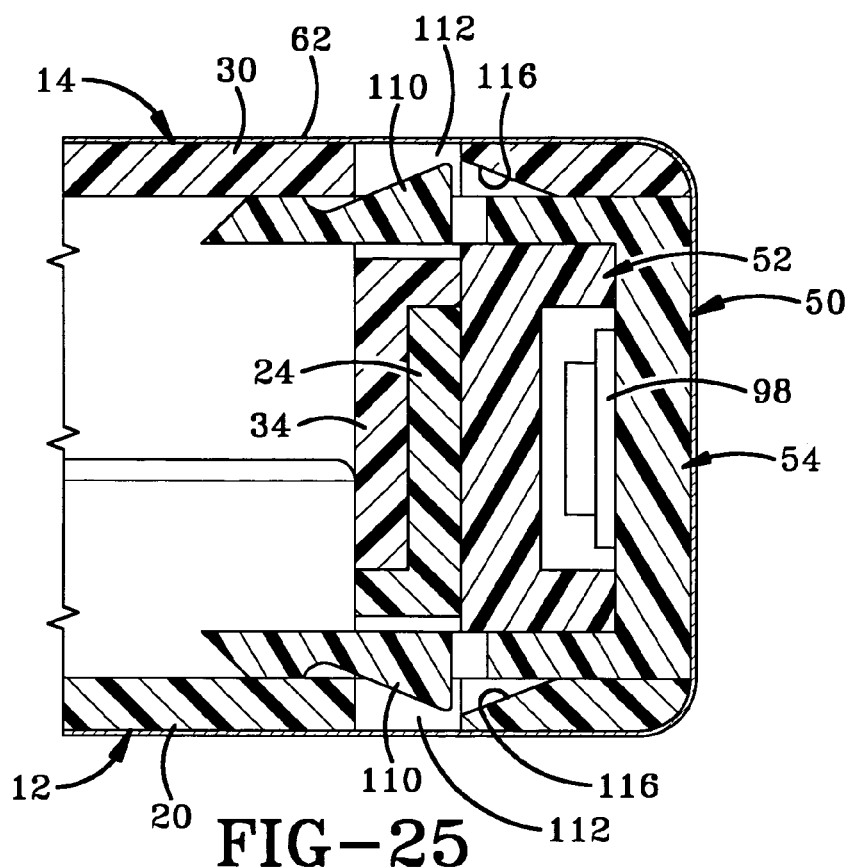
FIG. 25 is a section view taken along line 25-25 of FIG. 24.
Figure 27:
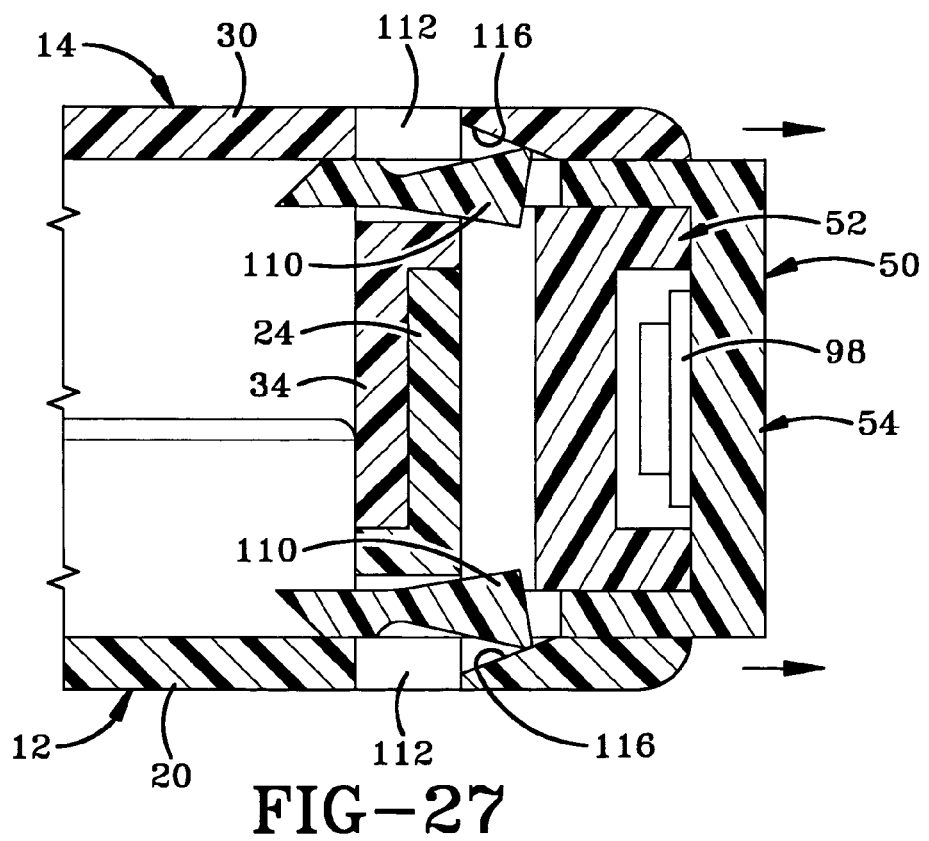
FIG. 27 is a section view taken along line 27-27 of FIG. 26.

Lock slide 54 is connected to lock base 52 by appropriate connectors 90 that allow lock slide 54 to move between the locked position of FIG. 18 and the unlocked position of FIG. 20. Members 90 may be received in a one-way snap fit connection by ledges 92 defined by the body of lock base 52 as shown in FIGS. 3 and 5. An opening 94 may provide access to each ledge 92 so that members 90 may engage ledges 92. Base 52 and slide 54 cooperate to define an EAS tag-reception cavity 96 that is sized to receive an EAS tag 98. Slide 54 may define a indicator opening 100 that aligns with an indicator 102. Indicator 102 is colored substantially different from the color of lock slide 54 so that its color can be viewed through opening 100 when lock slide 54 is in the locked position. When lock slide 54 is moved to the unlocked position, indicator 102 is no longer visible through opening 100 thus providing an indication that lock 50 is unlocked. A different color indicator 104 may be provided if desired. For example, indicator 102 may be red and indicator 104 may be white with lock slide 54 being black. When red is visible through opening 100, the user will understand that lock 50 is in the locked position. When white is visible through opening 100, the user will understand that lock 50 is in the unlocked position. In some embodiments, opening 100 may also be used to force lock slide 54 from the locked position to the unlocked position when locking fingers 56 are in their unlocked position. In the exemplary embodiment of the invention, lock slide 54 is moved from the locked position to the unlocked position by using the magnetic force that moves lock fingers 56 from their locked position to their unlocked position.

Figure 7:
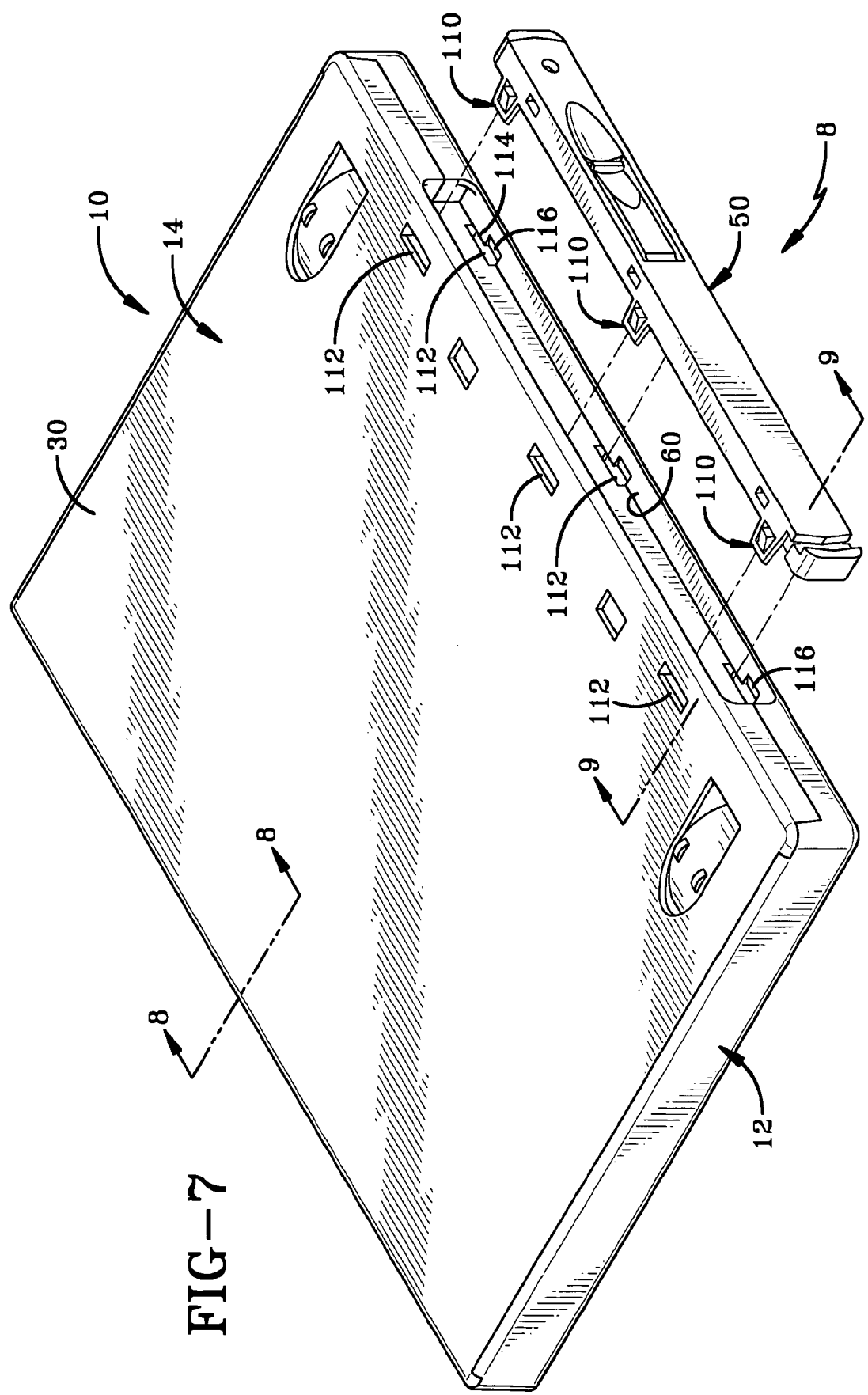
FIG. 7 is a perspective view of the lockable media storage container and the first embodiment of the lock showing the media storage container closed and the lock being aligned with the opening of the media storage container.

Lock slide 54 includes container locking fingers 110. Container locking fingers 110 are adapted to hold lock 50 on container 10 in a secure manner that prevents lock 50 from being removed from container 10 until lock slide 54 is in the unlocked position. Container 10 thus defines finger openings 112 as shown in FIG. 10. In the exemplary embodiment, lock 50 includes six container locking fingers 110 that are received in three openings 112 defined by top wall 30 and three openings 112 defined by bottom wall 20. FIG. 7 shows the front portion of openings 112 wherein each opening 112 is defined by a locking ledge 114 and an unlocking ramp 116. Ledges 114 and 116 are adjacent bottom wall 20 and top wall 30 and are disposed adjacent lock reception cavity 60. Ledges 114 are positioned to engage container locking fingers 110 when lock 50 is in the locked configuration depicted in FIG. 7. Each container locking finger 110 includes a resilient locking finger that engages ledge 114 in a one-way snap fit connection when lock 50 is moved into lock reception cavity 60 as depicted in FIG. 10. When lock slide 54 is moved to the unlocked position, fingers 110 are moved over to be aligned with unlocking ramp 116. Ramps 116 allow fingers 110 to move back out of container 10 thus allowing lock 50 to be removed from container 10. These two positions are depicted in FIGS. 11 and 24.

Figure 28:
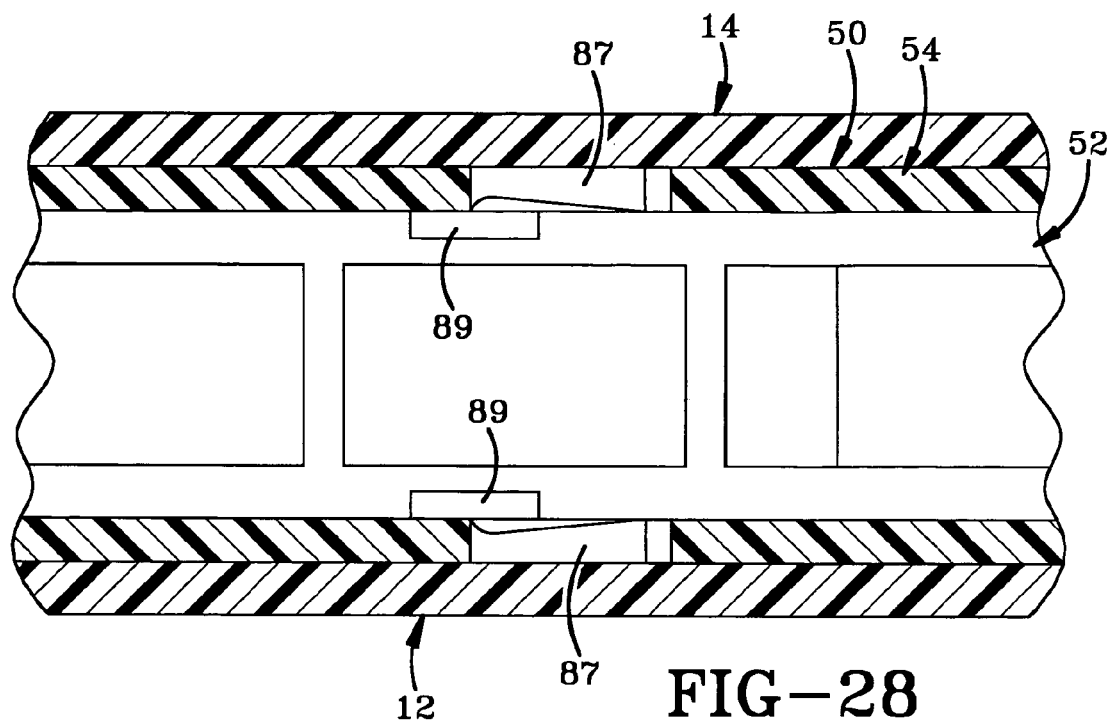
FIG. 28 is a section view showing an alternative locking finger arrangement that may be used to hold the lock in the unlocked position.
Figure 29:
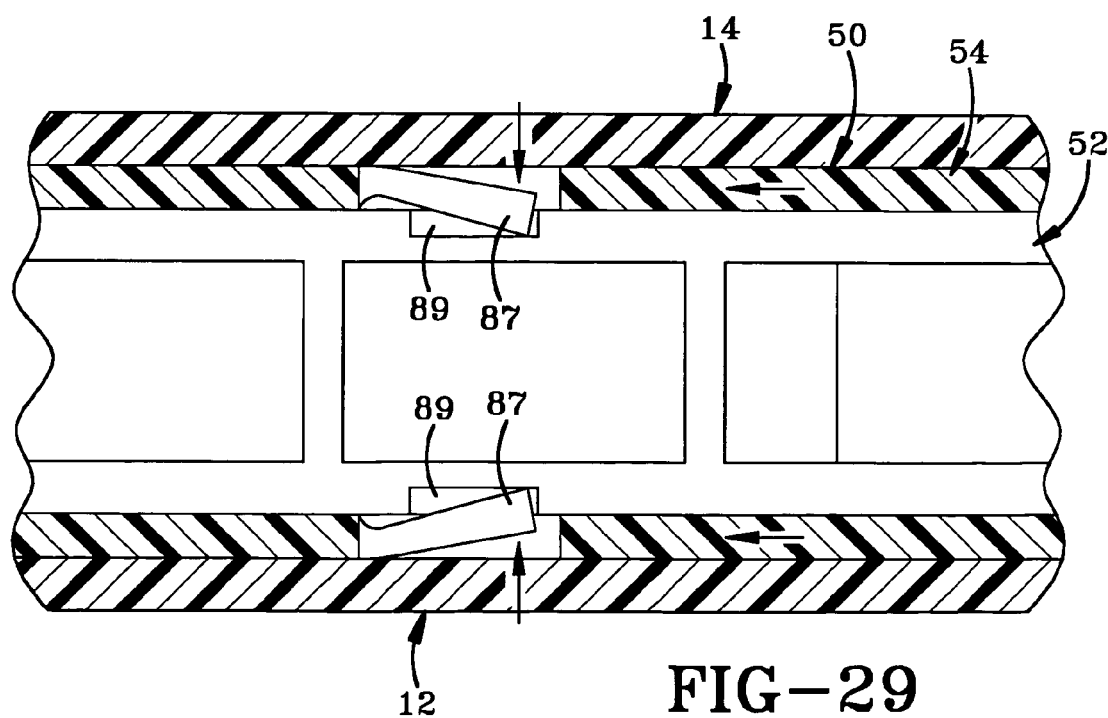
FIG. 29 is a view similar to FIG. 28 showing the alternative locking arrangement holding the lock in the unlocked position.
Figure 36:
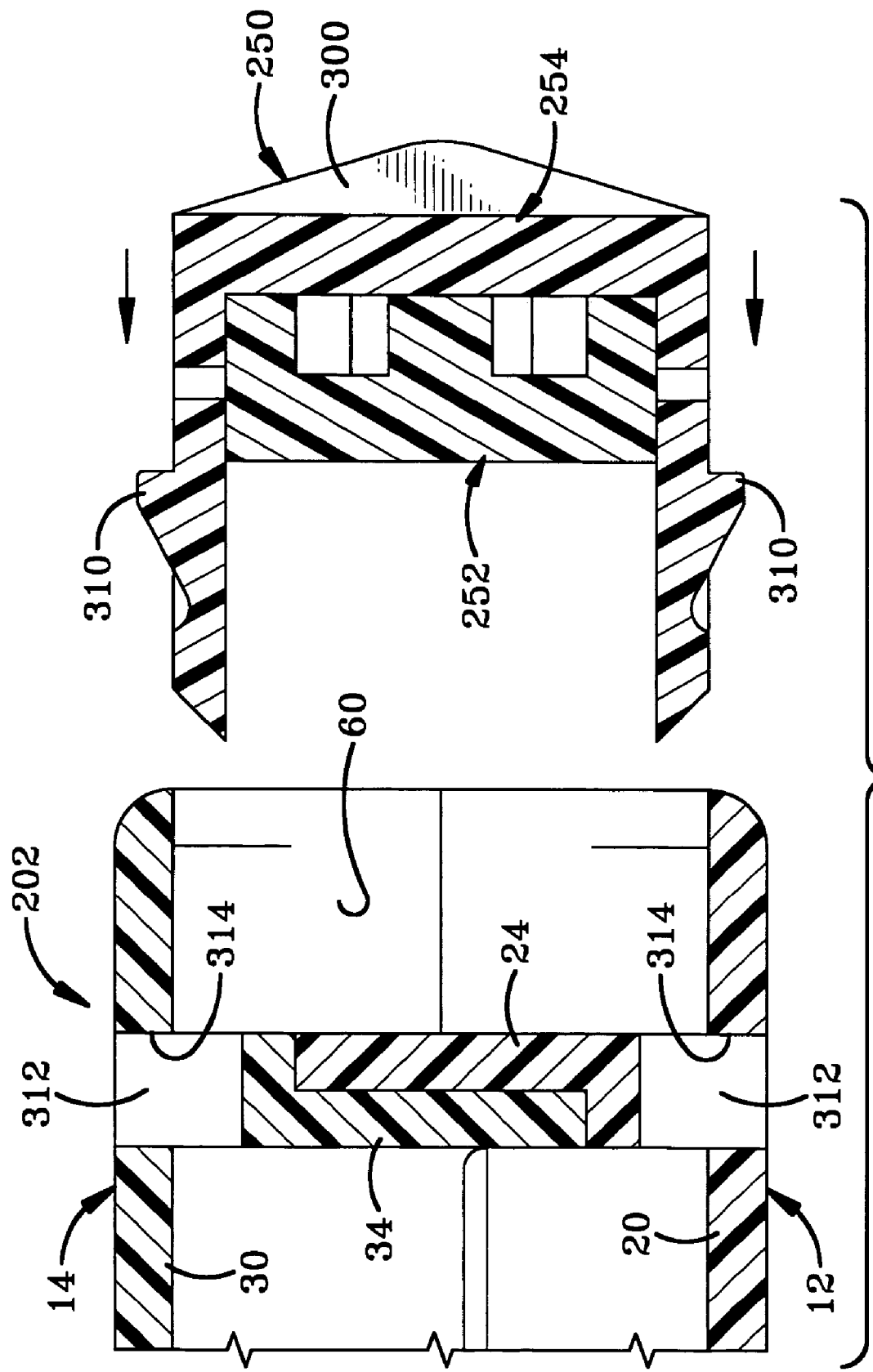
FIG. 36 is a section view taken along line 36-36 of FIG. 35.

FIGS. 28 and 29 show an alternative mechanism for holding lock slide 54 in the unlocked position. In the embodiment of FIGS. 28 and 29, resilient barbs 87 are connected to one of lock slide 54 and lock base 52 with the other of lock slide 54 and lock base 52 defining openings 89 that receive barbs 87 when lock slide 54 is moved to the unlocked position. Barbs 87 prevent lock slide 54 from moving back to the locked position.

The second embodiment of the lockable media storage container system of the invention is indicated by the numeral 200 and includes container 202 and lock 250. The second embodiment of the lockable media storage container of the present invention is indicated generally by the numeral 202 in the accompanying drawings. The elements of media storage container 202 are similar to container 10 and the same reference numbers are used to identify these elements.

A lock 250 is used to lock container 202 in a closed and locked configuration. Lock 250 generally includes a lock base 252, a lock slide 254, and at least one lock finger 256. In the exemplary embodiment, lock 250 includes a single lock finger 256 that resiliently projects from a lock frame 258. In the exemplary embodiment, lock finger 256 is fabricated from a magnetically attractable material so that lock finger 256 may be moved from a locked position to an unlocked position with the influence of a magnetic field.

Figure 37:
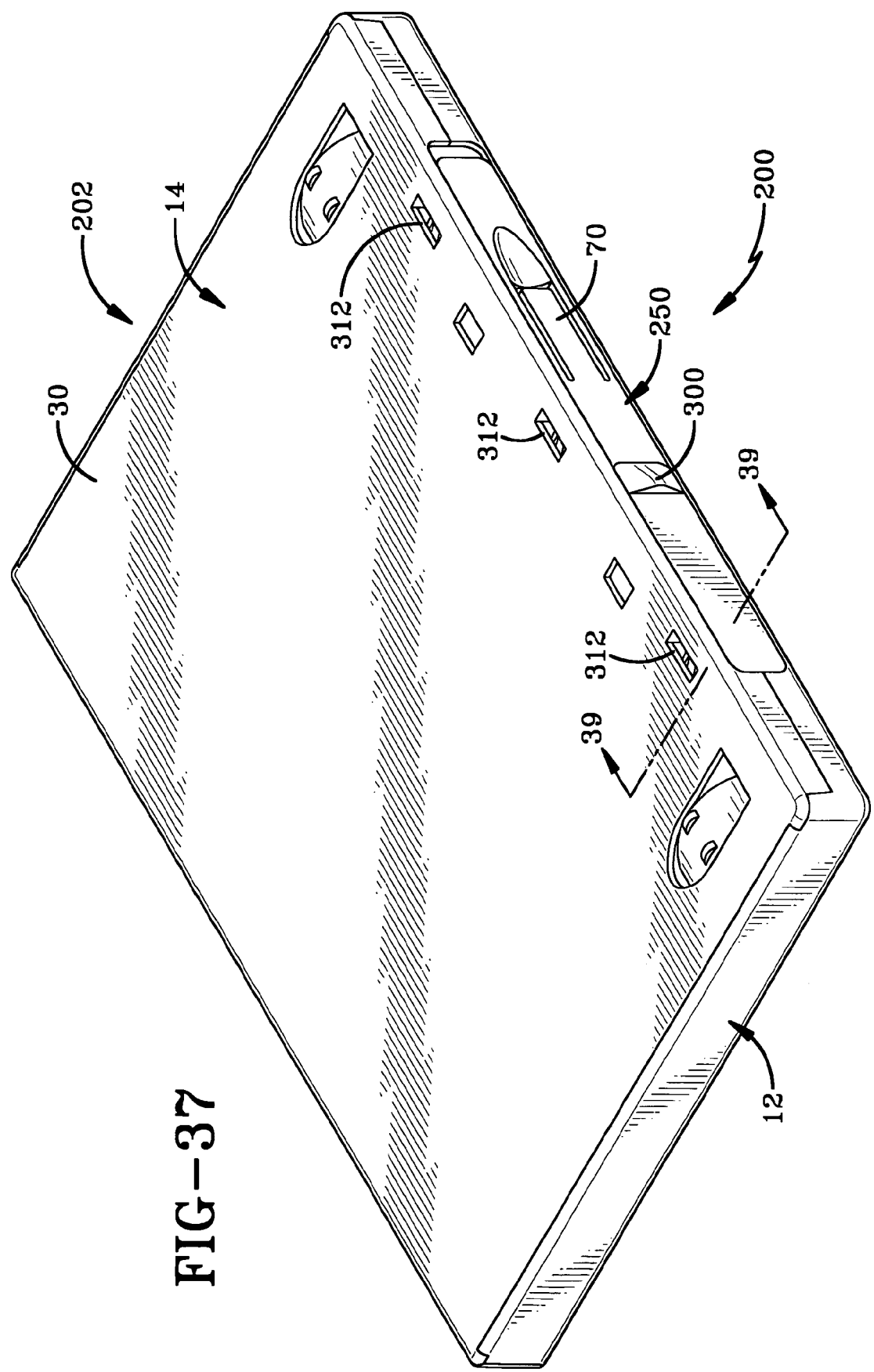
FIG. 37 is a perspective view showing the lock installed in the lock reception cavity of the media storage container with the lock in the locked position.
Figure 41:
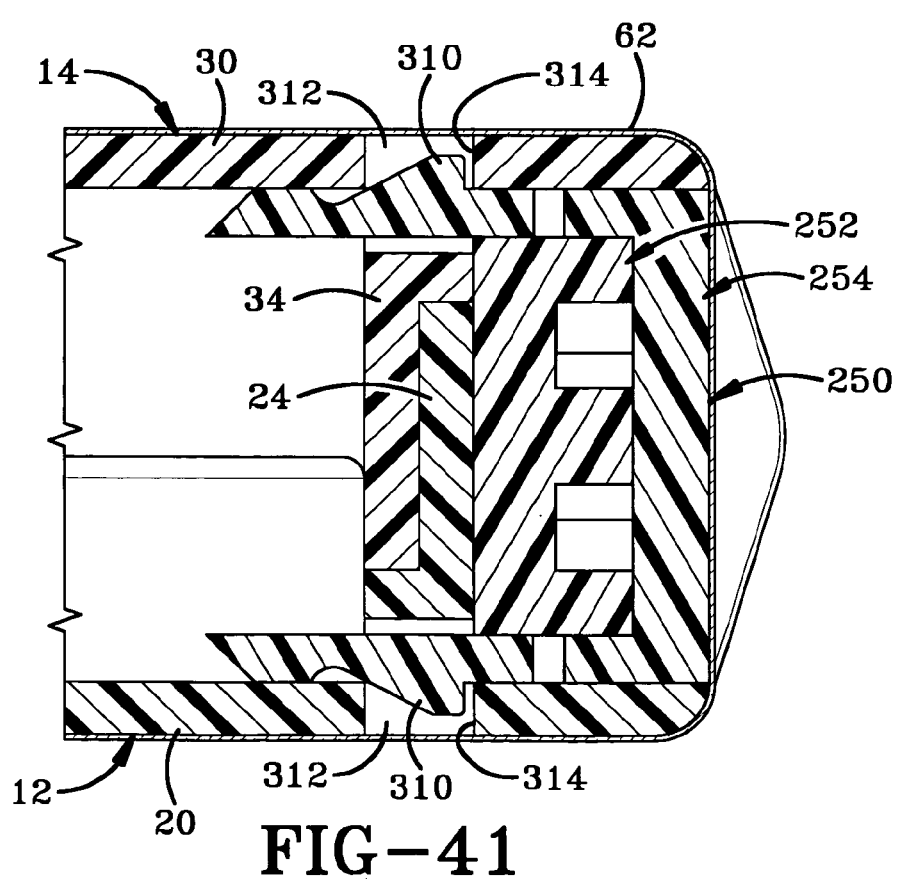
FIG. 41 is a section view taken along line 41-41 of FIG. 40.
Figure 45:
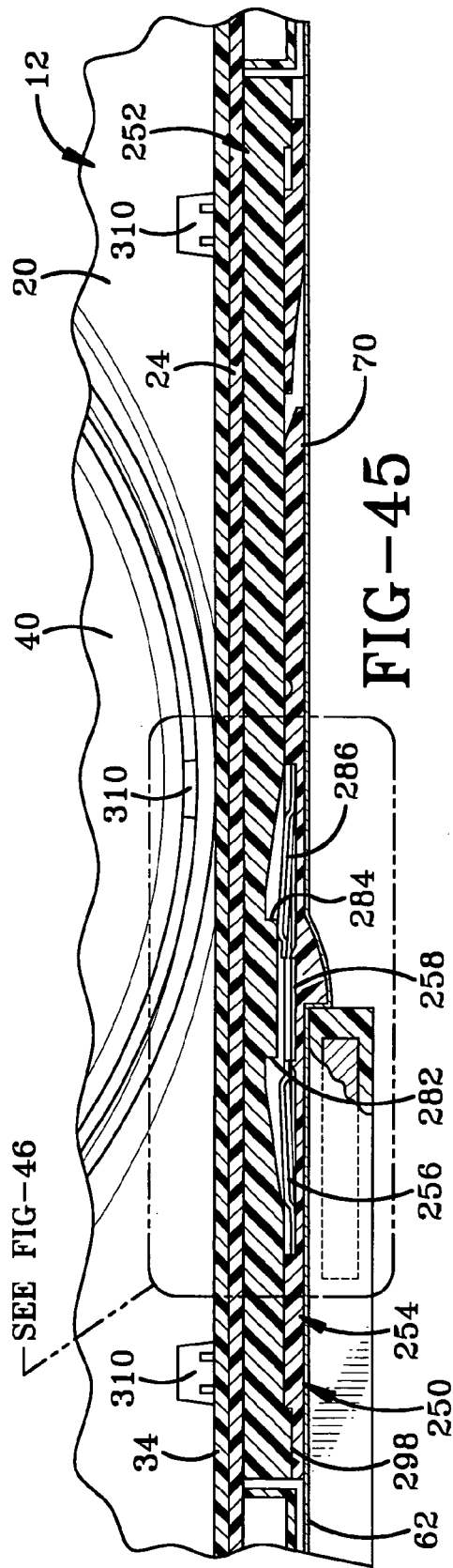
FIG. 45 is a view similar to FIG. 43 showing a magnet being positioned adjacent the lock to move the magnetic lock fingers from a locked position to an unlocked position.
Figure 46:
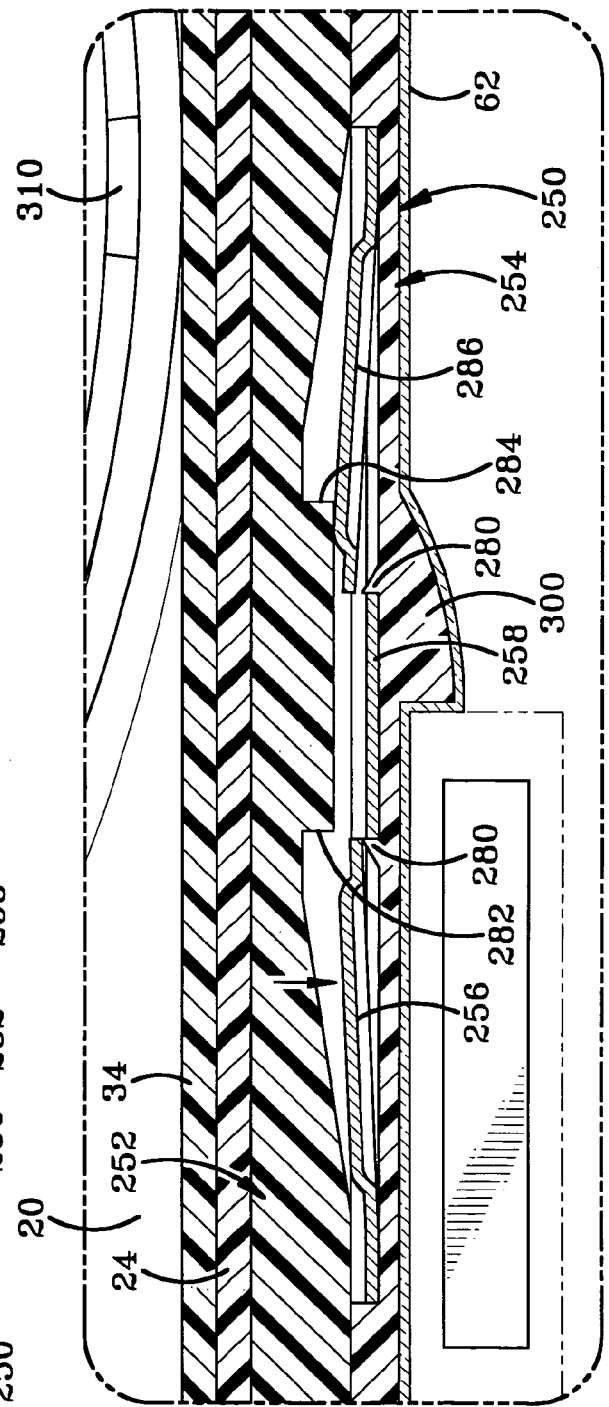
FIG. 46 is enlarged view of the encircled portion of FIG. 45.

Before explaining and describing all of the structural elements of container 202 and lock 250, the Applicant will describe how lock 250 is used with container 202. In FIG. 35, container 202 is open and item of recorded media 40 has been placed in container 202. The user (or automated equipment) then closes lid 14 and aligns lock 250 with lock reception cavity 60 defined by the front of container 202. Lock 250 is then inserted into lock reception cavity 60 as depicted in FIG. 37. In FIG. 37, lock 250 is in the locked position and is securely holding lid 14 to base 12 such that container 202 cannot be opened until lock 250 is moved to the unlocked position and removed from container 202. Container 202 and lock 250 may then be wrapped by a thin plastic layer 62 as depicted in FIG. 41. Such a layer is commonly referred to as a shrink wrapped layer in the art.

Container 202 and lock 250 may then be shipped to a retail establishment for display and sale to a consumer. The consumer may view the front and rear panel of container 202 without an interference from lock 250. Lock 250 further does not interfere with the spine (the outer surface of hinge panel 18) when lock 250 is locking container 202. A shoplifter cannot readily access item 40 without severely damaging container 202 and drawing attention to himself in the process.

The consumer who wishes to purchase container 202 takes lock container 202 to the retail establishment clerk who charges the consumer the appropriate amount of money for container 202 and item 40. Without removing the shrink wrap, the clerk unlocks lock 250 and gives container 202 and lock 250 back to the purchaser. The clerk can unlock lock 250 without damaging the shrink wrap by placing a magnet in the appropriate location next to lock 250 and moving lock slide 54 to the unlocked position. An appropriate mechanism holds lock slide 54 in the unlocked position so that it cannot accidently return to the locked position as shown in FIG. 23.

The consumer then leaves the retail establishment with lock 250 in the unlocked position under the layer of shrink wrap. The consumer may then remove the shrink wrap and pull lock 250 from container 202 as shown in FIG. 53. To facilitate the removal of lock 250, a handle 70 is provided in lock 250. Handle 70 may be pivoted outwardly as depicted in FIG. 26 to provide a grip for the user's finger and thumb. The user pulls on handle 70 until lock 250 is removed from container 202. The user then discards lock 250 and enjoys item of recorded media 40. The concepts of the present invention may also be used without shrink wrap layer 62. Having now described the concepts of the invention and the methods in which lock 250 and container 202 are used, the Applicant will now describe the structural features shown in the accompanying drawings.

As described above, lock 250 generally includes a lock base 252 and a lock slide 254 that are depicted in FIGS. 31-34. Lock slide 254 is selectively moveable between a locked position and an unlocked position. Locking finger 256 prevents lock slide 254 from moving from the locked position to the unlocked position when lock finger 256 is in the locked position. In its locked position, lock finger 256 engages both lock slide 254 and lock base 252 to prevent the two items from moving relative to one another. Protrusions 280 extend from the inner surface of lock slide 254 to engage frame 258 to prevent frame 258 from moving longitudinally and laterally with respect to lock slide 254. Some of protrusions 280 may extend into a central portion of frame 258 while others of protrusions 280 may engage the end surface of frame 258. FIG. 31 shows the locking ledge 282 on which finger 256 engages when finger 256 is in the locked position. Ledge 282 may also be seen in FIG. 16.

Base 252 further defines a secondary locking ledge 284 that is disposed in the opposite direction of ledge 282. Ledge 284 is engaged by a holding member 286 that may be in the form of a resilient locking finger similar to locking finger 256. Holding finger 286 may project from common frame 258 as depicted in FIG. 31. Holding finger 286 is used to hold lock slide 254 in the unlocked position by engaging ledge 284 as depicted in FIGS. 49 and 50.

Lock slide 254 is connected to lock base 252 by appropriate connectors 290 that allow lock slide 254 to move between the locked position of FIG. 43 and the unlocked position of FIG. 49. Members 290 may be received in a one-way snap fit connection by ledges 292 defined by the body of lock base 252 as shown in FIGS. 31 and 33.

An opening 294 may provide access to each ledge 292 so that members 290 may engage ledges 292. Base 252 and slide 254 cooperate to define an EAS tag-reception cavity 296 that is sized to receive an EAS tag 98.

Base 252 may include an indicator 298 disposed at the end of base 252. Indicator 298 may be provided in a bright color or a color that contrasts with the color of base 252 and slide 254. When lock 250 is moved to the unlocked position, indicator 298 is visible as shown in FIG. 53.

Slide 254 includes a ledge 300 that extends from the front of slide 254. Ledge 300 allows slide 254 to be pushed from the locked position to the unlocked position as shown in FIGS. 45-48. Ledge 300 is positioned at one end of the position of lock frame 258 so that the key that unlocks lock 250 may engage ledge 300 to push slide 254 to the unlocked position.

Figure 38:
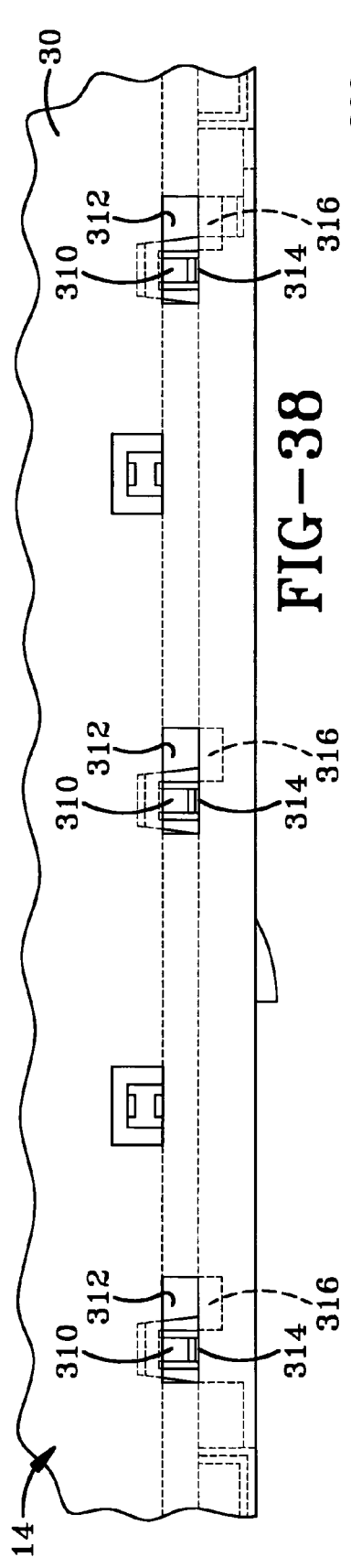
FIG. 38 is a top view of the front portion of the lid of the locked media storage container of FIG. 37.
Figure 42:
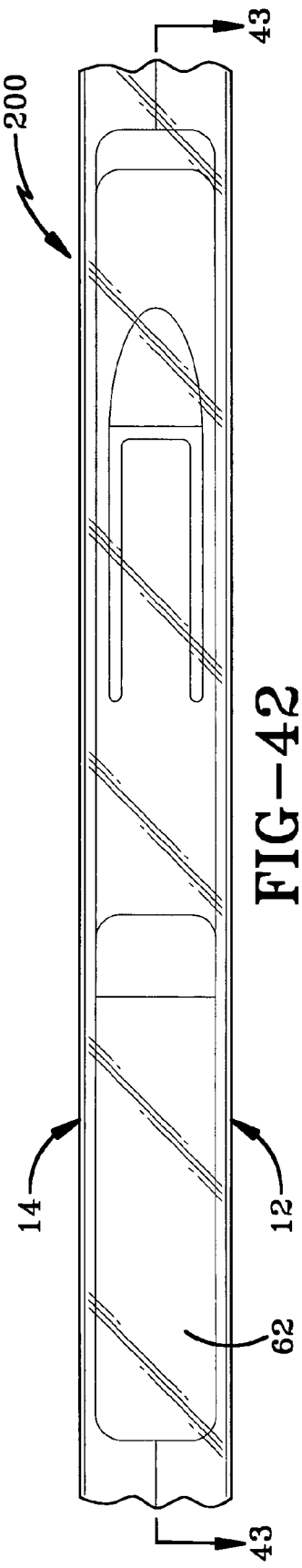
FIG. 42 is a front view of the media storage container showing the lock in the locked position disposed within the opening of the media storage container and covered by the thin layer of plastic.
Figure 51:
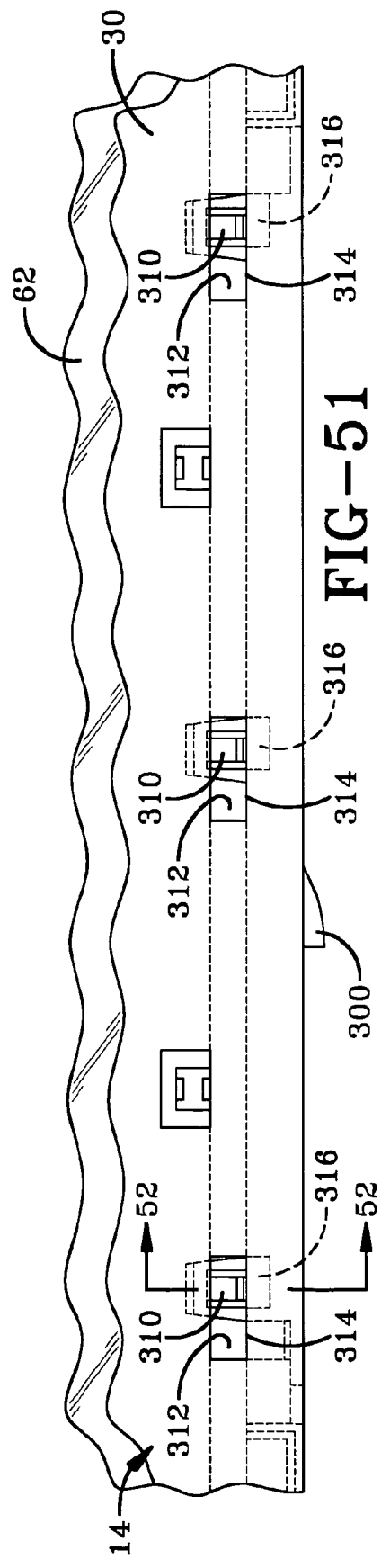
FIG. 51 is a view similar to FIG. 38 showing the lock in the unlocked position.
Figure 39:
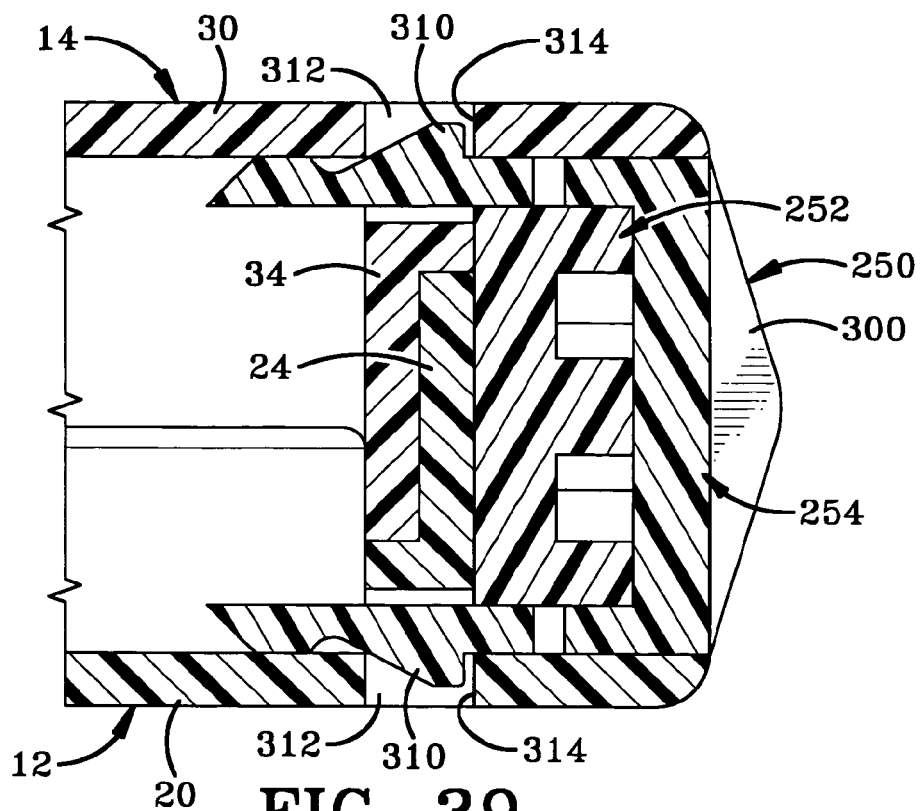
FIG. 39 is a section view taken along line 39-39 of FIG. 37.
Figure 52:
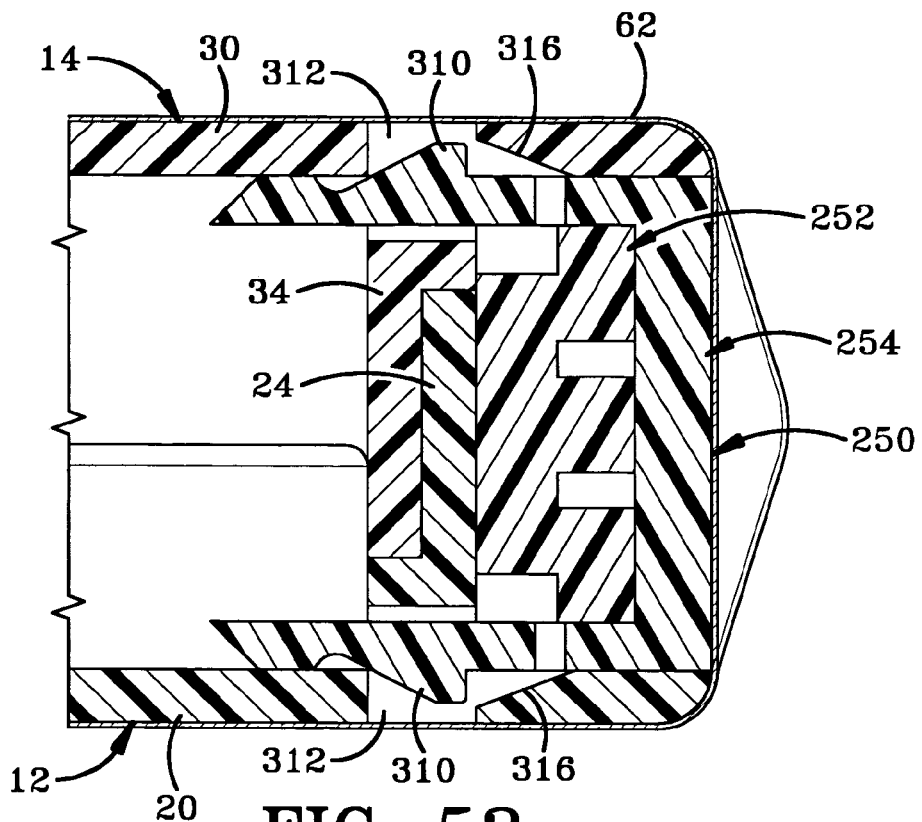
FIG. 52 is a section view taken along line 52-52 of FIG. 51.
Figure 54:
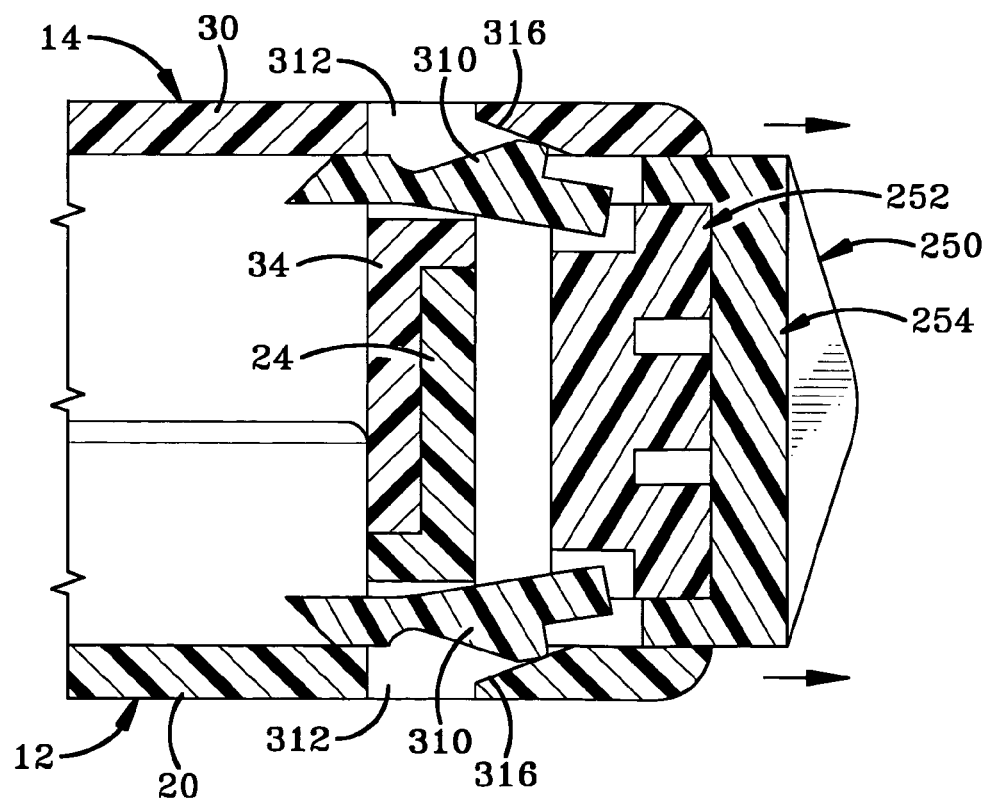
FIG. 54 is a section view taken along line 54-54 of FIG. 53.

Lock slide 254 includes container locking fingers 310. Container locking fingers 310 are adapted to hold lock 250 on container 202 in a secure manner that prevents lock 250 from being removed from container 202 until lock slide 254 is in the unlocked position. Container 202 thus defines finger openings 312 as shown in FIG. 35. In the exemplary embodiment, lock 250 includes six container locking fingers 310 that are received in three openings 312 defined by top wall 30 and three openings 312 defined by bottom wall 20. FIG. 38 shows the front portion of openings 312 wherein each opening 312 is defined by a locking ledge 314 and an unlocking ramp 316. Ledges 314 and 316 are adjacent bottom wall 20 and top wall 30 and are disposed adjacent lock reception cavity 60. Ledges 314 are positioned to engage container locking fingers 310 when lock 250 is in the locked configuration depicted in FIG. 39. Each container locking finger 310 includes a resilient locking finger that engages ledge 314 in a one-way snap fit connection when lock 250 is moved into lock reception cavity 60 as depicted in FIG. 37. When lock slide 254 is moved to the unlocked position, fingers 310 are moved over to be aligned with unlocking ramp 316. Ramps 316 allow fingers 310 to move back out of container 202 thus allowing lock 250 to be removed from container 202. This position is depicted in FIGS. 51 and 52.

Locks 50 and 250 are configured to have a length that is substantially the same as the length of lock reception cavity 60 so that either lock 50 or 250 will substantially fill cavity 60 as shown in FIGS. 16 and 43.

The third embodiment of the lockable media storage container system of the invention is indicated by the numeral 320 and includes container 322 and lock 350. System 320 is used in the manners described above with respect to the other embodiments of the invention. Media storage container 322 generally includes a base 12 that is connected to a lid 14 by an appropriate hinge. In the exemplary embodiment, the hinge includes a pair of living hinges 16 that are separated by hinge wall 18. Base 12 generally includes a bottom wall 20 with a pair of opposed sidewalls 22 projecting out from bottom wall 20. A front wall 24 extends across the edge of bottom wall 20 between the ends of sidewalls 22 opposite the hinge. Similarly, lid 14 includes a top wall 30 and a pair of opposed sidewalls 32 that project from top wall 30. A front wall 34 extends along the edge of top wall 30 between the ends of sidewalls 32 opposite the hinge. Sidewalls 32 are designed to slide within sidewalls 22 when lid 14 is closed so that container 10 has a double wall thickness when it is closed. Front walls 24 and 34 may also form a double thick front wall of container 10 if the double wall thickness is desired. In some embodiments, front walls 24 and 34 simply abut each other to define a single-thickness front wall. A tab 36 projects outwardly from hinge wall 18 so that it will cover a portion of the item of recorded media when lid 14 is closed in a manner similar to that depicted in FIG. 8. This helps prevent the item of recorded media from falling off of hub 42 when container 10 is shaken or dropped.

A lock 350 is used to lock container 322 in a closed and locked configuration. Lock 350 generally includes a lock base 352, a lock slide 354, and at least one lock finger 356 as shown in FIGS. 56-59. In the exemplary embodiment, lock 350 includes a lock finger 356 that resiliently projects from a common lock frame 358. In the exemplary embodiment, lock finger 356 is fabricated from a magnetically attractable material so that lock finger 356 may be moved from a locked position to an unlocked position with a magnetic field.

Lock slide 354 is selectively moveable between a locked position and an unlocked position. Locking finger 356 prevents lock slide 354 from moving from the locked position to the unlocked position when lock finger 356 is in the locked position. In its locked position, lock finger 356 engages lock base 352 to prevent lock base 352 and common lock frame 358 from moving relative to one another. The ends 380 of the sidewalls 381 of lock slide 354 engage common lock frame 358 causing common lock frame 358 to move with lock slide 354. Ends 380 engage the hooks 383 in the exemplary embodiment of the invention. In other embodiments of the invention, common lock frame 358 may be connected to lock slide 354 in other manners known to those skilled in the art include various types of interference fits, lock fingers, and fasteners. Lock finger 356 is disposed in a pocket defined by lock base 352 when finger 356 is in the locked position. FIG. 56 shows the locking ledge 382 on which finger 356 engages when finger 356 is in the locked position. Ledge 382 may also be seen in FIG. 68. Frame 358 and hooks 383 may be integrally formed from a single piece of metal that is attractable with a magnet. The magnetic key 385 will thus attract frame 358 and help move it to between the locked and unlocked positions.

Base 352 may define a secondary locking ledge that is disposed in the opposite direction of ledge 382. The secondary locking ledge may be designed to cooperate with a holding member that holds common lock frame 358 in the unlocked position. The holding member may be a magnetically-actuatable lock finger similar (but disposed in the opposite direction) to lock finger 356.

Figure 61:
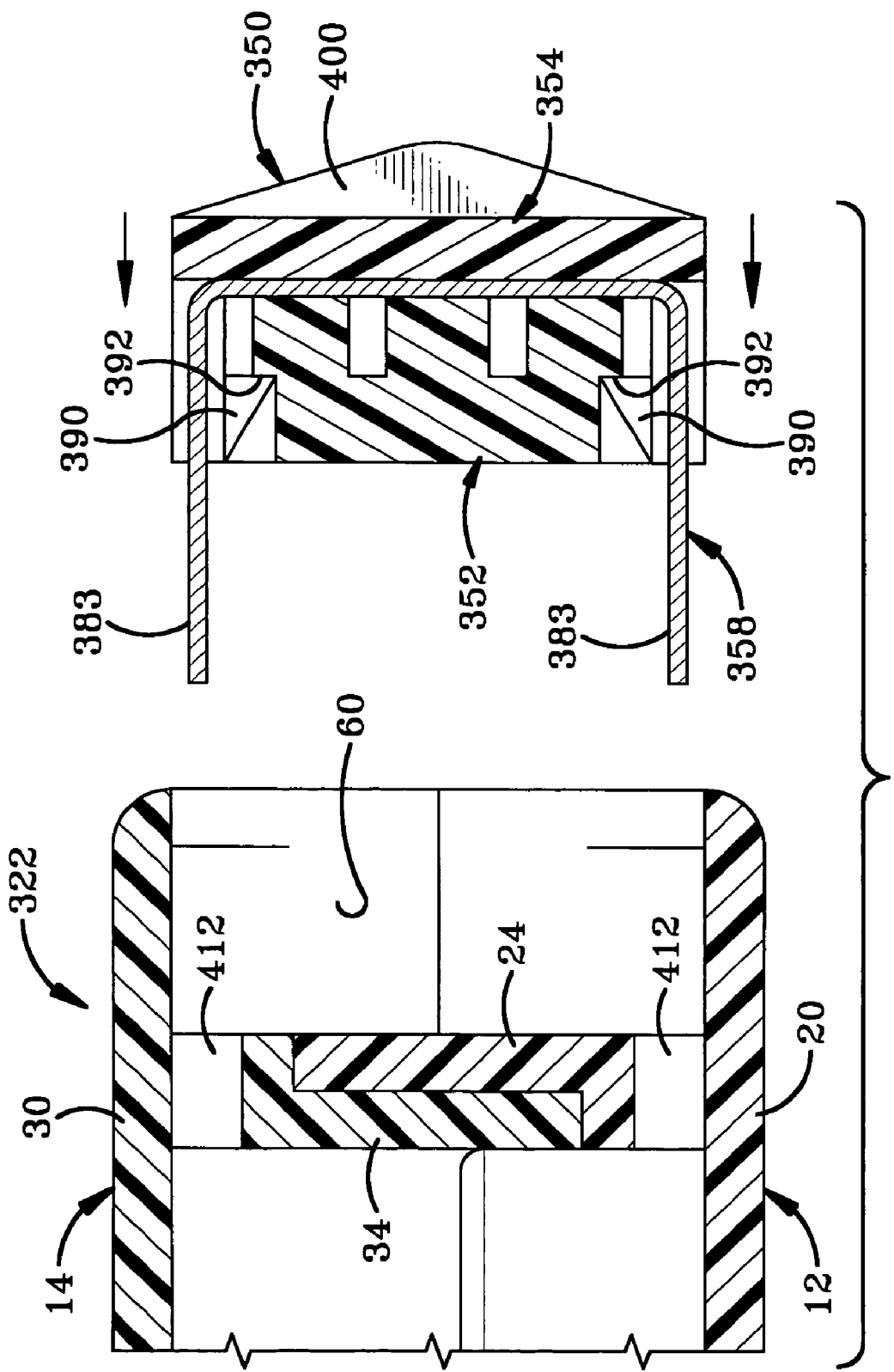
FIG. 61 is a section view taken through the lock and container of FIG. 60.
Figure 62:
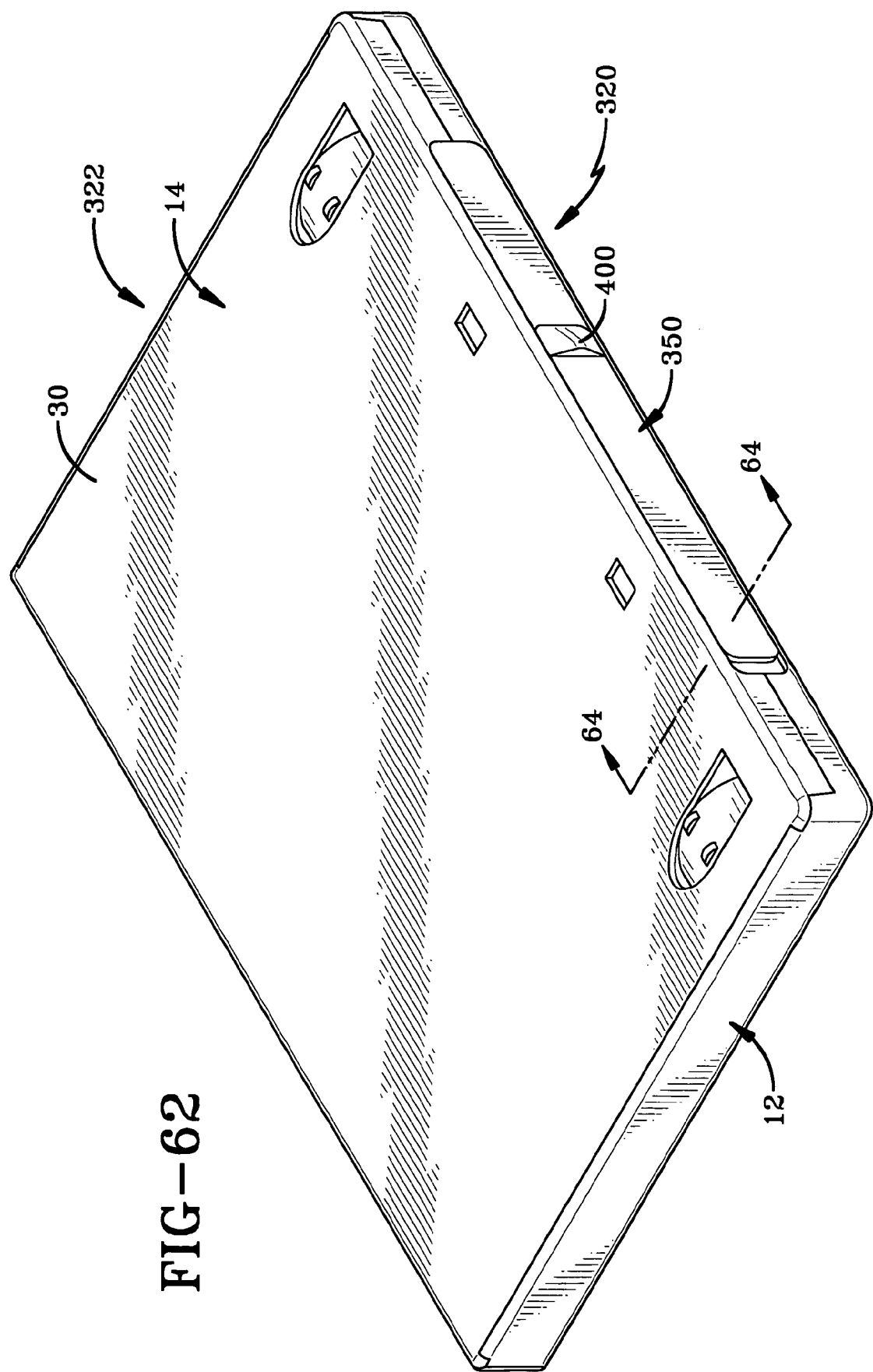
FIG. 62 is a perspective view showing the lock installed in the lock reception cavity of the media storage container with the lock in the unlocked position.
Figure 64:
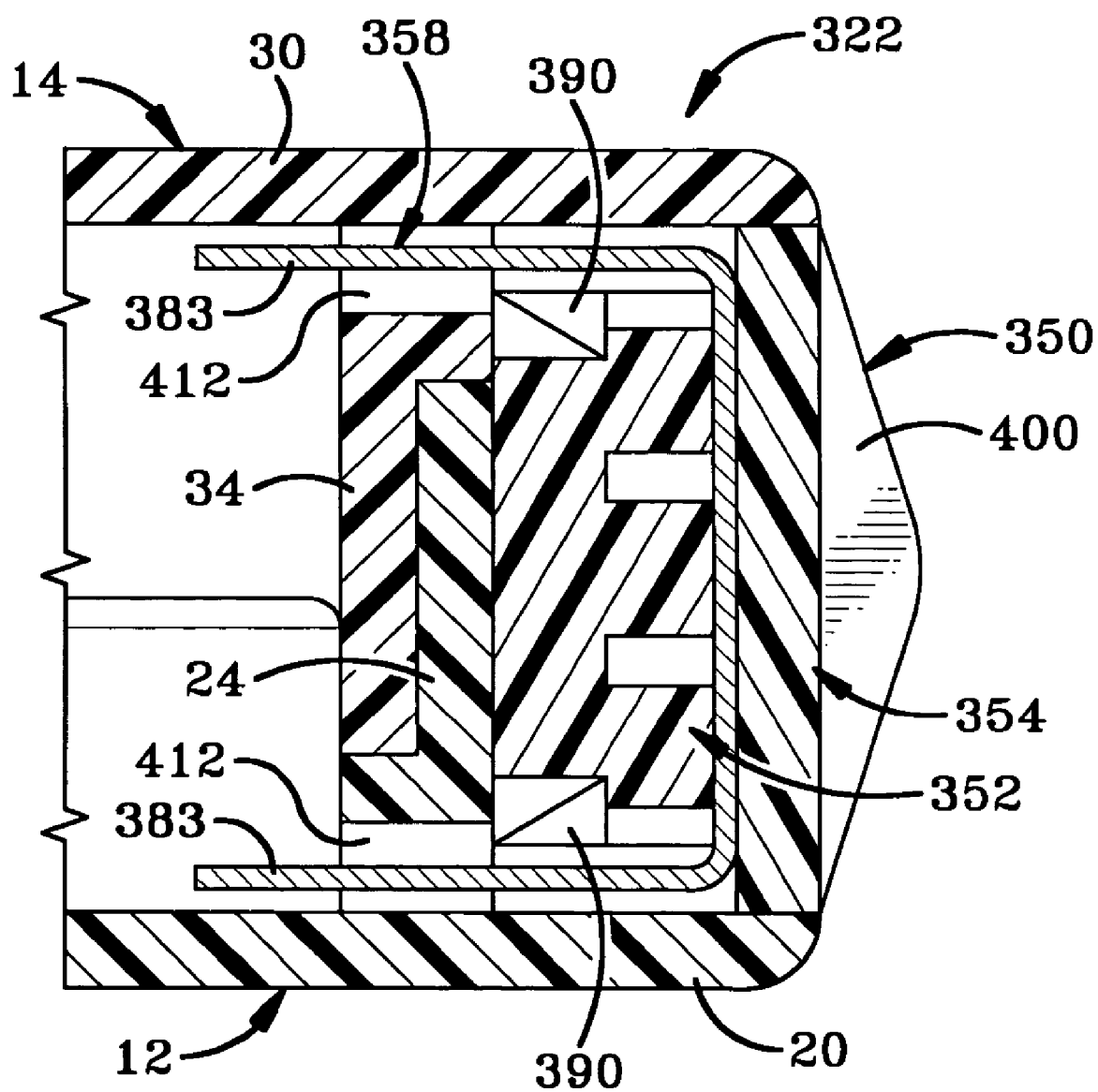
FIG. 64 is a section view taken along line 64-64 of FIG. 62.

Lock slide 354 is connected to lock base 352 by appropriate connectors 390 that allow lock slide 354 to move between the locked position of FIG. 69 and the unlocked position of FIG. 63. Members 390 may be received in a one-way snap fit connection by ledges 392 defined by the body of lock base 352 as shown in FIGS. 56, 58, and 61. An opening 394 provides access to each ledge 392 so that members 390 may snap fit against ledges 392. Base 352 and slide 354 cooperate to define an EAS tag-reception cavity 396 that is sized to receive an EAS tag 398.

Lock base 352 includes first 401 and second 403 indicator ends that are alternatively visible when lock slide 354 is in the unlocked and locked positions. Ends 401 and 403 may be colored substantially different from the color of lock slide 354 so that their color can be viewed by a person viewing system 320. When lock slide 354 is moved to the unlocked position, indicator end 401 is visible providing an indication that lock 350 is unlocked.

Figure 55:
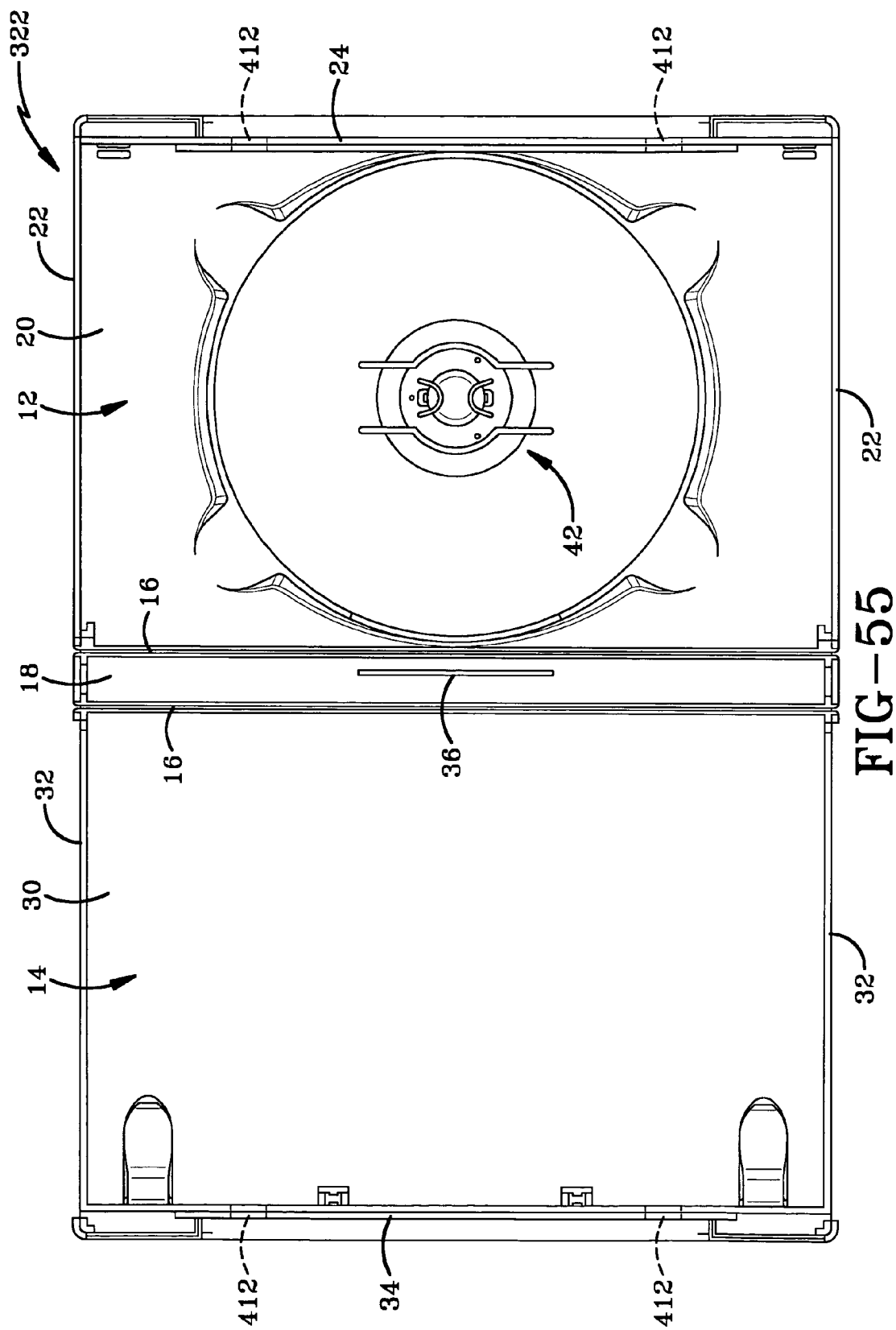
FIG. 55 is a top plan view of an alternative lockable media storage container of the present invention in an open configuration.
Figure 73:
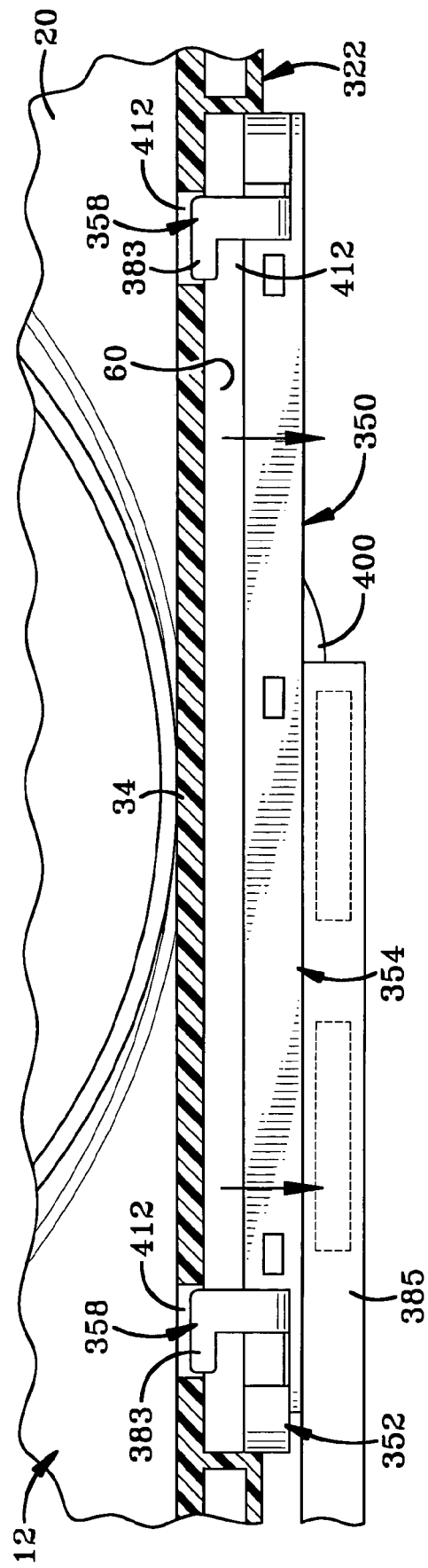
FIG. 73 is a view similar to FIG. 63 showing the lock being removed from the container.

As introduced above, common lock frame 358 includes container locking hooks 383. Container locking hooks 383 are adapted to hold lock 350 on container 322 in a secure manner that prevents lock 350 from being removed from container 322 until lock slide 354 is in the unlocked position. Container 322 thus defines hook openings 412 as shown in FIGS. 55, 61 and 73. In the exemplary embodiment, lock 350 includes four container locking hooks 383 that are received in four openings 412 defined by front walls 24 and 34. Hooks 383 hold lock 350 in place as shown in FIG. 65 and may be inserted/removed as shown in FIGS. 63 and 73.

Slide 354 includes a ledge 400 that extends from the front of slide 354. Ledge 400 allows slide 354 to be pushed from the locked position to the unlocked position as shown in FIGS. 69-73. When ledge 400 is not used, the magnetic force of the key is used to move lock 350 between the locked and unlocked positions.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A lockable media storage container system comprising:
a media storage container having a base and a lid;
the lid movable between open and closed positions with respect to the base;
the media storage container defining a lock reception cavity that opens to an exterior of the media storage container;
a lock adapted to fit within the lock reception cavity; the lock having a lock base and a lock slide; the lock slide movable with respect to the lock base between locked and unlocked positions;
the lock locking the lid closed when the lock slide is in the locked position;
the lock being removable from the media storage container when the lock slide is in the unlocked position; and
the lock slide being movable from the locked position to the unlocked position while the lock is disposed within the lock reception cavity.

2. The system of claim 1, wherein the lock includes a lock finger that locks the lock slide in the unlocked position.

3. The system of claim 2, wherein the lock finger is disposed between the lock base and lock slide.

4. The system of claim 3, wherein the lock slide includes at least first and second lock fingers that lock the lock to the container when the lock is in the locked position; the first lock finger engaging the lid and the second lock finger engaging the base.

5. The system of claim 4, wherein the base and lid of the container define an opening for each lock finger; each opening being defined by a locking ledge and an unlocking ramp; the lock finger engaging the locking ledge when the lock is in the locked position.

6. The system of claim 5, wherein each lock finger is aligned with an unlocking ramp when the lock is moved to the unlocked position so that the lock may be removed from the lock reception cavity.

7. The system of claim 1, wherein the lock includes an indicator that is visible when the lock is in the unlocked position.

8. The system of claim 7, wherein the lock includes a handle that may be pivoted outwardly from the lock to allow the lock to be pulled from the lock reception cavity.

9. The system of claim 8, wherein the lock carries an EAS tag.

10. The system of claim 1, further comprising a thin layer of plastic disposed around the container and the lock; the lock slide being movable from the locked position to the unlocked position while being surrounded by the thin layer of plastic.

11. The system of claim 1, wherein the lock reception cavity has a length; the lock having a length; the length of the lock being substantially the same as the length of the lock reception cavity.

12. A lockable media storage container system comprising:
a media storage container having a base and a lid;
the lid movable between open and closed positions;
the media storage container defining a lock reception cavity that opens to an exterior of the media storage container;

a lock adapted to fit within the lock reception cavity;
the lock movable between locked and unlocked positions while disposed in the lock reception cavity;
the lock including at least first and second locking fingers;
the first locking finger disposed in an opening defined by the lid and the second locking finger disposed in an opening defined by the base to lock the lid in the closed position; and
each of the openings defined by the lid and the base being at least partially defined by a locking ledge disposed adjacent an unlocking ramp; the lock fingers engaging the locking ledges when the lock is in the locked position; the lock fingers being aligned with the unlocking ramps when the lock is in the unlocked position.

13. The system of claim 12, wherein the lock reception cavity has a length; the lock having a length; the length of the lock being substantially the same as the length of the lock reception cavity.

14. A lockable media storaae container system comprising:
a media storage container having a base and a lid;
the lid movable between open and closed positions;
the media storage container defining a lock reception cavity that opens to an exterior of the media storaoe container;
a lock adapted to fit within the lock reception cavity;
the lock movable between locked and unlocked positions while disposed in the lock reception cavity;
the lock including at least first and second locking fingers;
the first locking finger disposed in an opening defined by the lid and the second locking finger disposed in an opening defined by the base to lock the lid in the closed position;
each of the openings defined by the lid and the base being at least partially defined by a locking ledge and an unlocking ramp; the lock finger engaging the locking ledge when the lock is in the locked position;
the lock reception cavity having a length; the lock having a length; the length of the lock being substantially the same as the length of the lock reception cavity; and
the lock including a lock base and a lock slide; the lock base having a length substantially the same as the length of the lock reception cavity; the lock slide selectively sliding on the lock base between locked and unlocked positions while the lock is disposed in the lock reception cavity.

15. The system of claim 14, further comprising a lock finger that locks the lock slide in the unlocked position.

16. The system of claim 14, wherein the base and lid have overlapping walls that at least partially define the openings that receive the first and second locking fingers.

17. A method for protecting and selling an item of recorded media comprising the steps of: displaying an item of recorded media at a store in a lockable media storage container having a storage container that holds the item of recorded media and a lock that moves between locked and unlocked positions; the locked position of the lock preventing the storage container from being opened; moving the lock to the unlocked position without removing the lock from the container when a consumer purchases the item of recorded media; locking the lock in the unlocked position; and allowing the consumer to depart the store with the lockable media storage container with the lock in the unlocked position.

18. The method of claim 17, further comprising the steps of: shrink wrapping the lockable media storage container with the lock in the locked position; and unlocking the lock without removing the shrink wrap layer.

19. The method of claim 17, further comprising the step of exposing an indicator when the lock is moved to the unlocked position.

20. The method of claim 17, further comprising the step of using a pivoting holding finger to lock the lock in the unlocked position.

21. A lockable media storage container system comprising:
a media storage container having a base and a lid;
the lid movable between open and closed positions with respect to the base;
the media storage container defining a lock reception cavity that opens to an exterior of the media storage container;
a lock adapted to fit within the lock reception cavity;
the lock having a lock base and a lock slide;
the lock slide movable with respect to the lock base between locked and unlocked positions;
the lock including a lock finger that locks the lock slide in the unlocked position;
the lock reception cavity having a length; the lock base having a length; the length of the lock base being substantially the same as the length of the lock reception cavity
the lock locking the lid closed when the lock slide is in the locked position;
the lock being removable from the media storage container when the lock slide is in the unlocked position; and
the lock slide being movable from the locked position to the unlocked position while the lock is disposed within the lock reception cavity.

22. The system of claim 21, wherein the lock finger is disposed between the lock base and lock slide.

23. The system of claim 21, wherein the lock includes an indicator that is visible when the lock is in the unlocked position.

24. The system of claim 23, wherein the lock includes a handle that may be pivoted outwardly from the lock to allow the lock to be pulled from the lock reception cavity.

25. The system of claim 24, wherein the lock carries an EAS tag.

26. A lockable media storage container system comprising:
a media storage container having a base and a lid; the lid being integrally connected to the base with a living hinge;
the lid movable between open and closed positions with respect to the base;
a lock carried by the media storage container; the lock being disposed on the opposite side of the media storage container than the living hinge;
the lock movable between locked and unlocked positions; the lock sliding between the locked position and the unlocked position; the lock locking the lid closed when the lock is in the locked position;
the lock including at least first and second locking fingers;
the first locking finger engaging the lid and the second locking finger engaging the base to lock the lid in the closed position; and
a holding finger that locks the lock in the unlocked position.

27. The system of claim 26, wherein the lock includes an indicator that is visible when the lock is in the unlocked position.

* * * * *